(12) United States Patent
Han et al.

(10) Patent No.: US 9,900,794 B2
(45) Date of Patent: *Feb. 20, 2018

(54) TIME-REVERSAL WIRELESS SYSTEMS HAVING ASYMMETRIC ARCHITECTURE

(71) Applicant: Origin Wireless, Inc., Boston, MA (US)

(72) Inventors: Feng Han, San Diego, CA (US); K. J. Ray Liu, Potomac, MD (US); Yan Chen, ChengDu (CN)

(73) Assignee: Origin Wireless, Inc., Greenbelt, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/912,324

(22) PCT Filed: Aug. 14, 2014

(86) PCT No.: PCT/US2014/051148
§ 371 (c)(1),
(2) Date: Feb. 16, 2016

(87) PCT Pub. No.: WO2015/023895
PCT Pub. Date: Feb. 19, 2015

(65) Prior Publication Data
US 2016/0205569 A1    Jul. 14, 2016

Related U.S. Application Data

(63) Continuation of application No. 13/969,320, filed on Aug. 16, 2013, now Pat. No. 9,559,874, and a
(Continued)

(51) Int. Cl.
*H04W 24/08*    (2009.01)
*H04L 25/03*    (2006.01)
(Continued)

(52) U.S. Cl.
CPC .......... *H04W 24/08* (2013.01); *H04B 17/309* (2015.01); *H04L 25/03012* (2013.01);
(Continued)

(58) Field of Classification Search
None
See application file for complete search history.

(56) References Cited

U.S. PATENT DOCUMENTS 2,933,702 A    4/1960  Bogert
3,767,855 A    10/1973 Ueno et al.
(Continued)

FOREIGN PATENT DOCUMENTS

EP            2 571 214 A1    11/2012
WO    WO 2007/031088         3/2007
(Continued)

OTHER PUBLICATIONS

Abbasi-Moghadam, D. et al., "A SIMO one-bit time reversal for UWB communication systems", EURASIP J. Wireless Comm. and Networking, 2012:113, 9 pp., 2012.
(Continued)

*Primary Examiner* — Andrew Lai
*Assistant Examiner* — Jamaal Henson
(74) *Attorney, Agent, or Firm* — Fish & Richardson P.C.

(57) ABSTRACT

In an asymmetric time-reversal wireless system, a base station includes an input circuit configured to, during a hand-shake period, receive a channel response signal derived from a probe signal sent from a first terminal device to the apparatus through multiple wireless propagation paths, and during an uplink transmission period, receive combined signals that include a signal from the first terminal device and a signal from a second terminal device. The base station includes a data processor configured to calculate a signature waveform for the first terminal device based on the
(Continued)

channel response, and determine the signal sent from the first terminal device during the uplink transmission period based on the combined signals and the signature waveform for the first terminal device.

21 Claims, 40 Drawing Sheets

Related U.S. Application Data continuation of application No. 13/969,271, filed on Aug. 16, 2013.

(51) Int. Cl.
  *H04B 17/309* (2015.01)
  *H04L 12/26* (2006.01)

(52) U.S. Cl.
  CPC .... *H04L 25/0328* (2013.01); *H04L 25/03318* (2013.01); *H04L 25/03343* (2013.01); *H04L 43/12* (2013.01); *H04L 2025/03802* (2013.01)

(56) References Cited

U.S. PATENT DOCUMENTS

| | | | |
|---|---|---|---|
| 5,092,336 A | 3/1992 | Fink | |
| 5,155,742 A | 10/1992 | Ariyavisitakul et al. | |
| 5,428,999 A | 7/1995 | Fink | |
| 5,926,768 A | 7/1999 | Lewiner et al. | |
| 6,137,788 A | 10/2000 | Sawahashi et al. | |
| 6,301,291 B1 | 10/2001 | Rouphael et al. | |
| 6,490,469 B2 | 12/2002 | Candy | |
| 6,862,326 B1 | 3/2005 | Eran et al. | |
| 7,362,815 B2 | 4/2008 | Lindskog et al. | |
| 7,440,766 B1 | 10/2008 | Tuovinen et al. | |
| 7,460,605 B2 | 12/2008 | Candy et al. | |
| 7,463,690 B2 | 12/2008 | Candy et al. | |
| 7,587,291 B1 | 9/2009 | Sarvazyan et al. | |
| 7,768,876 B2 | 8/2010 | Dahl et al. | |
| 8,195,112 B1 | 6/2012 | Zhang et al. | |
| 8,346,197 B2 | 1/2013 | Huy et al. | |
| 8,411,765 B2* | 4/2013 | Smith | H04L 25/0212 375/259 |
| 8,451,181 B2 | 5/2013 | Huy et al. | |
| 8,457,217 B2 | 6/2013 | Huy et al. | |
| 8,498,658 B2 | 7/2013 | Smith et al. | |
| 8,593,998 B2 | 11/2013 | Huy et al. | |
| 8,743,976 B2 | 6/2014 | Smith et al. | |
| 8,792,396 B2 | 7/2014 | Huy et al. | |
| 8,831,164 B2 | 9/2014 | Lu | |
| 2001/0037075 A1 | 11/2001 | Candy | |
| 2003/0138053 A1 | 7/2003 | Candy et al. | |
| 2004/0156443 A1 | 8/2004 | Dent | |
| 2006/0098746 A1 | 5/2006 | Candy et al. | |
| 2006/0115031 A1 | 6/2006 | Lindskog et al. | |
| 2006/0233221 A1* | 10/2006 | Xu | H04B 7/0897 375/147 |
| 2007/0071077 A1 | 3/2007 | Yang | |
| 2009/0296786 A1 | 12/2009 | Massicotte et al. | |
| 2010/0240312 A1 | 9/2010 | Peng et al. | |
| 2010/0302977 A1 | 12/2010 | Huy et al. | |
| 2010/0309829 A1 | 12/2010 | Huy et al. | |
| 2010/0316163 A1 | 12/2010 | Forenza et al. | |
| 2011/0129027 A1* | 6/2011 | Takaoka | H04L 25/0226 375/260 |
| 2012/0155515 A1 | 6/2012 | Smith et al. | |
| 2012/0183037 A1 | 7/2012 | Allpress et al. | |
| 2012/0207234 A1 | 8/2012 | De Rosny et al. | |
| 2012/0257660 A1 | 10/2012 | Smith et al. | |
| 2012/0263056 A1 | 10/2012 | Smith et al. | |
| 2012/0328037 A1 | 12/2012 | Hsu et al. | |
| 2013/0201958 A1 | 8/2013 | Huy et al. | |
| 2013/0223503 A1 | 8/2013 | Smith et al. | |
| 2014/0022128 A1 | 1/2014 | Smith | |
| 2014/0126567 A1 | 5/2014 | Husain et al. | |
| 2014/0185596 A1 | 7/2014 | Han et al. | |
| 2015/0049745 A1 | 2/2015 | Han et al. | |
| 2015/0049792 A1 | 2/2015 | Han et al. | |

FOREIGN PATENT DOCUMENTS

| | | |
|---|---|---|
| WO | WO 2011/029072 | 3/2011 |
| WO | WO 2011/029075 | 3/2011 |
| WO | WO2011029072 A2 * | 3/2011 |
| WO | WO 2012/052692 | 4/2012 |
| WO | WO 2012/151316 | 11/2012 |
| WO | WO 2013/126054 | 8/2013 |
| WO | WO 2015/023895 | 2/2015 |

OTHER PUBLICATIONS

Albert, D. G. et al., "Time Reversal processing for source location in an urban environment (L)", J. Acoust. Soc. Am., vol. 118(2):616-619, Aug. 2005.

Brysev, A.P. et al., "Wave phase conjugation in ultrasonic beams", Physics-Uspekhi, vol. 41(8):793-805, 1998.

Chang, Y.-H. et al., "Ultrawideband Transceiver Design Using Channel Phase Precoding", IEEE Trans. Sig. Proc., vol. 55(7):3807-3822, Jul. 2007.

Chen, Y. et al., "Time-reversal wideband communications," IEEE Signal Processing Letters, vol. 20(12):1219-1222, Dec. 2013.

Chen, Y. et al., "Time-Reversal Wireless Paradigm for Green Internet of Things: An Overview", IEEE Internet of Things Journal, vol. 1(1):81-98, Feb. 2014.

Daniels, R.C. et al., "Improving on Time-reversal with MISO Precoding," Proceedings of the Eighth International Symposium on Wireless Personal Communications Conference, Aalborg, Denmark, 5 pages, Sep. 18-22, 2005.

Daniels, R.C. et al., "MISO Precoding for Temporal and Spatial Focusing" in the Proceedings of the Eighth International Symposium on Wireless Personal Communications Conference, Aalborg, Denmark, 6 pages, Sep. 18-22, 2005.

De Rosny, J. et al., "Theory of Electromagnetic Time-Reversal Mirrors", IEEE Trans. Antennas Propag., vol. 58(10):3139-3149, Oct. 2010.

Derode, A. et al., "Ultrasonic pulse compression with one-bit time reversal through multiple scattering", J. Appl. Phys., vol. 85(9):6343-6352, May 1999.

Derode, A. et al., "Taking Advantage of Multiple Scattering to Communicate with Time-Reversal Antennas", Phys. Rev. Lett., vol. 90(1): 014301-1-4, Jan. 2003.

Derode, A. et al., "Robust Acoustic Time Reversal and High-Order Multiple Scattering", Phys. Rev. Lett., vol. 75(23):4206-4210, Dec. 1995.

Divsalar, D. and Simon, M. K., "Improved CDMA performance using parallel interference cancellation", JPL Publication, 95-21, Oct. 1995.

Divsalar, D., Simon, M. K, Raphaeli, Dan, "Improved Parallel Interference Cancellation for CDMA", IEEE Transactions on Communications, vol. 46, No. 2, Feb. 1998.

Dorme, C. et al., "Focusing in transmit-receive mode through inhomogeneous media: The time reversal matched filter approach", J. Acoust. Soc. Am., vol. 98(2):1155-1162, Pt. 1, Aug. 1995.

Duel-Hallen, A., Holtzman, J., and Zvonar, Z., "Multiuser detection for CDMA systems", IEEE Personal Communications, pp. 46-58, Apr. 1995.

Edelmann, G.F.et al., "An Initial Demonstration of Underwater Acoustic Communication Using Time Reversal", IEEE Journal of Oceanic Engineering, vol. 27(3):602-609, Jul. 2002.

Emami, M. et al., "Matched Filtering with Rate Back-off for Low Complexity Communications in Very Large Delay Spread Channels," 38th Asilomar Conference on Signals, Systems and Computers, pp. 218-222, 2004.

Emami, S.M. et al., "Predicted Time Reversal Performance in Wireless Communications using Channel Measurements", publication details unknown.

(56) References Cited

OTHER PUBLICATIONS

Fink, M. et al., "Acoustic Time-Reversal Mirrors", Inverse Problems, vol. 17:R1-R38, 2001.
Fink, M., "Time Reversal of Ultrasonic Fields-Part I: Basic Principals", IEEE Trans. Ultrasonics, Ferroelectrics and Freq. Contr., vol. 39(5):555-566, Sep. 1992.
Fink, M., "Time-Reversal Mirrors", J. Phys. D: Appl. Phys., vol. 26:1333-1350, 1993.
Fink, M., "Time-Reversed Acoustics", Scientific American, pp. 91-97, Nov. 1999.
Fink, M. et al., "Self focusing in inhomogeneous media with time reversal acoustic mirrors," IEEE Ultrasonics Symposium, vol. 1:681-686, 1989.
Fontana, R.J. et al., "Ultra-Wideband Precision Asset Location System", Proc. of the IEEE Conf. on UWB Sys. and Tech., pp. 147-150, 2002.
Guo, N. et al., "Reduced-Complexity UWB Time-Reversal Techniques and Experimental Results", IEEE Trans. on Wireless Comm., vol. 6(12):4221-4226, Dec. 2007.
Han, F. et al., "A multiuser TRDMA uplink system with 2D parallel interference cancellation," IEEE Transactions on Communications, vol. 62(3):1011-1022, Mar. 2014.
Han, F. et al., "An Interference Cancellation Scheme for the Multiuser TRDMA Uplink System," Global Telecommunications Conference, pp. 3583-3588, 2013.
Han, F., "Energy Efficient Optimization in Green Wireless Networks", University of Maryland Ph. D. Dissertation, 2013.
Han, F., et al., "Time-reversal division multiple access in multi-path channels," Global Telecommunications Conference, pp. 1-5, Dec. 2011.
Han, F. et al., , "Time-reversal division multiple access over multi-path channels," IEEE Transactions on Communications, vol. 60(7):1953-1965, Jul. 2012.
Han, Y. et al., "Time-Reversal with Limited Signature Precision: Tradeoff Between Complexity and Performance", Proc. IEEE Global Conference on Signal and Information Processing (GlobalSIP), Atlanta, Dec. 2014.
Henty, B.E. and D.D. Stancil, "Multipath-Enabled Super-Resolution for rf and Microwave Communication using Phase-Conjugate Arrays", Phys. Rev. Lett., vol. 93, 243904, Dec. 2004.
Jin, Y. et al., "Time-Reversal Detection Using Antenna Arrays", IEEE Trans. Signal Processing, vol. 57(4):1396-1414, Apr. 2009.
Jin, Y. et al., "Adaptive time reversal beamforming in dense multipath communication networks," 2008 42nd Asilomar Conference on Signals, Systems and Computers, pp. 2027-2031, Oct. 2008.
Khalegi, A. et al., "Demonstration of Time-Reversal in Indoor Ultra-Wideband Communication: Time Domain Measurement", IEEE Proc. of ISWCS, pp. 465-468, 2007.
Kuperman, W.A. et al., "Phase conjugation in the ocean: Experimental demonstration of an acoustic time-reversal mirror", J. Acoust. Soc. Am., vol. 103(1), pp. 25-40, Jan. 1998.
Kyritsi, P. et al., "One-bit Time Reversal for WLAN Applications", IEEE 16th Intern. Symp. on Personal, Indoor and Mobile Radio Comm., pp. 532-536, 2005.
Kyritsi, P. et al., "Time reversal and zero-forcing equalization for fixed wireless access channels," 39th Asilomar Conference on Signals, Systems and Computers, pp. 1297-1301,2005.
Kyritsi, P. et al., "Time reversal techniques for wireless communications," IEEE Vehicular Technology Conference, vol. 1:47-51 (2004).
Lemoult, F. et al., "Manipulating Spatiotemporal Degrees of Freedom in Waves of Random Media", Phys. Rev. Lett., vol. 103, 173902, Oct. 2009.
Lemoult, F. et al., "Resonant Metalenses for Breaking the Diffraction Barrier", Phys. Rev. Lett., vol. 104, 203901, May 2010.
Lerosey, G. et al., "Time Reversal of Electromagnetic Waves and Telecommunication", Radio Science, vol. 40, RS6S12, 2005.
Lerosey, G. et al., "Time Reversal of Electromagnetic Waves", Phys. Rev. Lett., vol. 92(19), 193904, May 2004.
Lerosey, G. et al., "Time Reversal of Wideband Microwaves", Appl. Phys. Lett., vol. 88, 154101, Apr. 2006.
Lerosey, G. et al., "Focusing beyond the diffraction limit with far-field time reversal", Science, vol. 315:1120-1122, Feb. 2007.
Lienard, M. et al., "Focusing gain model of time-reversed signals in dense multipath channels," IEEE Antennas and Wireless Propagation Letters, vol. 11:1064-1067, 2012.
Ma, H. et al., "Interference-Mitigating Broadband Secondary User Downlink System: A Time-Reversal Solution", Global Telecommunications Conference, pp. 884-889, 2013.
Molisch, Andreas F. et al., "IEEE 802.15.4a channel model—final report", Tech. Rep. Document IEEE 802.15-04-0662-02-004a, 2005.
Montaldo, G. et al., "Telecommunication in a disordered environment with iterative time reversal", Waves Random Media, vol. 14:287-302, 2004.
Moshavi, S., "Multi-user detection for DS-CDMA communications", IEEE Communications Magazine, pp. 124-136, Oct. 1996.
Moura, J.M.F. and Y. Jin, "Detection by Time Reversal: Single Antenna", IEEE Trans. on Signal Process., vol. 55(1):187-201, Jan. 2007.
Moura, J.M.F. and Y. Jin, "Time Reversal Imaging by Adaptive Interference Canceling", IEEE Trans. on Signal Process., vol. 56(1):233-247, Jan. 2008.
Naqvi, I.H., et al., "Performance Enhancement of Multiuser Time Reversal UWB Communication System", Proc. of IEEE ISWCS, pp. 567-571, 2007.
Naqvi, I.H. et al., "Experimental validation of time reversal ultra wide-band communication system for high data rates", IET Microw. Antennas Propag., vol. 4(Iss. 5):643-650, 2010.
Naqvi, I.H. et al., "Effects of Time Variant Channel on a Time Reversal UWB System", Global Telecommunications Conference, 2009.
Nguyen, H. T., "On the performance of one bit time reversal for multi-user wireless communications", IEEE Proc. of ISWCS, pp. 672-676, 2007.
Nguyen, H. et al., "Antenna Selection for Time Reversal MIMO UWB Systems", IEEE Vehicle Technology Conference, pp. 1-5, 2009.
Nguyen, H. et al. "On the MSI Mitigation for MIMO UWB Time Reversal Systems", Proc. of IEEE International Conference on Ultra-Wideband, pp. 295-299, 2009.
Nguyen, H. et al., "Preequalizer Design for Spatial Multiplexing SIMO-UWB TR Systems", IEEE Trans. on Vehicular Tech., vol. 59(8):3798-3805, Oct. 2010.
Nguyen, H.T., "Partial one bit time reversal for UWB impulse radio multi-user communications", IEEE Proc. of ICCE, 2008.
Nguyen, H.T., Kovacs, I.Z., Eggers, P.C.F., "A time reversal transmission approach for multiuser UWB communications", IEEE Trans. Antennas and Propagation, vol. 54(11):3216-3224, Nov. 2006.
Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.
Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.
Parvulescu, A. and Clay, C. S., "Reproducibility of Signal Transmissions in the Ocean", The Radio and Electronic Engineer, pp. 223-228, Apr. 1965.
Phan-Huy, D. T., S.B. Halima, M. Helard, "Frequency Division Duplex Time Reversal", Global Telecommunications Conference, 2011.
Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

(56) References Cited

OTHER PUBLICATIONS

Porcino, D., "Ultra-Wideband Radio Technology: Potential and Challenges Ahead", IEEE Communications Mag., pp. 66-74, Jul. 2003.
Prada, C., F. Wu, and M. Fink, "The iterative time reversal mirror: A solution to self-focusing in the pulse echo mode," J. Acoustic Society of America, vol. 90, pp. 1119-1129, 1991.
Price, R., "A Communication Technique for Multipath Channels", Proceeding of the IRE, pp. 555-570, 1958.
Qiu, R. C. et al., "Time reversal with miso for ultra-wideband communications: Experimental results," IEEE Antenna and Wireless Propagation Letters, vol. 5:269-273 2006.
Rode, J. P., M.J. Hsu, D. Smith and A. Hussain, "Collaborative Beamfocusing Radio (COBRA)", Proc. of SPIE, vol. 8753, pp. 87530J-1-11, 2013.
Rouseff, D., D.R. Jackson, W. L. J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.
Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.
Song, H. C., W.A. Kuperman, W.S. Hodgkiss, T. Akal, and C. Ferla, "Iterative time reversal on the ocean", J. Acoust. Soc. Am, vol. 105(6):3176-3184, Jun. 1999.
Song, H. C., W.S. Hodgkiss, W.A. Kuperman, T. Akal, and M. Stevenson, "Multiuser Communications Using Passive Time Reversal", IEEE J. Oceanic Eng., vol. 32(4):915-926, Oct. 2007.
Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, 2004.
Varanasi, M. K. and Aazhang, B., "Multistage Detection in Asynchronous Code-Division Multiple-Access Communications", IEEE Transactions on Communications, vol. 38(4):509-519, Apr. 1990.
Verdu, S., "Minimum probability of error for asynchronous Gaussian multiple-access channels", IEEE Trans. Inform. Theory, vol. IT-32:85-96, Jan. 1986.
Verdu, S., "Optimum multiuser asymptotic efficiency", IEEE Trans. Commun., vol. COM-34:890-897, Sep. 1986.
Viterbi, A. J., "Very low rate convolutional codes for maximum theoretical performance of spread-spectrum multiple-access channels", IEEE Transactions on Selected Areas in Communications, vol. 8(4):641-649, May 1990.
Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.
Wang, B. et al., "Green wireless communications: A time-reversal paradigm," IEEE Journal of Selected Areas in Communications, vol. 29:1698-1710 2011.
Wu, F., J.L. Thomas, and M. Fink, "Time Reversal of Ultrasonic Fields-Part II: Experimental Results", IEEE Trans. Ultrasonics, Ferroelectrics and Freq. Contr., vol. 39(5):567-578, Sep. 1992.
Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.
Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.
Yang, Y. H., "Waveform Design and Network Selection in Wideband Small Cell Networks", University of Maryland Ph. D. Thesis, 2013.
Yang, Y. H., B. Wang and K. J. R. Liu, "Waveform Design for Sum Rate Optimization in Time-Reversal Multiuser Downlink Systems", Global Telecommunications Conference, 2011.
Yang, Y.-H., Wang, B., Lin, W.S., Liu, K.J.R., "Near-Optimal Waveform Design for Sum Rate Optimization in Time-Reversal Multiuser Downlink Systems", IEEE Trans Wireless Communications, vol. 12(1):346-357, Jan. 2013.
Yang, Yu-Han et al., "Waveform Design for Time-Reversal Systems", U.S. Appl. No. 13/706,342, filed Dec. 5, 2012, 86 pages.
Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.
Notification of Transmittal of the International Search Report and Written Opinion of the International Searching Authority, or the Declaration issued in corresponding Int. Appl. No. PCT/US2014/051148 dated Jan. 23, 2015, 17 pp.
Notification Concerning Transmittal of International Preliminary Report on Patentability (Chapter I of the Patent Cooperation Treaty) issued in corresponding Int. Appl. No. PCT/US2014/051148 dated Feb. 25, 2016, 11 pp.
USPTO Non-Final Office Action issued in related U.S. Appl. No. 13/969,271 dated May 29, 2015, 23 pp.
USPTO Final Office Action issued in related U.S. Appl. No. 13/969,271 dated Dec. 21, 2015, 26 pp.
Fish & Richardson, Response to Office Action dated May 29, 2015 filed in related U.S. Appl. No. 13/969,271 dated Nov. 25, 2015, 13 pp.
USPTO Non-Final Office Action issued in related U.S. Appl. No. 13/969,320 dated Aug. 18, 2014, 30 pp.
Fish & Richardson, Response to Action dated Aug. 18, 2014 filed in related U.S. Appl. No. 13/969,320 dated Nov. 17, 2014, 17 pp.
USPTO Final Office Action issued in related U.S. Appl. No. 13/969,320 dated Feb. 18, 2015, 43 pp.
Fish & Richardson, Response to Action dated Feb. 18, 2015 filed in related U.S. Appl. No. 13/969,320 dated Apr. 22, 2015, 17 pp.
USPTO Non-Final Office Action issued in related U.S. Appl. No. 13/969,320 dated Apr. 30, 2015, 50 pp.
Fish & Richardson, Response to Action dated Apr. 30, 2015 filed in related U.S. Appl. No. 13/969,320 dated Oct. 13, 2015, 17 pp.
USPTO Final Office Action issued in related U.S. Appl. No. 13/969,320 dated Nov. 20, 2015, 52 pp.

* cited by examiner

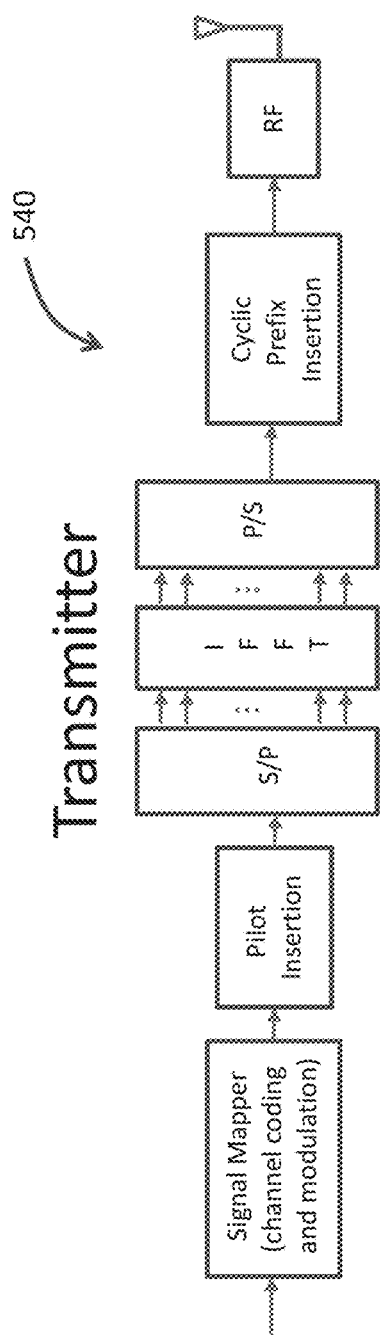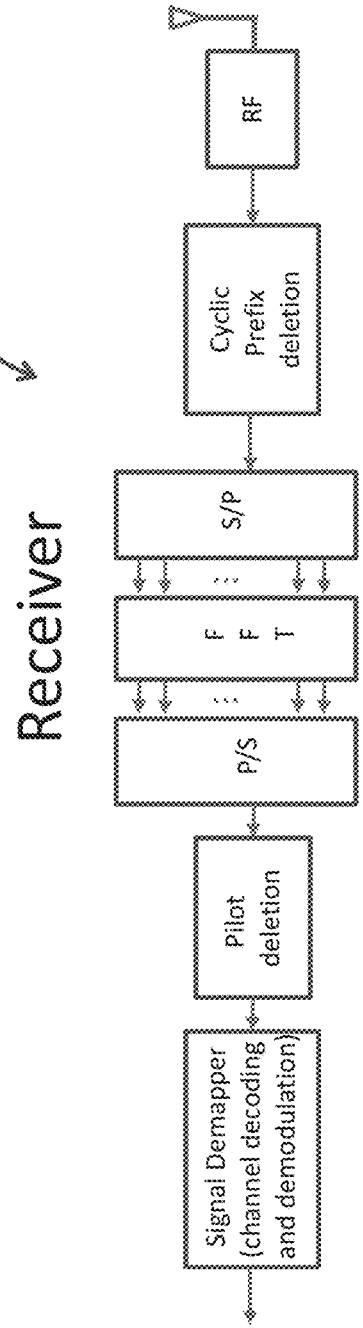
FIG. 28A
FIG. 28B

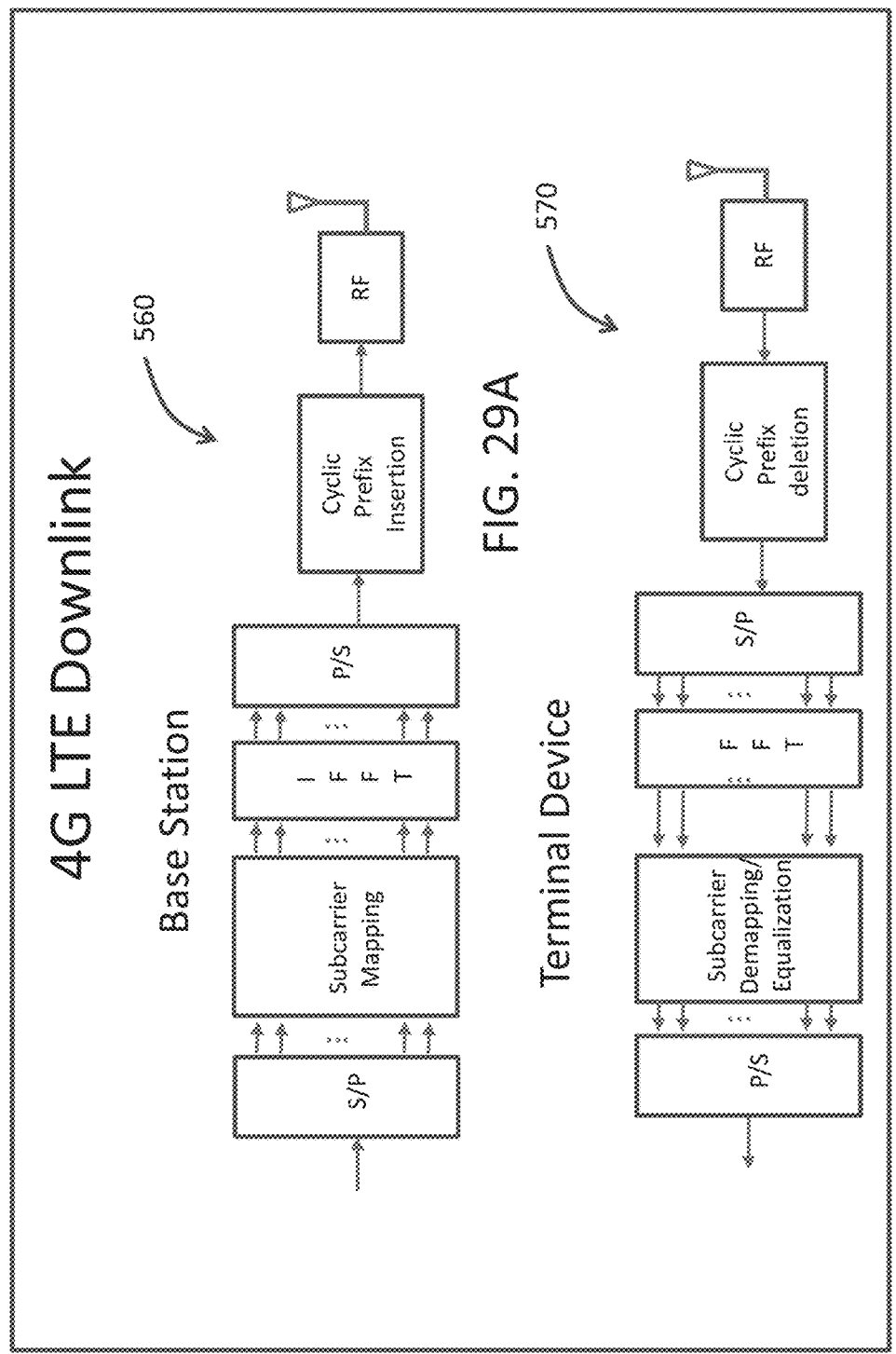

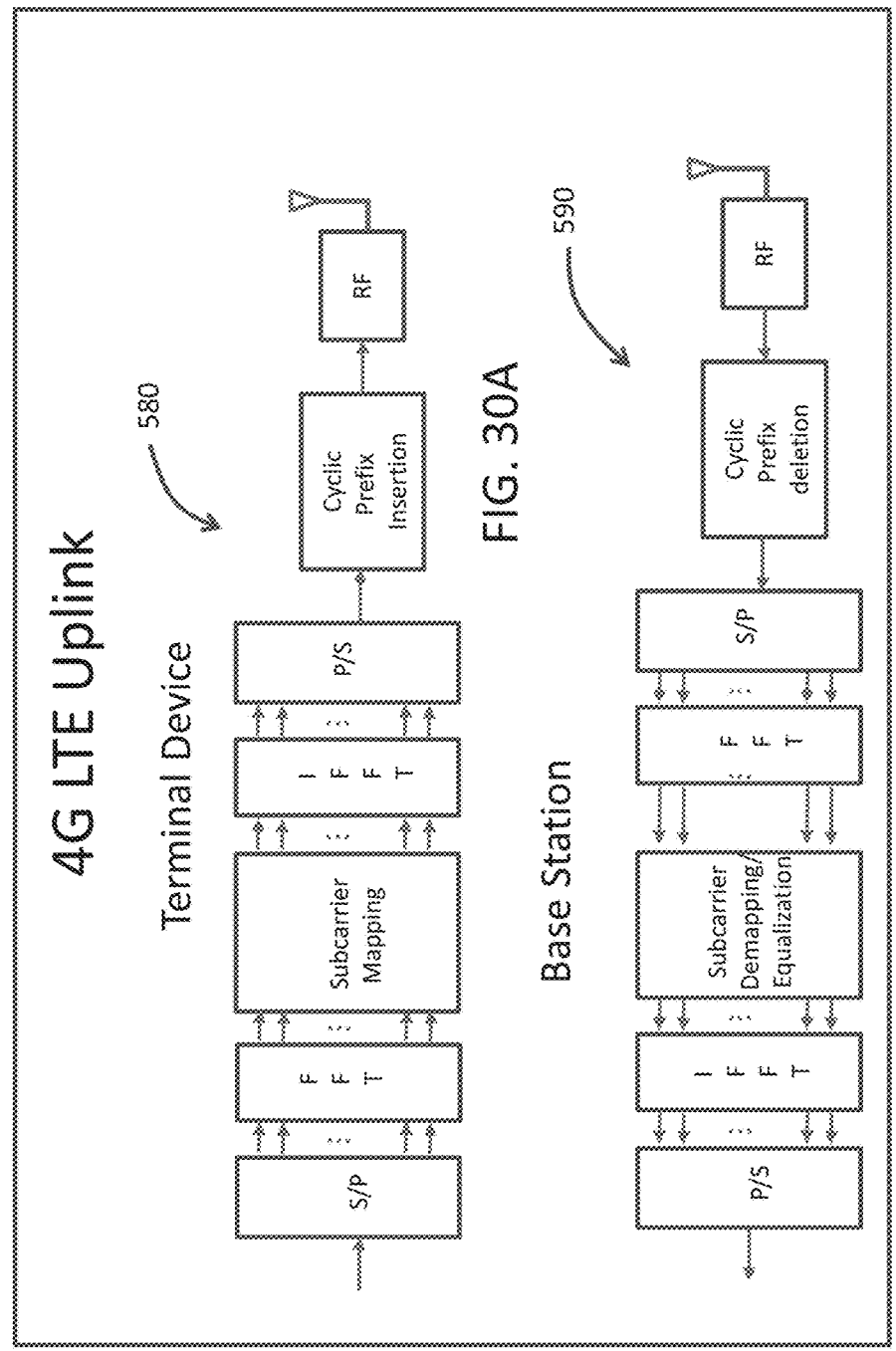

TIME-REVERSAL WIRELESS SYSTEMS HAVING ASYMMETRIC ARCHITECTURE

CROSS-REFERENCE TO RELATED APPLICATIONS

This application is the U.S. National Stage Application of International Application No. PCT/US14/51148, filed on Aug. 14, 2014, which claims priority to U.S. patent application Ser. No. 13/969,271, filed on Aug. 16, 2013, and U.S. patent application Ser. No. 13/969,320, filed on Aug. 16, 2013, now U.S. Pat. No. 9,559,874. The entire disclosures of the above applications are incorporated herein by reference.

TECHNICAL FIELD

This disclosure generally relates to time-reversal wireless systems having asymmetric architecture.

BACKGROUND

In some time-reversal communication systems, when a transceiver A intends to transmit information to a transceiver B, transceiver B first sends a waveform that propagates through a scattering and multi-path environment, and the signals are received by transceiver A. Transceiver A transmits time-reversed signals back through the same channel to transceiver B. Based on channel reciprocity, a time-reversal communication system leverages the multi-path channel as a matched filter, i.e., treats the environment as a facilitating matched filter computing machine, and focuses the wave at the receiver in both space and time domains.

SUMMARY

In general, in one aspect, a method for time-reversal wireless communication comprises at a transceiver, receiving a channel response signal derived from a probe signal sent from a first device to the transceiver through multiple wireless propagation paths; calculating a signature waveform for the first device based on the channel response; receiving combined signals that include a signal from the first device and a signal from a second device; and determining the signal from the first device based on the combined signals and the signature waveform for the first device.

Implementations of the method may include one or more of the following features. Determining the signal from the first device comprises performing a convolution operation, or an operation equivalent to the convolution operation, between the combined signals and the signature waveform for the first device.

Determining the signal from the first device can include filtering the combined signals using the signature waveform as a filtering parameter.

The signature waveform for the first device can be a time-reversed waveform of the channel response signal derived from the probe signal sent from the first device.

In some examples, the channel response signal can be represented as h(t) and the signature waveform for the first device can be represented as h*(T−t), t representing time, and T representing a delay spread of the multiple propagation paths. In some examples, the channel response signal can be represented as h[k] and the signature waveform for the first device can be represented as h*[L−k], k being an integer, and L representing a delay spread of the multiple propagation paths.

The method can include transmitting, from the transceiver to the first receiver and a second receiver, a combined downlink signal derived from a combination of a first downlink waveform and a second downlink waveform, the first downlink waveform including data intended for the first device, the second downlink waveform including data intended for the second device.

The method can include generating the first downlink waveform based on the data intended for the first device and the signature waveform for the first device.

Generating the first downlink waveform can include performing a convolution of the data intended for the first device and the signature waveform for the first device.

The combined downlink signal can be configured to enable each of the first device and the second device to receive multipath signals that can be used determine a data signal intended for the device, the first and second devices receiving the downlink signal through different propagation paths and determining different data signals.

The transceiver can be part of a base station.

Receiving combined signals can include receiving combined signals that include signals from three or more devices communicating with the transceiver, each of the devices being associated with a corresponding signature waveform.

In some examples, the first device does not calculate the signature waveform. The first device does not perform any signal processing that uses the signature waveform.

In general, in another aspect, an apparatus for time-reversal wireless communication comprises an input circuit configured to, during a hand-shake period, receive a channel response signal derived from a probe signal sent from a first device to the apparatus through multiple wireless propagation paths, and during an uplink transmission period, receive combined signals that include a signal from the first device and a signal from a second device; and a data processor configured to calculate a signature waveform for the first device based on the channel response, and determine the signal sent from the first device during the uplink transmission period based on the combined signals and the signature waveform for the first device.

Implementations of the apparatus may include one or more of the following features. The apparatus can include a base station that includes the input circuit and the data processor.

The data processor can determine the signal sent from the first device by performing a convolution operation, or an operation equivalent to the convolution operation, between the combined signals and the signature waveform for the first device.

The data processor can determine the signal sent from the first device by filtering the combined signals using the signature waveform as a filtering parameter.

The data processor can determine the signature waveform for the first device by generating a time-reversed waveform of the channel response signal derived from the probe signal sent from the first device.

In some examples, the channel response signal can be represented as h(t) and the signature waveform for the first device can be represented as h*(T−t), t representing time, and T representing a delay spread of the multiple propagation paths. In some examples, the channel response signal can be represented as h[k] and the signature waveform for the first device can be represented as h*[L−k], k being an integer, and L representing a delay spread of the multiple propagation paths.

The data processor can be configured to determine a combined downlink signal derived from a combination of a first downlink waveform and a second downlink waveform, the first downlink waveform including data intended for the first device, the second downlink waveform including data intended for the second device.

The data processor can be configured to determine the first downlink waveform based on the data intended for the first device and the signature waveform for the first device.

The data processor can determine the first downlink waveform by performing a convolution, or an operation equivalent to the convolution, of the data intended for the first device and the signature waveform for the first device.

The combined downlink signal can be configured to enable each of the first device and the second device to receive multipath signals that can be used determine a data signal intended for the device, the first and second devices receiving the downlink signal through different propagation paths and determining different data signals.

The input circuit can be configured to receive combined signals that include signals from three or more devices that communicate with the apparatus, and the data processor is configured to calculate a signature waveform for each of the devices.

In some examples, the first device does not calculate the signature waveform. The first device does not perform any signal processing that uses the signature waveform.

In general, in another aspect, a method of communication between a transceiver and multiple devices using wireless multi-path signals is provided. The method comprises performing a hand-shake process between the transceiver and the devices, in which for each device, the transceiver receives a channel response signal derived from a probe signal sent from the device to the transceiver through multiple propagation paths; calculating a signature waveform for each of the devices based on the channel response derived from the probe signal sent from the device; receiving a combined uplink signal that includes uplink signals from two or more devices; and determining the uplink signal from each one of the devices based on the combined uplink signal and the signature waveform for the device.

Implementations of the method may include one or more of the following features. The transceiver can be part of a base station.

In some examples, the devices do not calculate any signature waveform. The devices do not perform any signal processing that uses the signature waveform.

In general, in another aspect, a method of asymmetric time-reversal communication between a plurality of devices using wireless multi-path signals is provided. The method comprises performing a first hand-shake process between the first and second devices, in which the first device receives a channel response signal derived from a probe signal sent from the second device to the first device through multiple wireless propagation paths; performing a second hand-shake process between the first and third devices, in which the first device receives a channel response signal derived from a probe signal sent from the third device to the first device through multiple wireless propagation paths; at the first device, calculating a signature waveform for the second device based on the channel response derived from the probe signal sent from the second device; at the first device, calculating a signature waveform for the third device based on the channel response derived from the probe signal sent from the third device; at the first device, receiving a combined uplink signal that includes uplink signals from the second and third devices; at the first device, determining the uplink signal from the second device based on the combined uplink signal and the signature waveform for the second device; and at the first device, determining the uplink signal from the third device based on the combined uplink signal and the signature waveform for the third device.

Implementations of the method may include one or more of the following features. The second and third devices do not calculate any signature waveform.

The method can include transmitting, from the first device to the second and third devices, a combined downlink signal derived from a combination of a second downlink waveform and a third downlink waveform, the second downlink waveform including data intended for the second device, the third downlink waveform including data intended for the third device.

The second downlink waveform can be embedded with the signature waveform corresponding to the second device.

The method can include at the second device, receiving a signal intended for the second device without performing any signal processing that uses the signature waveform corresponding to the second device.

The method can include at the first device, generating the second downlink waveform based on the data intended for the second device and the signature waveform for the second device.

Generating the second downlink waveform can include performing a convolution of the data intended for the second device and the signature waveform for the second device.

The combined downlink signal can be configured to enable each of the second and third devices to receive multipath signals that can be used determine a data signal intended for the device, the second and third devices receiving the combined downlink signal through different propagation paths and determining different data signals.

Determining the uplink signal from the second device can include performing a convolution operation, or an operation equivalent to the convolution operation, between the combined uplink signal and the signature waveform for the second device.

Determining the uplink signal from the second device can include filtering the combined uplink signal using the signature waveform corresponding to the second device as a filtering parameter.

The signature waveform for the second device can be a time-reversed waveform of the channel response signal derived from the probe signal sent from the second device.

In some examples, the channel response signal derived from the probe signal sent from the second device can be represented as $h(t)$ and the signature waveform for the second device can be represented as $h^*(T-t)$, t representing time, and T representing a delay spread of the multiple propagation paths. In some examples, the channel response signal derived from the probe signal sent from the second device can be represented as $h[k]$ and the signature waveform for the second device can be represented as $h^*[L-k]$, k being an integer, and L representing a delay spread of the multiple propagation paths.

The first device can include a base station.

Receiving a combined uplink signal can include receiving a combined uplink signal that includes signals from the second and third devices, and one or more additional devices communicating wirelessly with the first device, each of the devices being associated with a corresponding signature waveform.

The details of one or more implementations of an asymmetric time-reversal wireless system are set forth in the accompanying drawings and the description below. Other features, aspects, and advantages will become apparent from the description, the drawings, and the claims.

BRIEF DESCRIPTION OF THE DRAWINGS

FIG. 28A is a diagram of an exemplary transmitter based on Wi-Fi protocol.

FIG. 28B is a diagram of an exemplary receiver based on Wi-Fi protocol.

FIG. 29A is a diagram of an exemplary transmitter at a base station for downlink transmission based on 4G LTE protocol.

FIG. 29B is a diagram of an exemplary receiver at a terminal device for downlink transmission based on 4G LTE protocol.

FIG. 30A is a diagram of an exemplary transmitter at the terminal device for uplink transmission based on 4G LTE protocol.

FIG. 30B is a diagram of an exemplary receiver at the base station for uplink transmission based on 4G LTE protocol.

Like reference symbols in the various drawings indicate like elements.

DETAILED DESCRIPTION

Figure 1:
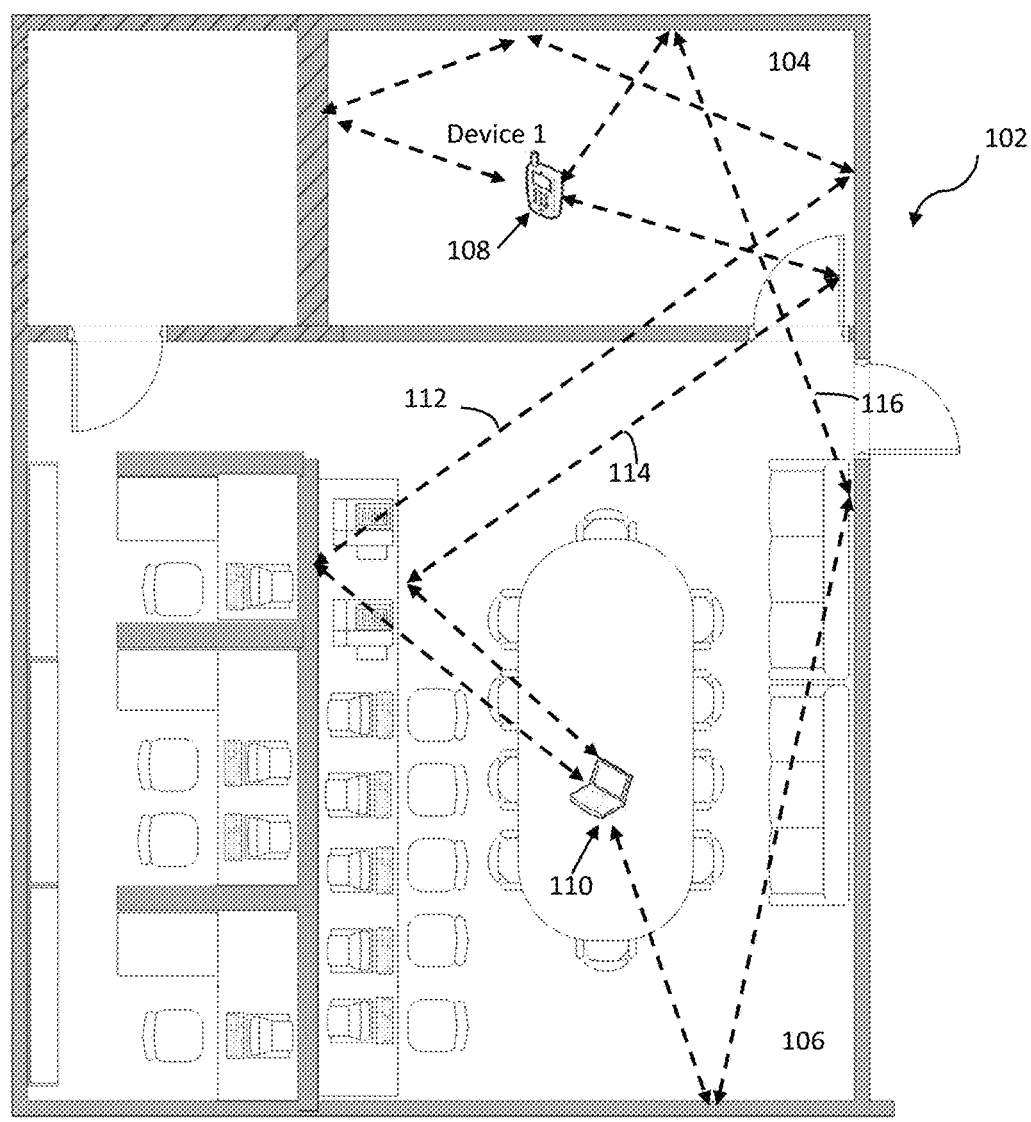
FIG. 1 is a diagram showing an exemplary environment for operating a time-reversal system.

This disclosure describes a novel asymmetric multi-user time reversal wireless communication system architecture for both downlink and uplink communication between a base station (BS) and multiple terminal devices (TDs). In some implementations, the complexities of the base station and the terminal devices are asymmetric, such that the base station performs most of the signal processing as both a transmitter (for the downlink) and receiver (for the uplink), allowing the use of low complexity terminal devices.

For example, an intelligent house may include one or more computers that communicate with several sensors (e.g., temperature, humidity, light, and motion sensors), meters (e.g., electricity and water meters), appliances (e.g., refrigerator, oven, washing machine), electronic devices (e.g., television, digital video recorder, audio/video system, telephone, digital photo album, intelligent lamp, security system), climate control systems (e.g., fans, thermostats for air conditioning and heating, motorized shades), power generators (e.g., backyard wind turbine, solar panel, geothermal energy system).

To reduce the cost of communication, it may be preferable that the devices communicating with the computer be simple without the need to perform complex signal processing. The computer may function as a base station or be coupled to a base station that performs most of the signal processing when transmitting signals to the devices and receiving signals sent from the devices.

For example, an intelligent factory may include one or more computers that communicate wirelessly with robots working in assembly lines, vehicles that move supplies and assembled products, climate control systems, security systems, inventory control systems, and power systems. For example, a laboratory may include one or more computers that communicate wirelessly with instruments that monitor parameters when conducting experiments.

In the examples above, the computer can communicate with the devices using time-reversal division multiple access technology that uses the environment to provide spatial filtering, allowing a large number of devices to communicate with the computers simultaneously. Compared to using previous wireless communication technologies, such as Wi-Fi or Bluetooth, time-reversal division multiple access has the advantage that the additional cost for enabling each device to communicate with the computer is small because the device itself does not need to perform complicated signal processing. Most of the signal processing is performed at the computer. The power consumption by each device for enabling wireless communication may also be much smaller compared to previous wireless technologies.

Because the signals are transmitted through multiple propagation paths having various propagation lengths, there may be a large delay spread, and it may be possible for the computer to receive the tail end of the signal of an earlier symbol and the front end of a later symbol at the same time, resulting in inter-symbol interference. During an uplink cycle, multiple devices may transmit signals to the computer at the same time, so the computer may receive a combined signal having components from several devices. The time-reversal system may use signature waveforms associated with each device to identify the signal components for each device. After using the signature waveforms as a filtering mechanism to identify individual signal components, there may still be interference among signals from different devices. To increase the accuracy of communication, the computer may perform signal processing to cancel inter-symbol interference and/or inter-user interference.

Compared to previous multi-carrier techniques used to reduce inter-symbol interference, such as orthogonal frequency-division multiplexing (OFDM) or orthogonal frequency-division multiple access (OFDMA), the time-reversal divisional multiple access technology leverages the unique temporal and spatial focusing effects of the time reversal phenomenon to provide cost-effective single-carrier broadband multi-user communication.

The time-reversal division multiple access scheme uses the multi-path channel profile associated with each user's location as a location-specific signature for the user. Each path of the multi-path channel can be treated as a virtual antenna in the time-reversal division multiple access system, which collectively results in very high-resolution spatial focusing with potentially "pin-point" accuracy. Meanwhile, the temporal focusing effect can effectively suppress inter-symbol interference which significantly simplifies the terminal user's complexity and gives rise to higher-speed data transmission.

The computer may function as a base station or be coupled to a base station that performs most of the signal processing when transmitting signals to the devices and receiving signals sent from the devices. A 2D parallel interference cancellation scheme may allow multiple devices to communicate with the computer at the same time with reduced interference. For a specified bit error rate and data transmission rate, the 2D parallel interference cancellation scheme can allow more devices to communicate with the computer simultaneously. For a specified bit error rate and number of devices, the 2D parallel interference cancellation scheme can allow the devices to communicate with the computer at higher data transmission rates.

Overview of Time-Reversal System

The following provides an overview of a time-reversal multiuser downlink system. Referring to FIG. 1, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths may be referred to as a multipath signal. As the signal travels through the propagation paths, the signal may become distorted. The multipath signal received by the second device 110 can be quite different from the signal transmitted by the first device 108.

Figure 2A:
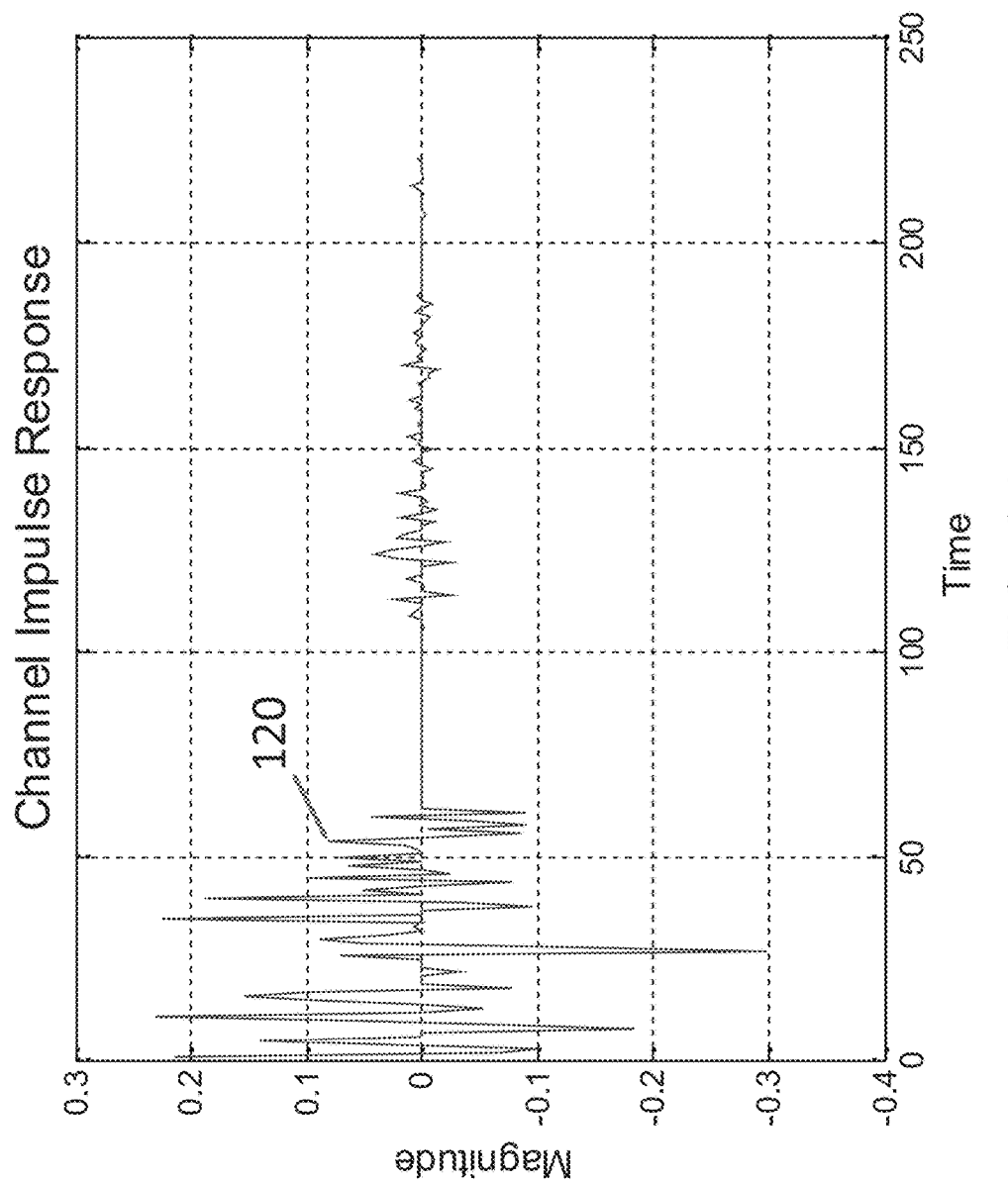
FIG. 2A is a graph of an exemplary recorded channel response waveform.

For example, referring to FIG. 2A, when the first device 108 sends a pulse signal, the signal received by the second device 110 may have a waveform 120. The waveform 120 may be referred to as the channel impulse response signal.

Figure 2B:
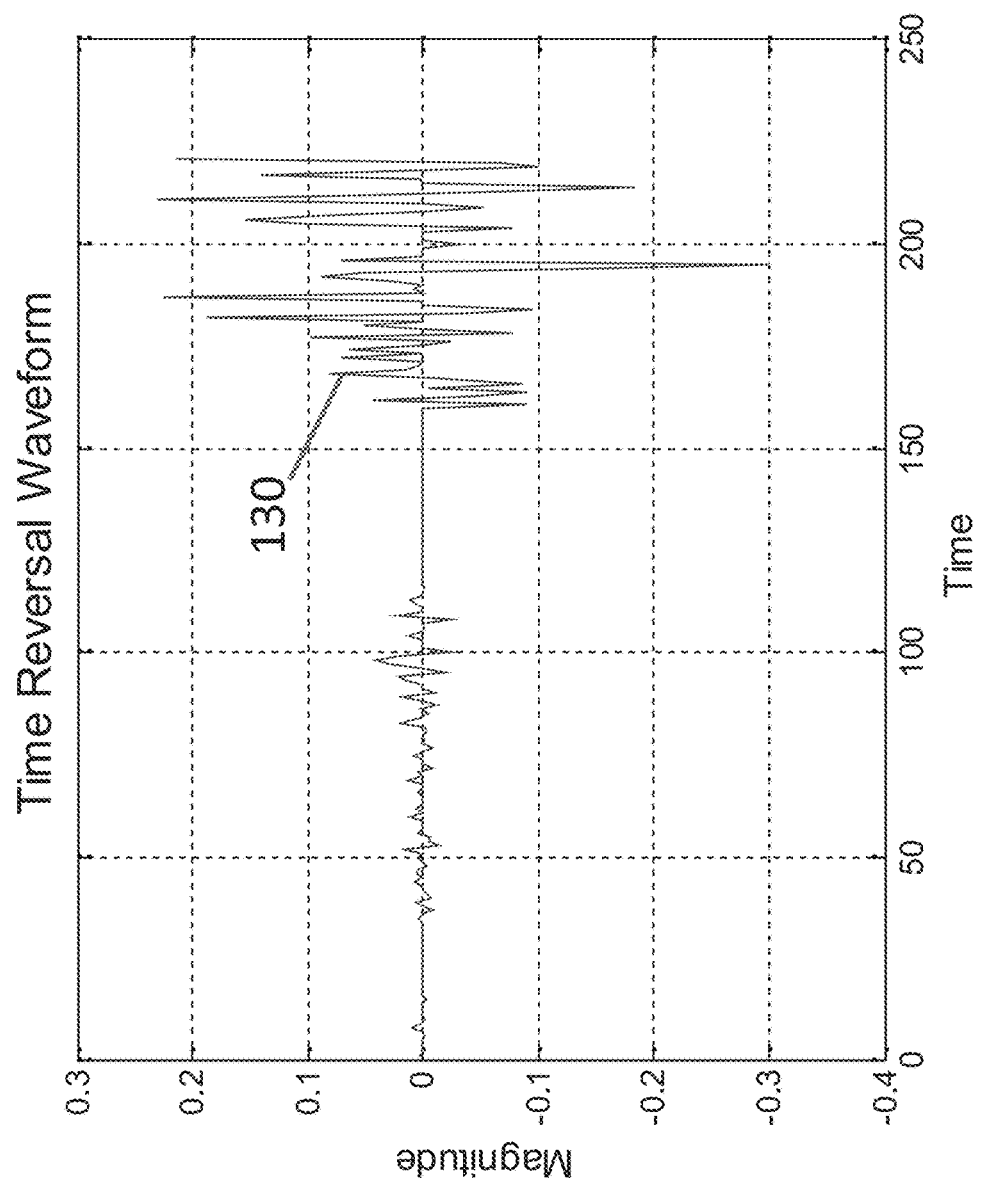
FIG. 2B is a graph of an exemplary time-reversed waveform generated by reversing the waveform of FIG. 2A with respect to time.

Referring to FIG. 2B, a time-reversed waveform 130 can be generated by reversing the waveform 120 with respect to time. If the second device 110 sends a signal having the waveform 130, the signal will propagate in various directions, including through propagation paths 112, 114, and 116 (in reverse direction relative to the propagation direction of the impulse signal), and reach the first device 108. The multipath signal received at the first device 108 may form an impulse signal that is similar to the impulse signal previously sent from the first device 108 to the second device 110.

The waveforms 120 and 130 shown in FIGS. 2A and 2B are merely examples. The waveforms in time-reversal systems can vary depending on, e.g., the environment and the information or data being transmitted. In addition, the initial signal sent from the first device 108 can be any sort of signal, of which an impulse is just one example. The initial signal can be any waveform.

When the second device 110 intends to transmit a data stream to the first device 108, the second device 110 may use a normalized time-reversed conjugate of the signal received from device 108 as a basic transmission waveform. The second device 110 may encode the data stream on the basic waveform and transmit the signal through the wireless channel. The signal received at the device 108 may be described as the convolution of the transmitted signal and the channel impulse response, plus additive white Gaussian noise. Because the transmitted signal has been designed based on a time reversed version of the channel impulse response, the first device 108 may only need to perform a simple adjustment to the received signal and down-sample it to recover the data stream transmitted by the second device 110.

In some examples a transmitting device or base station or access point may send signals to two or more receiving devices at the same time. The transmitted signals travel through multiple propagation paths to each receiver. Because the receivers are positioned at different locations, the multipath signals travel through different propagation paths to reach the receivers. By carefully constructing the waveform of the signal sent from the transmitter, it is possible to allow each receiver to receive data intended for the receiver with sufficiently high quality.

Figure 3:
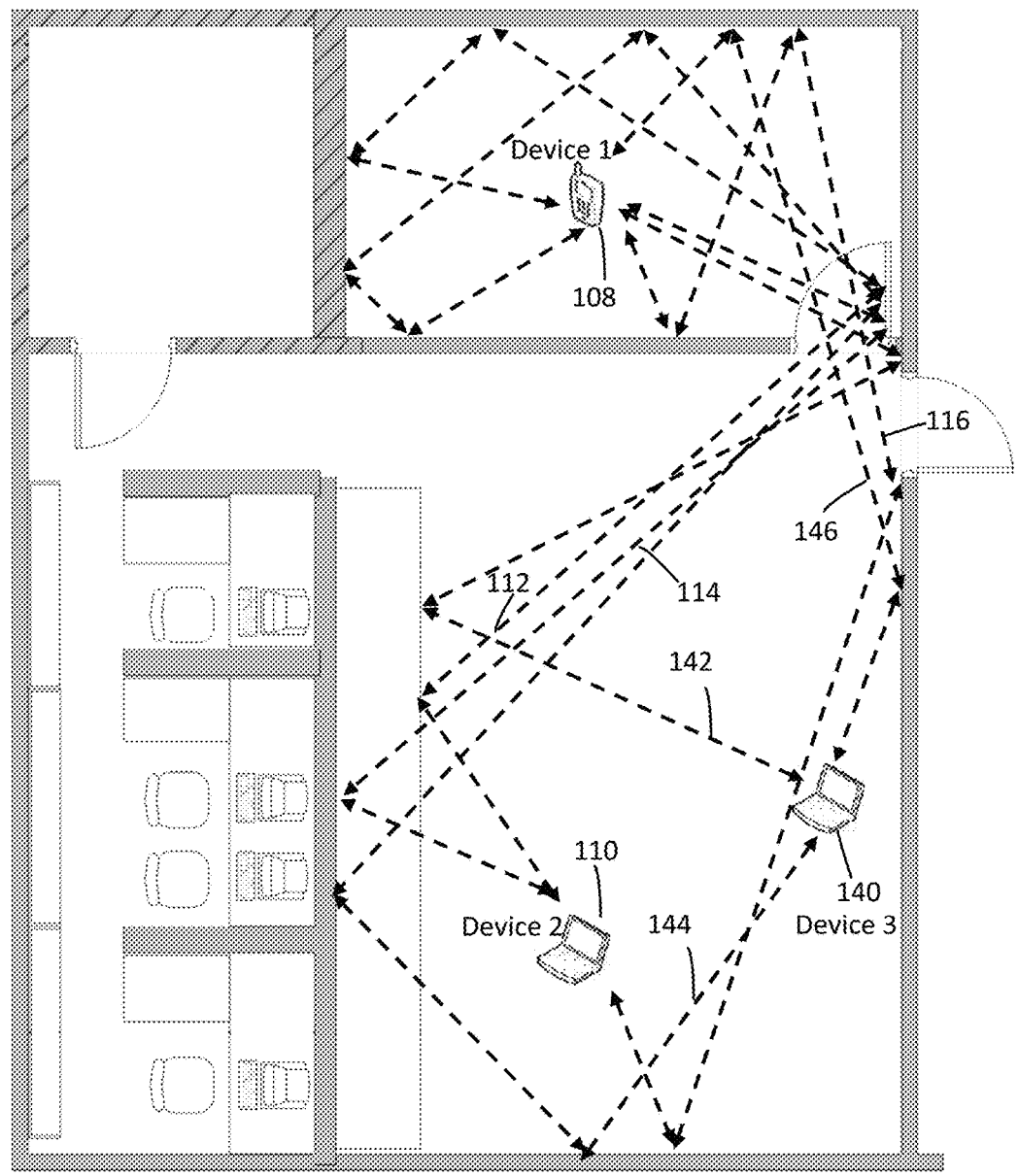
FIG. 3 is a diagram showing an exemplary environment for operating a time-reversal system having multiple receivers.

Referring to FIG. 3, the first device 108 may communicate with the second device 110 and a third device 140. The second device 110 may send a probe signal that travels through propagation paths 112, 114, and 116 to the first device 108. The probe signal can be, e.g., a pulse signal, a signal that has a predetermined waveform, or a signal that includes symbols. The first device 108 may record the received waveform representing the channel response for a first multipath channel. The third device 140 may send a probe signal that travels through propagation paths 142, 144, and 146 to the first device 108. The first device 108 may record the received waveform representing the channel response for the second multipath channel.

The first device 108 may construct a downlink signal based on a first time-reversed multipath channel response, a second time-reversed multipath channel response, a first data stream intended for the second device receiver 110, and a second data stream intended for the third device receiver 140. The first device 108 may transmit the downlink signal so that a first portion of the downlink signal travels through propagation paths 112, 114, and 116 to reach the second device 110. A second portion of the downlink signal may travel through propagation paths 142, 144, and 146 to reach the third device 140. The first signal portion received at the second device 110 may form a first data stream. The second signal portion received at the third device 140 may form a second data stream.

In the example of FIG. 3, the device operating as a transmitter may use either an omnidirectional antenna or a directional antenna for broadcasting the downlink signal, as long as the downlink signal reaches each of the receivers through multiple propagation paths. In some systems, the transmitting antenna may use beam-forming techniques to launch a signal that undergoes a large number of reflections. That is, the transmitter may launch a wireless signal that preferentially experiences multiple transmission paths.

In some examples, a multiple input multiple output (MIMO) system may be used in which the device operating as a transmitter has multiple transmit antennas, and each of the devices operating as a receiver has multiple receive antennas. In some systems, the MIMO transmitting antennas may launch signals that undergo a large number of reflections. That is, the transmitter may launch a wireless signal that preferentially experiences multiple transmission paths.

System Architecture

Figure 4:
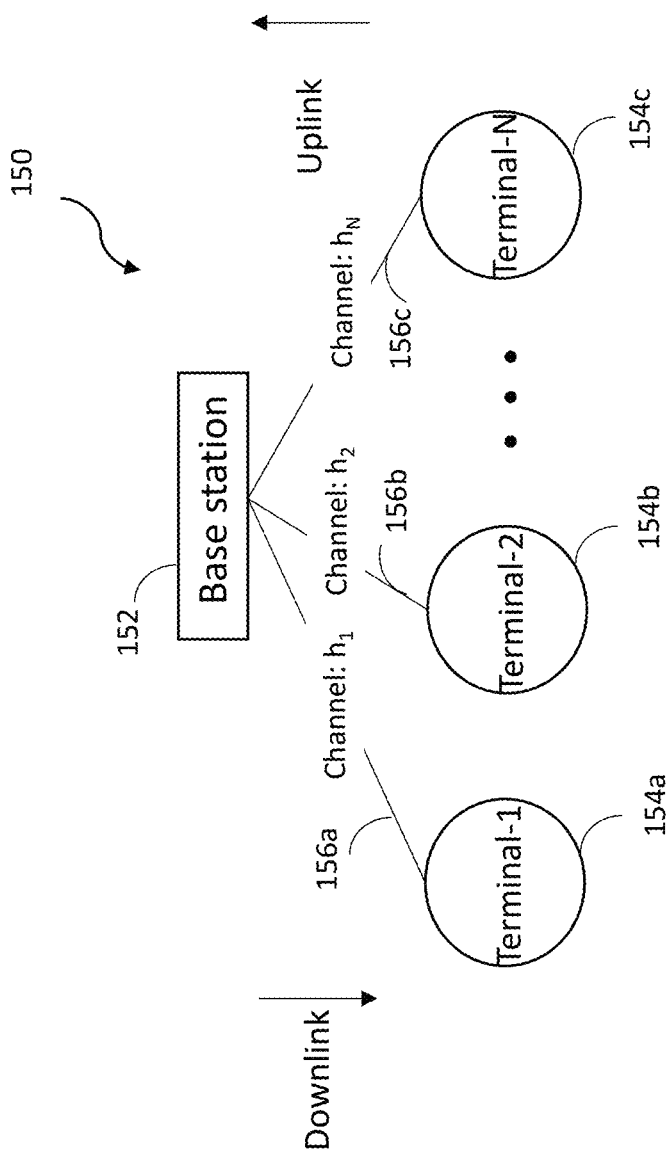
FIG. 4 is a diagram of an exemplary multi-user time reversal communication system.

Referring to FIG. 4, an exemplary multi-user time reversal communication system 150 includes a base station (BS) 152 and multiple terminal devices (e.g., 154a, 154b, 154c, collectively 154). Each of the terminal devices 154 is associated with a multi-path wireless channel (e.g., 156a, 156b, 156c, collectively 156) between itself and the base station 152. Each multi-path wireless channel 156 in the figure represents two or more multiple signal propagation paths between the corresponding terminal and the base station. In some implementations, all the devices (including the base station 152 and the terminals 154) can operate at the same frequency band. For the downlink, the base station 152 can send multiple messages (either independent or non-independent) simultaneously to multiple selected terminals 154. For the uplink, multiple terminals 154 can send their own messages to the base station 152 simultaneously.

Hand-Shake Process

The following describes an exemplary hand-shaking process between the base station 152 and the terminals 154.

Figure 5:
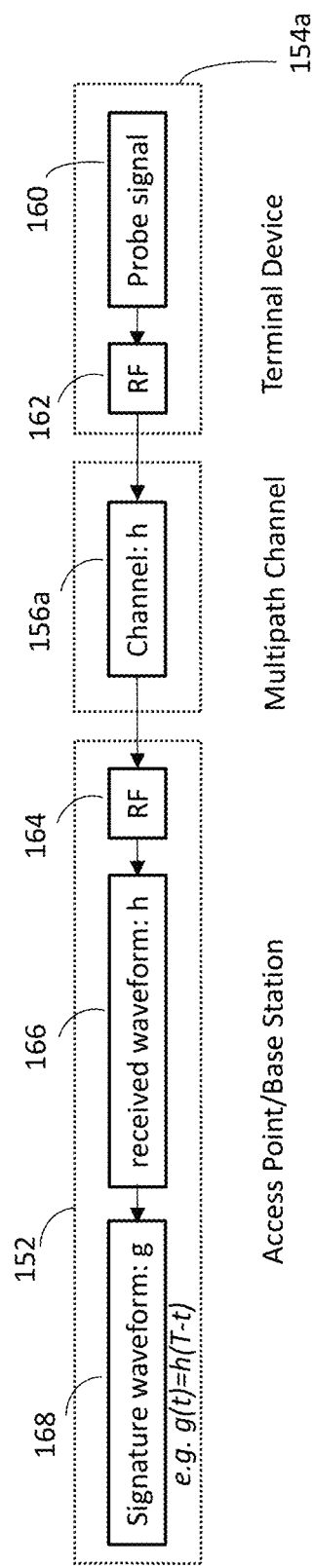
FIG. 5 is a diagram showing a hand-shaking process.

Referring to FIG. 5, in some implementations, after each terminal device 154 registers with the base station 152, a hand-shaking process may occur periodically in a round-robin manner among the registered terminal devices 154 to maintain an up-to-date record of the channel responses associated with the terminal devices 154 at the base station 152.

During the hand-shaking process, at a given time, only one selected terminal, e.g., 154a, may send a probe signal 160, and may perform radio frequency modulation 162 to produce a radio frequency signal that propagates through the associated multi-path channel 156a to the base station 152. The probe signal 160 can be, e.g., a pulse signal, a signal that has a predetermined waveform, or a signal that includes symbols to enable the base station to perform synchronization and/or other functions. In the examples below, the probe signal is a pulse signal. However, other types of probe signals can be used in the system 150. The base station 152 may receive the transmitted radio frequency signal, perform radio frequency demodulation 164 to recover the unique channel response (waveform) 166 and record it. When the selected terminal, e.g., 154a, is performing the hand-shaking process with the base station 152, the other terminals, e.g., 154b and 154c, remain silent. Upon receiving the channel response 166 associated with the terminal 154a, the base station 152 calculates a signature waveform g 168 for the terminal 154a based on its channel response received at the base station 152.

For example, one of the basic signature waveforms for a terminal associated with a channel response h(t) can be h*(T−t), which is a time-reversed waveform of the channel response, with T representing the delay spread of the multi-path channel. If h(t) is a complex value, h*(T−t) is the time reverse and conjugation of the channel response h(t). In the discrete time domain, the channel response can be represented as h[k], and the corresponding signature waveform can be h*[L−k], in which L represents the delay spread of the multi-path channel.

The delay spread can be a measure of the multipath richness of a communications channel. In general, it can be interpreted as the difference between the time of arrival of the earliest significant multipath component (typically the line-of-sight component) and the time of arrival of the latest multipath component. For the discrete time model, by the definition of delay spread, when the delay spread is L, the total channel length is L+1.

The system 150 can use any type of waveform design that is designed for a variety of performance metrics, such as designed for reducing or minimizing inter-symbol interference and/or inter-user interference.

After the hand-shaking process, the calculated signature waveforms can be used for data transmissions during both the downlink and the uplink processes.

Downlink Transmission

The following describes an exemplary downlink transmission process.

Figure 6:
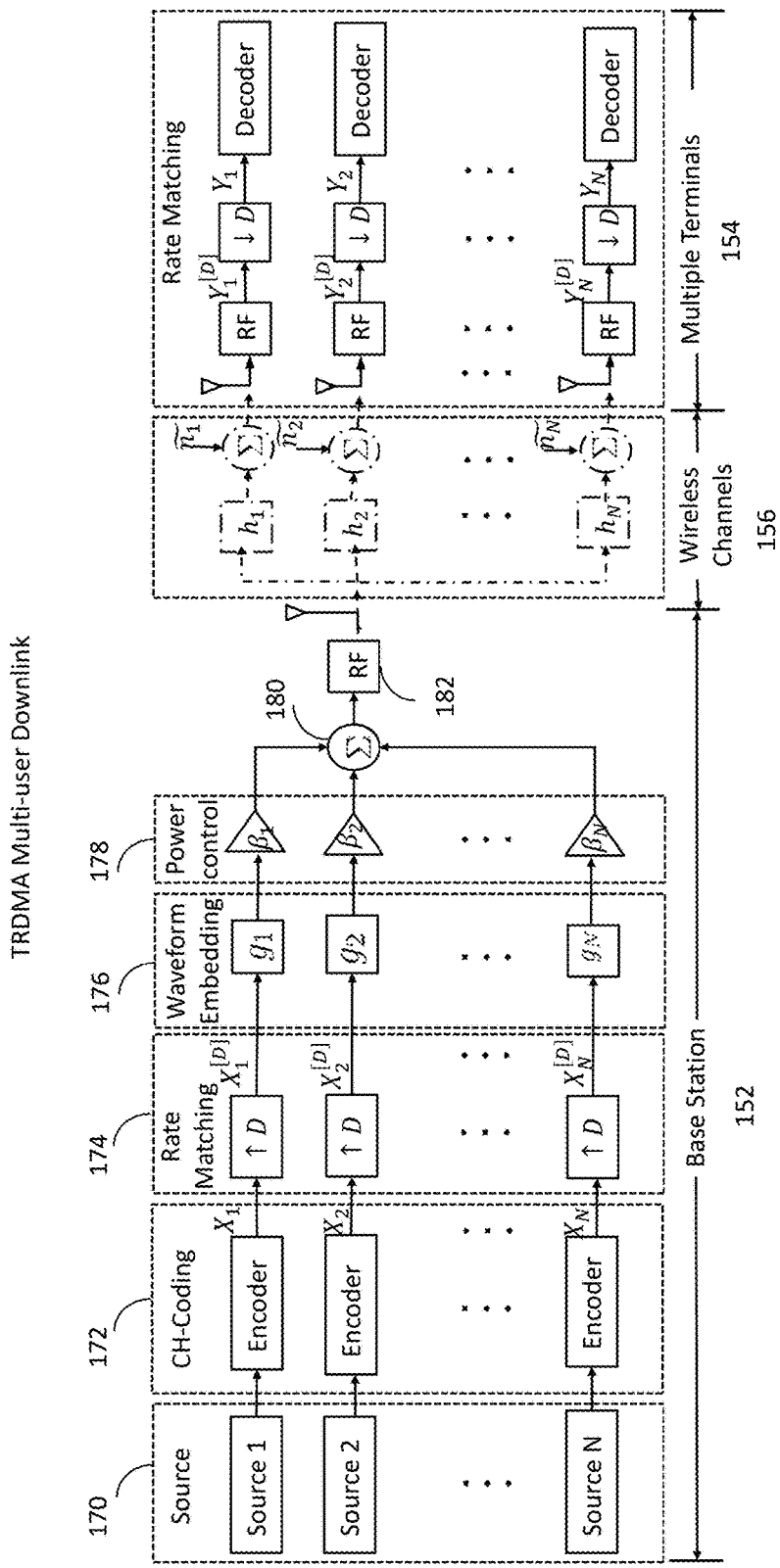
FIG. 6 is a diagram showing a down-link transmission process.

Referring to FIG. 6, assume that there are N active terminal devices 154 receiving data from the base station 152 concurrently. In some implementations, at the base station 152, there may be N independent information sources 170, each generating information bits to a corresponding terminal device 154. The information bits from the sources may be first encoded by channel-coding using encoders 172. The channel-coding process is optional and may be omitted in some implementations. The encoded bit-stream for any given terminal $i \in \{1, 2, \ldots N\}$ may be represented by a sequence of symbols $\{X_i[k]\}$.

A parameter referred to as the rate back-off factor D may be used to match the symbol rate (signal bandwidth) with the higher system's sampling rate (channel bandwidth). For any terminal's symbol sequence $\{X_i[k]\}$, $\forall i \in \{1, 2, \ldots N\}$, the rate matching process at the base station 152 may be performed by up-sampling the sequence of symbols by the factor D. The rate matching processes may be performed at rate matching modules 174. The up-sampled sequence of $\{X_i[k]\}$, $\forall i \in \{1, 2, \ldots N\}$ can be expressed as $$X_i^{[D]} = \begin{cases} X_i[k/D], & \text{if } k \bmod D = 0, \\ 0, & \text{if } k \bmod D \neq 0. \end{cases} \quad (\text{Equ. 1})$$

At the waveform embedding modules 176, the up-sampled sequences may be embedded with the calculated (based on the channel responses obtained in the handshaking process) signature waveform $g_i$, $\forall i \in \{1, 2, \ldots N\}$ by taking the convolution of the up-sampled symbol sequence and the corresponding signature waveform. As described above, one possible signature waveform is the time-reversed (and conjugated if the channel response is of complex values) channel response, i.e., $$g_i[k] = \frac{1}{\sqrt{\sum_{l=0}^{L}|h_i[l]|^2}} h_i^*[L-k]. \quad (\text{Equ. 2})$$

The output of the signature embedding block 176 for the i-th terminal is the convolution of $\{X_i^{[D]}[k]\}$ and $\{g_i[k]\}$, i.e.

$$(X_i^{[D]} * g_i)[k] = \sum_{l=0}^{L} g_i[l] X_i^{[D]}[k-l], \quad (\text{Equ. 3})$$

where (*) is the linear convolution.

After the signature embedding, each of the streams may be multiplied by a scalar power gain β to implement a power control mechanism at the power control module 178. All the streams (embedded with signature waveforms) may be multiplexed together by a summation module 180 to obtain a combined signal S[k]:

$$S[k] = \sum_{i=0}^{N} \beta_i (X_i^{[D]} * g_i)[k]. \quad (\text{Equ. 4})$$

The combined signal S[k] may be transmitted by the RF module 182 and may propagate through different multi-path channels $\{h_i[k]\}$ 156, for all $i \in \{1, 2, \ldots N\}$.

The signal received at the i-th terminal 154 is the multi-path channel output plus additive noise $\tilde{n}_i$.

$$Y_i^{[D]}[k] = (S * h_i)[k] + \tilde{n}_i[k] = \sum_{j=1}^{N} \beta_j (X_j^{[D]} * g_j * h_i)[k] + \tilde{n}_i[k]. \quad (\text{Equ. 5})$$

Due to the temporal focusing effect, the signal energy can be concentrated in a single time sample or close to a single time sample. Then, the i-th terminal 154 may not need to apply equalization to the received signal to recover the signal. The i-th terminal 154 may down-sample the received signal with the same factor D (to recover the signal's rate from the system's sampling rate to the symbol rate), producing $Y_i[k]$, represented as follows:

$$Y_i[k] = \sum_{j=1}^{N} \sum_{l=-\lfloor L/D \rfloor}^{\lfloor L/D \rfloor} \beta_j (g_j * h_i)[L+Dl] X_j[k-l] + n_i[k], \quad (\text{Equ. 6})$$

where $Y_i[k]$ is used to estimate $X_i[k]$, and $n_i[k] = \tilde{n}_i[Dk]$.

Upon obtaining $Y_i[k]$ at the i-th terminal ($\forall i \in \{1, 2, \ldots N\}$) 154, an estimation $\hat{X}_i[k]$ about $X_i[k]$ can be made based on the value of $Y_i[k]$. Then, the estimated/reconstructed symbol sequence $\{\hat{X}_i[k]\}$ can be fed into the decoder (which corresponds to the encoder) to recover the information bits at each individual terminal device.

Uplink Transmission

The following describes an exemplary uplink transmission process.

Figure 7:
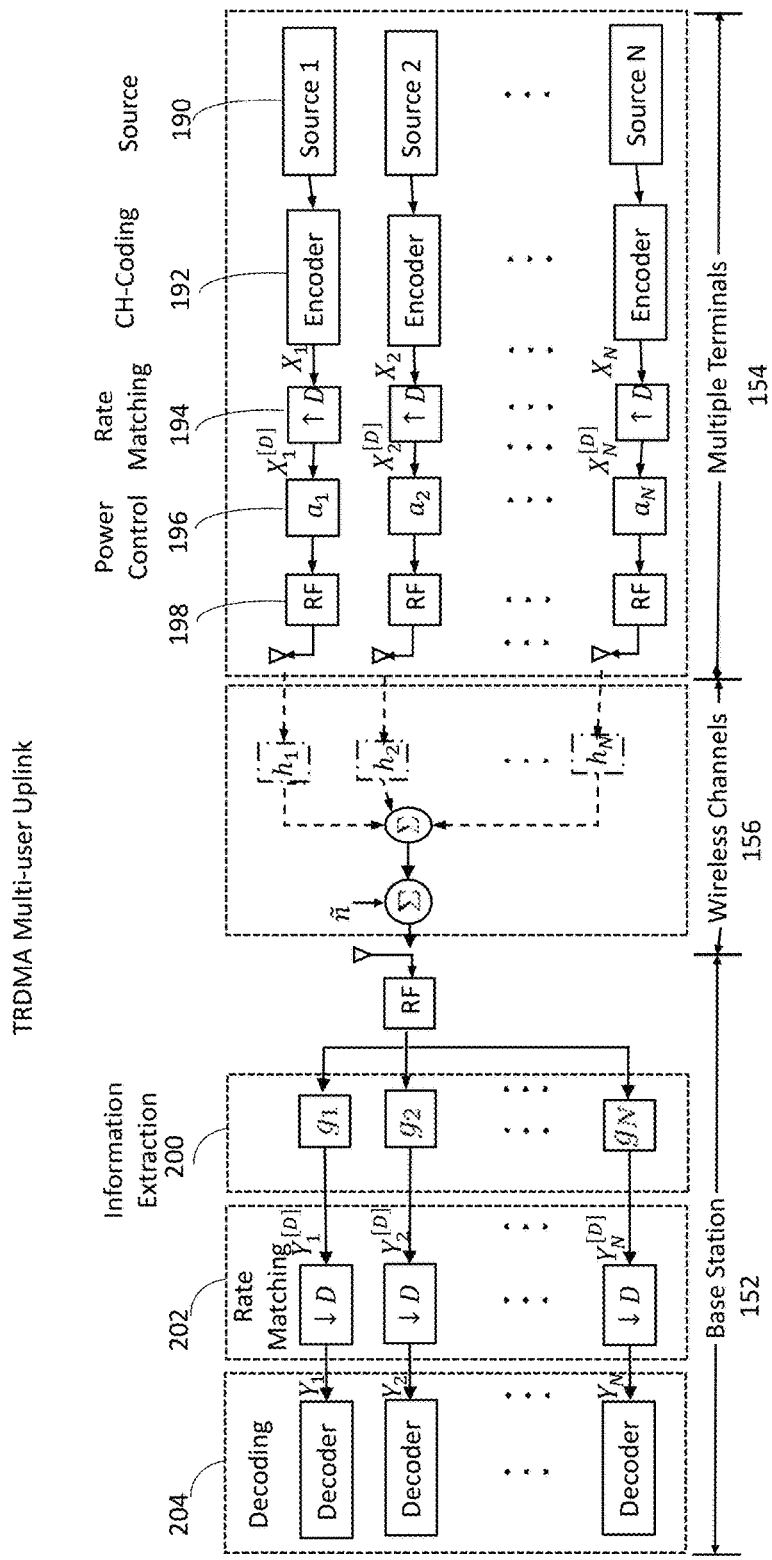
FIG. 7 is a diagram showing an up-link transmission process.

Referring to FIG. 7, for the uplink, assume that there are N active terminal devices 154 transmitting their own data to the base station 152 concurrently. Each terminal device 154 may have its own information source 190 which may be independent of others.

At each terminal device 154, the information bits may be first encoded by the channel coding block 192. Then, the coded symbols $\{X_i[k]\}$ ($\forall i \in \{1, 2, \ldots N\}$) may be up-sampled by the rate back-off factor D for rate matching at the rate matching module 194.

The up-sampled symbol sequence for the i-th terminal can be expressed as $$X_i^{[D]} = \begin{cases} X_i[k/D], & \text{if } k \bmod D = 0, \\ 0, & \text{if } k \bmod D \neq 0. \end{cases} \quad (\text{Equ. 7})$$

The scaling factors $\{a_i\}$ may be used to implement power control at the power control module 196. After multiplying with scaling factor, the sequence of $a_i\{X_i^{[D]}[k]\}$, for all $i \in \{1, 2, \ldots N\}$, may be transmitted by the RF module 198.

When the sequence $a_i\{X_i^{[D]}[k]\}$ propagates through its wireless channel $\{h_i[k]\}$ 156, the convolution between $a_i\{X_i^{[D]}[k]\}$ and the channel impulse response $\{h_i[k]\}$ is automatically taken as the channel output for the i-th terminal. Since each terminal's multi-path channel response is unique, the automatic convolution between the $a_i\{X_i^{[D]}[k]\}$ and $\{h_i[k]\}$ is mathematically similar to the base station's signature embedding process in the downlink.

All of the channel outputs for the N terminal devices 154 may be mixed together in the air plus the additive noise at the base station 152. As a result, the mixed signal received at the base station 152 can be written as $$Z[k] = \sum_{i=0}^{N} a_i (X_i^{[D]} * g_i)[k] + \tilde{n}[k]. \quad (\text{Equ. 8})$$

Upon receiving the mixed signal as shown above, the base station 152 may pass this mixed signal through an information extraction module that can include a filter bank 200 of the calculated signature waveforms $g_i$, $\forall i \in \{1, 2, \ldots N\}$, each of which may perform the convolution between its input signal Z[k] and the corresponding terminal device's signature waveform $\{g_i[k]\}$. Such a convolution using the signature waveform may extract the useful signal component and suppress the signals of other terminal devices. As the output of the i-th filter, the convolution can be represented as $$Y_i^{[D]}[k] = \sum_{j=1}^{N} a_j(X_j^{[D]} * h_j * g_i)[k] + (g_i * \tilde{n})[k] = \quad \text{(Equ. 9)}$$

$$\sum_{j=1}^{N} \sum_{l=0}^{2L} a_j(h_j * g_i)[l]X_j^{[D]}[k-l] + (g_i^* \tilde{n})[k].$$

If the time reversal waveform is used for $\{g_i[k]\}$, in the above equation, the highest gain for the i-th terminal's symbol may be achieved at the temporal focusing time $l=L$, with $$(h_i^* g_i)[L] = \sqrt{\sum_{l=0}^{L} |h_i[l]|^2} . \quad \text{(Equ. 10)}$$

The rate matching may be performed by down-sampling (with the same factor D) the filter bank's output signal at the rate matching module 202 to recover the original symbol rate of each terminal 154.

After the rate matching, the down-sampled symbol sequence $\{Y_i[k]\}$ can be obtained as $$Y_i[k] = \sum_{j=1}^{N} \sum_{l=-\lfloor L/D \rfloor}^{\lfloor L/D \rfloor} a_j(g_i * h_j)[L+Dl]X_j[k-l] + n_i[k] \quad \text{(Equ. 11)}$$

where the colored noise $n_i[k] = \sum_{l=0}^{L} g_i[l]\tilde{n}_i[Dk-l]$.

Based on $Y_i[k]$ ($\forall i \in \{1, 2, \ldots N\}$), an estimation $\hat{X}_i[k]$ about $X_i[k]$ can be made. Then, the estimated/reconstructed symbol sequence $\{\hat{X}_i[k]\}$ can be fed into the corresponding decoder 204 to recover the information bits from each terminal device at the base station 152.

Simulation Results

The following describes results of simulation of the system 150 under various conditions.

In the simulation, the IEEE 802.15.4a (broadband) channel model was used to evaluate the effectiveness of the proposed system. In the examples shown here, the typical delay spread of the outdoor channels are between 200 ns and 400 ns, and the typical delay spread of the indoor channels are between 70 ns and 120 ns. Without loss of generality, and for the exemplary embodiments described here, the following system parameters were used to in the simulation:

| IEEE 802.15.4a Outdoor Channel Model | |
|---|---|
| System sampling rate | 1 GHz |
| Rate back-off factor: D | 32, 64 |
| $E_b/N_0$ (energy per bit to noise power spectral density ratio) | 0 dB~20 dB |
| Number of concurrent terminals: N | 2, 4 |
| Coding Scheme | None (Uncoded) |
| Power Control Scheme | Equal-Power Allocation |

| IEEE 802.15.4a Indoor Channel Model | |
|---|---|
| System sampling rate | 1 GHz |
| Rate back-off factor: D | 16, 32 |
| $E_b/N_0$ | 0 dB~20 dB |
| Number of concurrent terminals: N | 2, 4 |
| Coding Scheme | None (Uncoded) |
| Power Control Scheme | Equal-Power Allocation |

Figure 8:
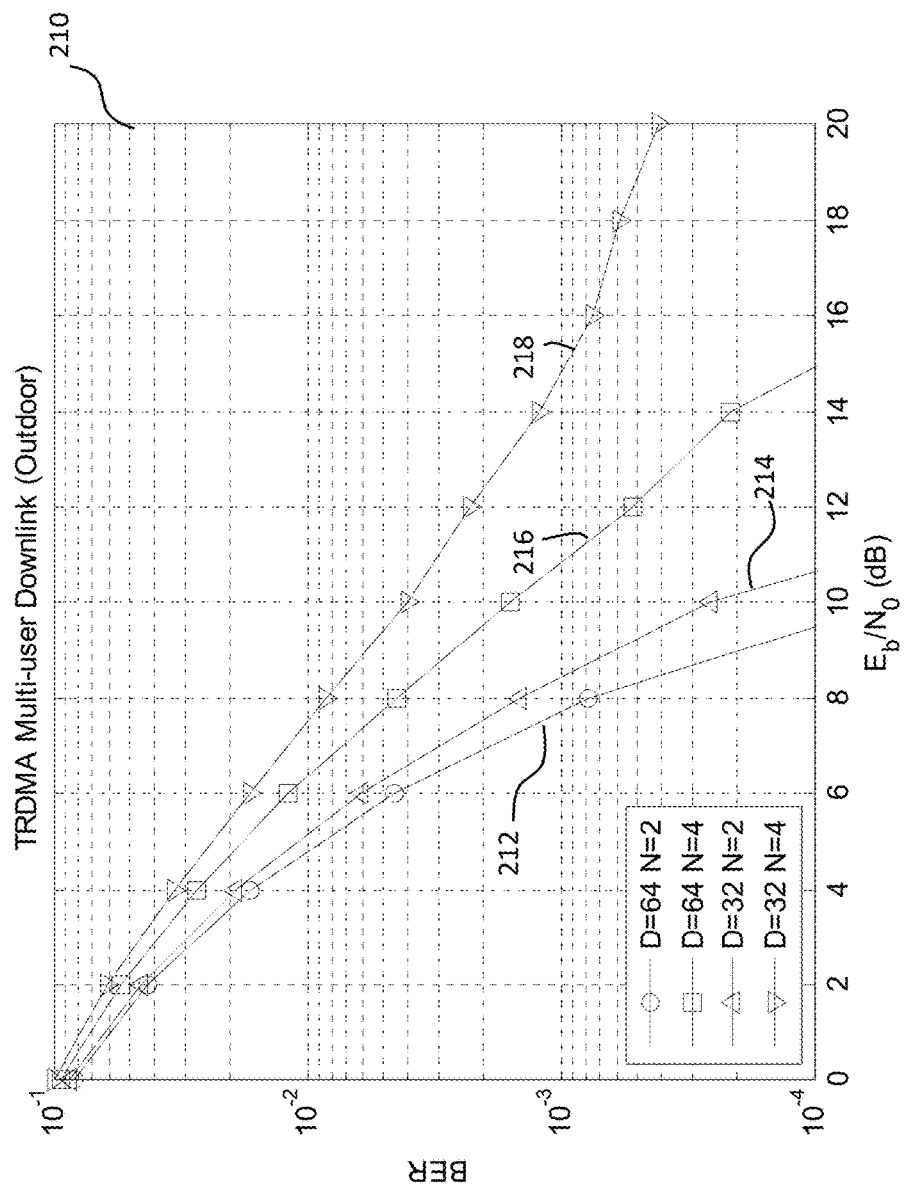
FIG. 8 is a graph showing the bit error rate (BER) performance of the time reversal system for downlink transmission in an outdoor environment.

Referring to FIG. 8, a graph 210 shows the predicted bit error rate (BER) performance of the system 150 for downlink transmission in an outdoor environment. A curve 212 represents the predicted bit error rate when the rate back-off factor D is equal to 64, and the number of users N is equal to 2. A curve 214 represents the predicted bit error rate when the rate back-off factor D is equal to 32, and the number of users N is equal to 2. A curve 216 represents the predicted bit error rate when the rate back-off factor D is equal to 64, and the number of users N is equal to 4. A curve 218 represents the predicted bit error rate when the rate back-off factor D is equal to 32, and the number of users N is equal to 4.

Figure 9:
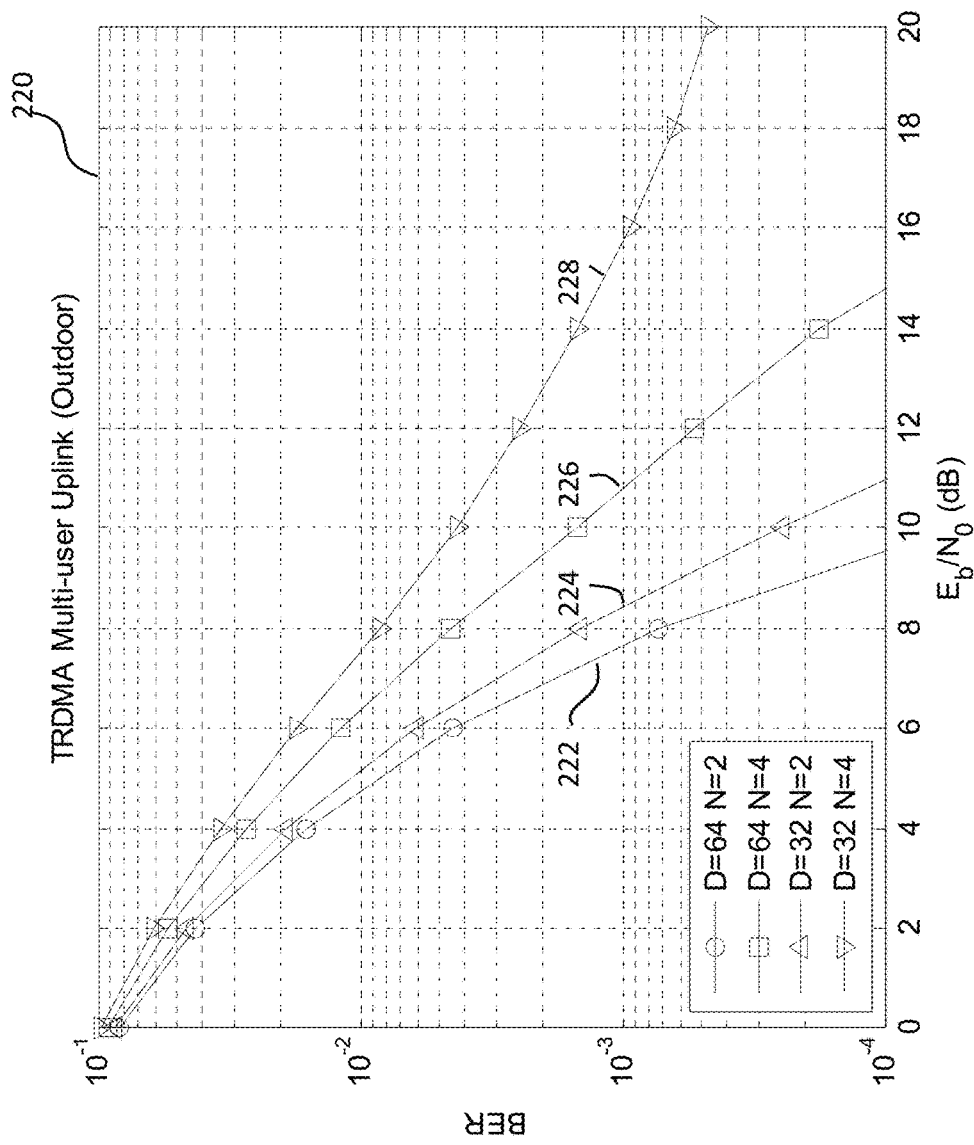
FIG. 9 is a graph showing the bit error rate performance of the time reversal system for uplink transmission in an outdoor environment.

Referring to FIG. 9, a graph 220 shows the predicted bit error rate performance of the system 150 for uplink transmission in an outdoor environment. A curve 222 represents the predicted bit error rate when the rate back-off factor D is equal to 64, and the number of users N is equal to 2. A curve 224 represents the predicted bit error rate when the rate back-off factor D is equal to 32, and the number of users N is equal to 2. A curve 226 represents the predicted bit error rate when the rate back-off factor D is equal to 64, and the number of users N is equal to 4. A curve 228 represents the predicted bit error rate when the rate back-off factor D is equal to 32, and the number of users N is equal to 4.

Figure 10:
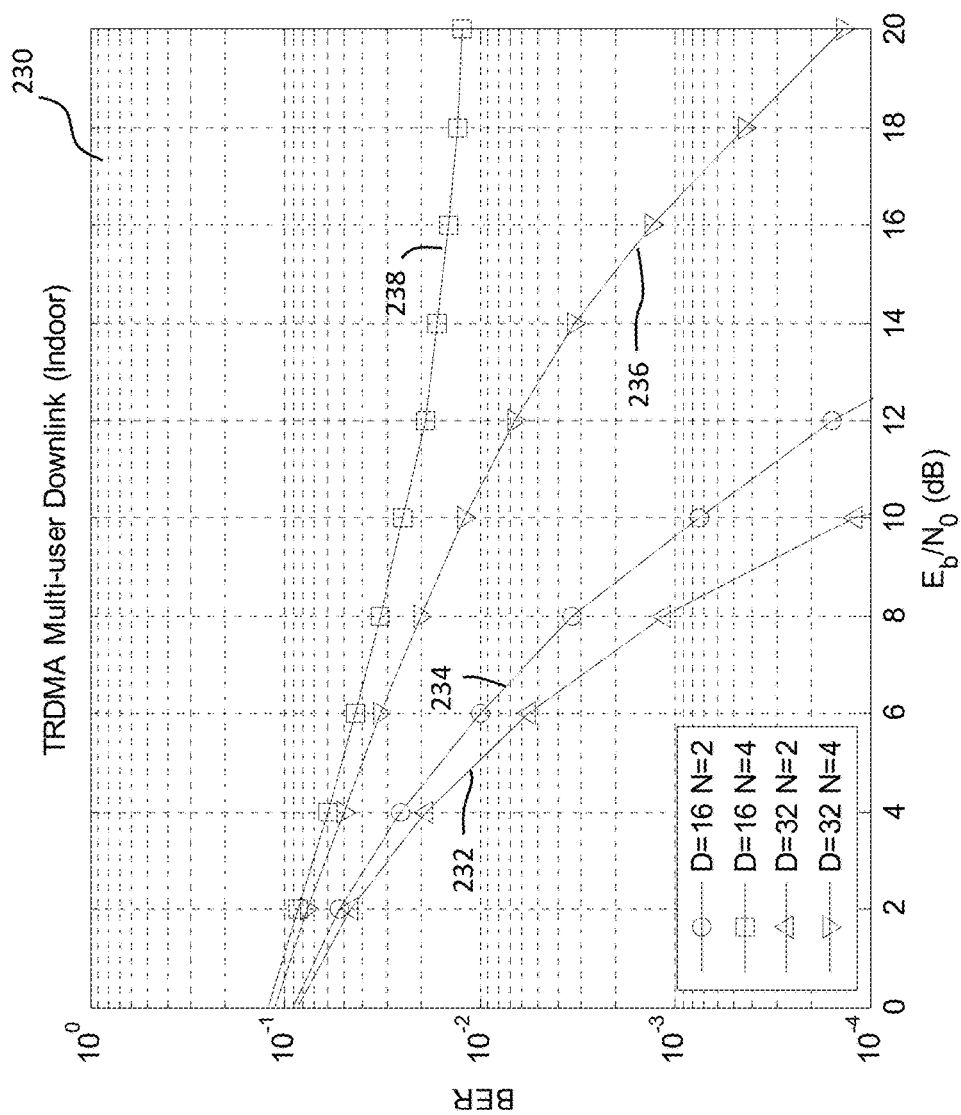
FIG. 10 is a graph showing the bit error rate performance of the time reversal system for downlink transmission in an indoor environment.

Referring to FIG. 10, a graph 230 shows the predicted bit error rate performance of the system 150 for downlink transmission in an indoor environment. A curve 232 represents the predicted bit error rate when the rate back-off factor D is equal to 32, and the number of users N is equal to 2. A curve 234 represents the predicted bit error rate when the rate back-off factor D is equal to 16, and the number of users N is equal to 2. A curve 236 represents the predicted bit error rate when the rate back-off factor D is equal to 32, and the number of users N is equal to 4. A curve 238 represents the predicted bit error rate when the rate back-off factor D is equal to 16, and the number of users N is equal to 4.

Figure 11:
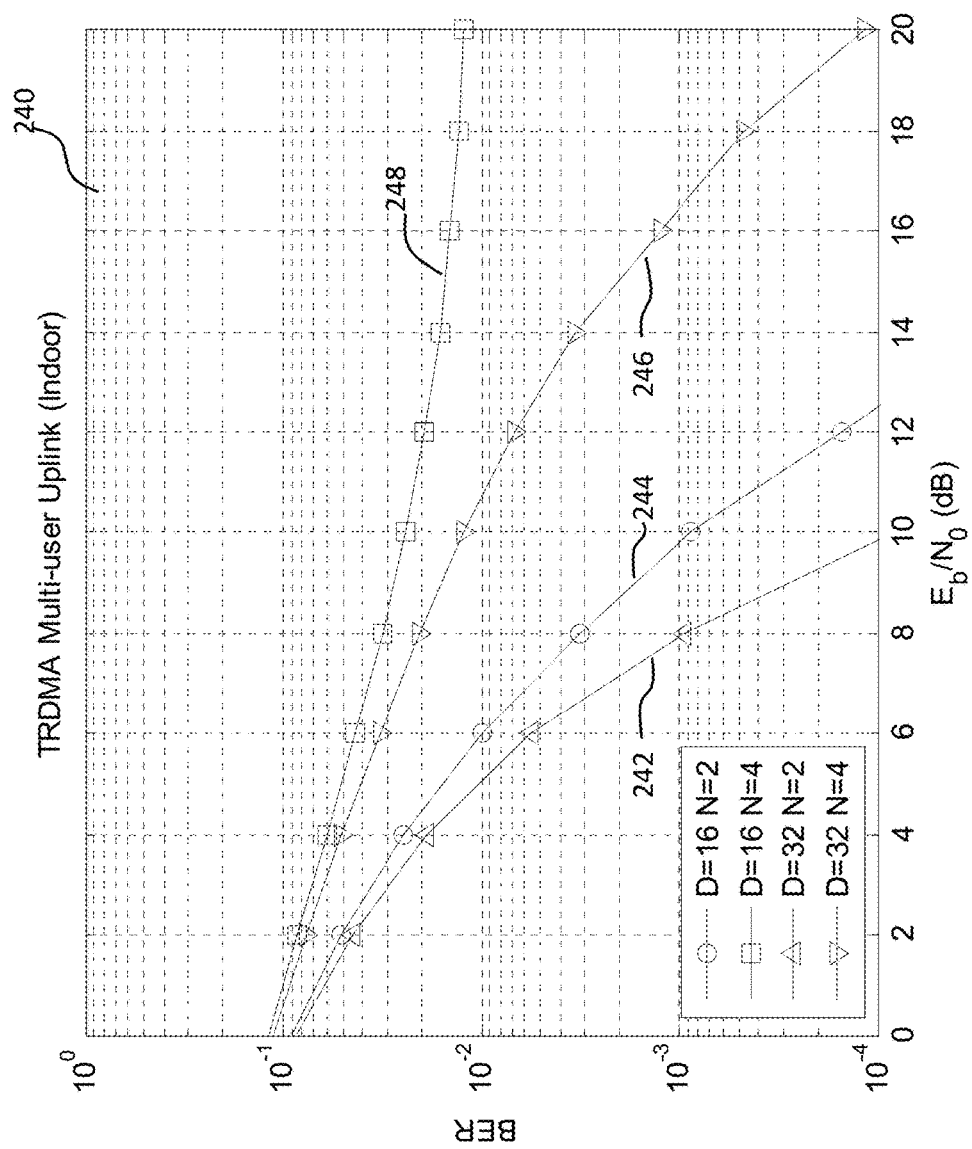
FIG. 11 is a graph showing the bit error rate performance of the time reversal system for uplink transmission in an indoor environment.

Referring to FIG. 11, a graph 240 shows the predicted bit error rate performance of the system 150 for uplink transmission in an indoor environment. A curve 242 represents the predicted bit error rate when the rate back-off factor D is equal to 32, and the number of users N is equal to 2. A curve 244 represents the predicted bit error rate when the rate back-off factor D is equal to 16, and the number of users N is equal to 2. A curve 246 represents the predicted bit error rate when the rate back-off factor D is equal to 32, and the number of users N is equal to 4. A curve 248 represents the predicted bit error rate when the rate back-off factor D is equal to 16, and the number of users N is equal to 4.

Figure 12:
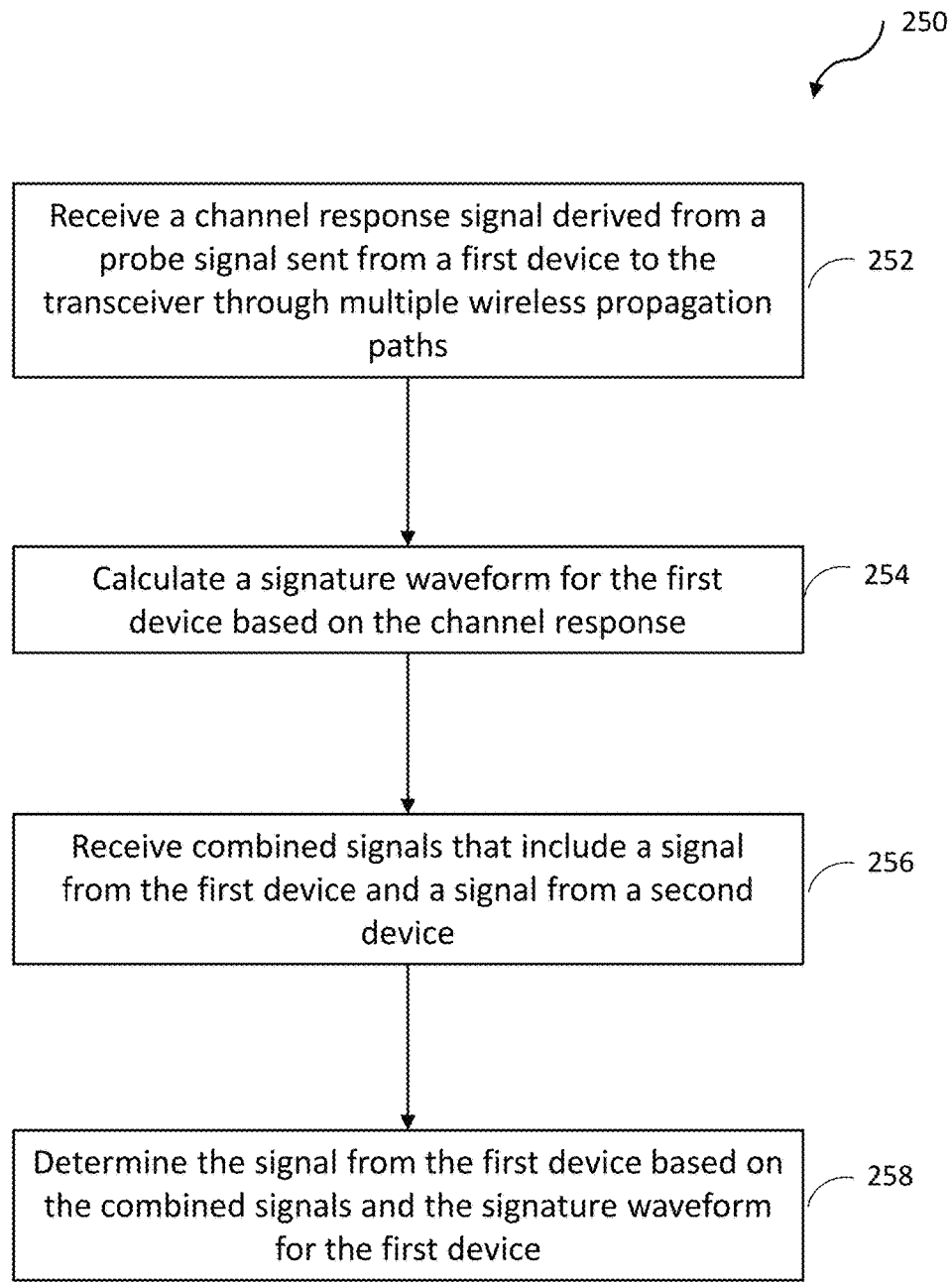
FIGS. 12-14 are flow diagrams of exemplary processes for asymmetric time-reversal wireless communication.

Referring to FIG. 12, an exemplary process 250 for asymmetric time-reversal wireless communication is provided. For example, the process 250 can be implemented using the base station 152 shown in FIGS. 4-7. The process 250 may include, at a transceiver, receiving a channel response signal derived from a probe signal sent from a first device to the transceiver through multiple wireless propagation paths (252). For example, the transceiver can be part of the base station 152.

The process 250 may include calculating a signature waveform for the first device based on the channel response (254). For example, the first device can be the first terminal device 154a.

The process 250 may include receiving combined signals that include a signal from the first device and a signal from a second device (256). For example, the second device can be the second terminal device 154b.

The process 250 may include determining the signal from the first device based on the combined signals and the signature waveform for the first device (258). For example, the base station 152 can receive the combined signals from the first and second terminal devices 154a and 154b and apply the signature waveform for the first terminal device 154a to the combined signals to determine the signal from the first terminal device 154a. For example, a convolution operation, or an operation equivalent or similar to the convolution operation, can be performed between the combined signals and the signature waveform for the first device. For example, the signature waveform for the first device can be a time-reversed waveform of the channel response signal derived from the probe signal sent from the first device.

Figure 13:
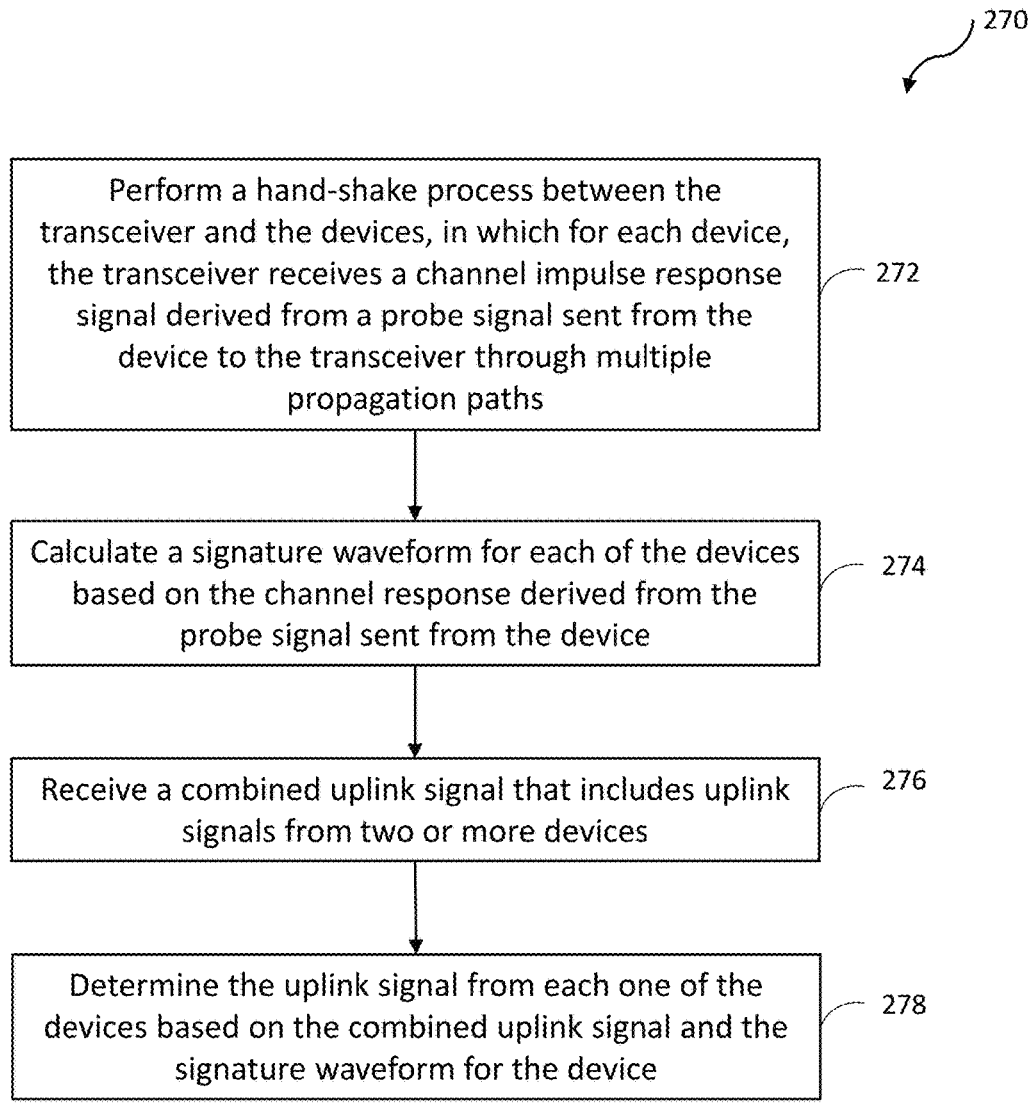

Referring to FIG. 13, an exemplary process 270 for communication between a transceiver and multiple devices using wireless multi-path signals is provided. For example, the transceiver can be the base station 152, and the multiple devices can be the terminal devices 154 in FIGS. 4-7.

The process 270 may include performing a hand-shake process between the transceiver and the devices, in which for each device, the transceiver receives a channel response signal derived from a probe signal sent from the device to the transceiver through multiple propagation paths (272). For example, after each device registers with the transceiver, a hand-shaking process can occur periodically in a round-robin manner among the registered devices to maintain an up-to-date record of the channel responses associated with the devices at the transceiver. In embodiments, the hand-shaking process may occur on a predetermined schedule, or a calculated schedule, or in response to a measured parameter of the receivers or transmitters or system performance, and the like. During the hand-shaking process, at a given time, only one selected device may perform radio frequency modulation to produce a radio frequency signal that propagates through the associated multi-path channel to the transceiver. The transceiver receives the transmitted radio frequency signal and may perform radio frequency demodulation to recover the unique channel response (waveform) and may record it. In an exemplary embodiment, when the selected device is performing the hand-shaking process with the transceiver, the other devices may remain silent.

The process 270 may include calculating a signature waveform for each of the devices based on the channel response derived from the probe signal sent from the device (274). For example, a signature waveform for a device associated with a channel response $h(t)$ can be $h^*(T-t)$, which is a time-reversed waveform of the channel response, with T representing the delay spread of the multi-path channel. In discrete time domain, the channel response can be represented as $h[k]$, and the corresponding signature waveform can be $h^*[L-k]$, in which L represents the delay spread of the multi-path channel.

The process 270 may include receiving a combined uplink signal that includes uplink signals from two or more devices (276), and determining the uplink signal from each one of the devices based on the combined uplink signal and the signature waveform for the device (278). For example, the base station 152 can receive a combined uplink signal that includes uplink signals from the first and second terminal devices 154a and 154b. The base station 152 can apply the signature waveform for the first terminal device 154a to the combined signals to determine the signal from the first terminal device 154a, and apply the signature waveform for the second terminal device 154b to the combined signals to determine the signal from the second terminal device 154b. For example, a convolution operation, or an operation equivalent or similar to the convolution operation, can be performed between the combined signals and the signature waveform for the first or second device.

Figure 14:
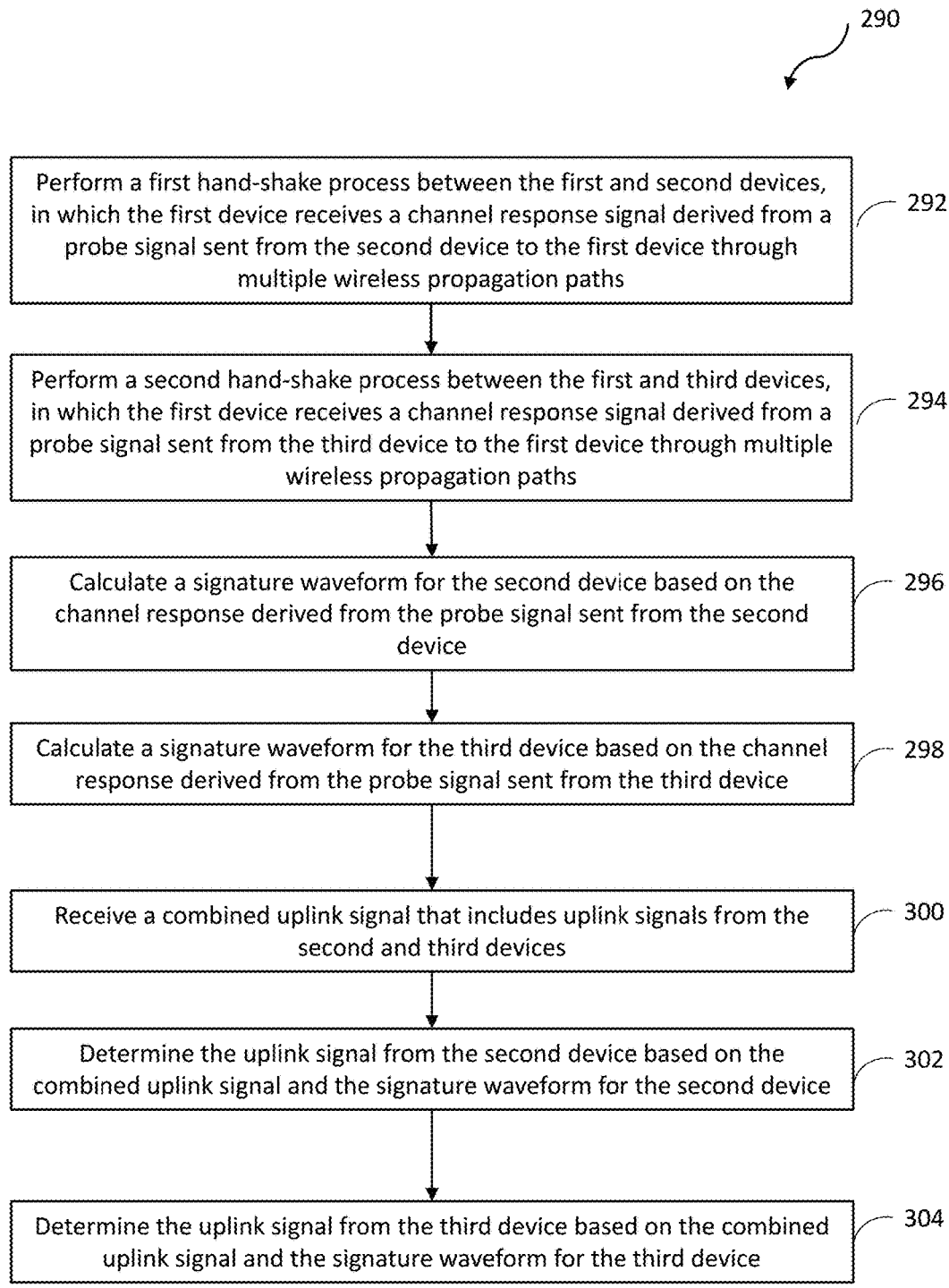

Referring to FIG. 14, an exemplary process 290 for asymmetric time-reversal communication between a plurality of devices using wireless multi-path signals is provided. For example, the devices can include the base station 152 and the terminal devices 154 of FIGS. 4-7.

The process 290 may include performing a first handshake process between the first and second devices, in which the first device may receive a channel response signal derived from a probe signal sent from the second device to the first device through multiple wireless propagation paths (292). For example, the first device can be the base station 152, and the second device can be the first terminal device 154a.

The process 290 may include performing a second handshake process between the first and third devices, in which the first device receives a channel response signal derived from a probe signal sent from the third device to the first device through multiple wireless propagation paths (294). For example, the third device can be the second terminal device 154b.

The process 290 may include at the first device, calculating a signature waveform for the second device based on the channel response derived from the probe signal sent from the second device (296); and at the first device, calculating a signature waveform for the third device based on the channel response derived from the probe signal sent from the third device (298). For example, the signature waveform for the second or third terminal devices 154a or 154b can be a time-reversed waveform of the channel response signal derived from the probe signal sent from the second or third terminal devices 154a or 154b, respectively. A signature waveform for the second or third terminal devices associated with a channel response $h(t)$ can be $h^*(T-t)$, which is a time-reversed waveform of the channel response, with T representing the delay spread of the multi-path channel. If $h(t)$ is a complex value, $h^*(T-t)$ is the time reverse and conjugation of the channel response $h(t)$. In discrete time domain, the channel response can be represented as $h[k]$, and the corresponding signature waveform can be $h^*[L-k]$, in which L represents the delay spread of the multi-path channel. Note that each terminal device may have a unique, location dependent, signature waveform.

The process 290 may include at the first device, receiving a combined uplink signal that includes uplink signals from the second and third devices (300). For example, the base station 152 can receive a combined uplink signal that includes uplink signals from the second and third terminal devices 154a, 154b.

The process 290 may include at the first device, determining the uplink signal from the second device based on the combined uplink signal and the signature waveform for the second device (302); and at the first device, determining the uplink signal from the third device based on the combined uplink signal and the signature waveform for the third device (304). For example, the base station 152 can apply the signature waveform for the second terminal device 154*a* to the combined signals to determine the signal from the second terminal device 154*a*, and apply the signature waveform for the third terminal device 154*b* to the combined signals to determine the signal from the third terminal device 154*b*. For example, a convolution operation, or an operation equivalent or similar to the convolution operation, can be performed between the combined signals and the signature waveform for the second and/or third terminal device 154*a* and/or 154*b*.

Uplink System with Parallel Interference Cancellation

The novel time-reversal division multiple access based multi-user uplink architecture described above can also utilize a 2-dimensional (2D) parallel interference cancellation scheme to enhance the system performance. In an exemplary time-reversal division multiple access uplink architecture the processing power at a base station (BS) that has already been made available for the downlink, can be reused, thus potentially reducing the cost for the uplink modules at the terminal devices. The 2D parallel interference cancellation scheme uses the tentative decisions of detected symbols to effectively cancel the interference in both the time dimension (inter-symbol interference or ISI) and the user dimension (inter-user interference (IUI)), which may significantly improve the bit-error-rate performance and achieve a high signal-to-noise-ratio (SNR). To further improve the BER performance, a multi-stage processing can be implemented by cascading multiple stages of the proposed 2D interference cancellation, with a total delay that increases linearly with the number of stages, but independent of the number of users. Simulation results are provided for up to 3 stages of interference cancellation and compared with the basic time-reversal division multiple access system without interference cancelation.

In this description, depending on context, the term "user" may refer to a device. For example, in a system that has multiple devices communicating with a base station, the term "multi-user uplink" refers to the uplink by multiple devices, and the term "inter-user interference" refers to the interference among various devices.

As described above, a time-reversal division multiple access architecture may be described as having two parts, the downlink part and the uplink part. In a time-reversal division multiple access downlink system, a base station (BS) may transmit multiple data streams to several users simultaneously, in which each user may be associated with a unique multi-path profile in a rich-scattering environment. The time-reversal division multiple access downlink scheme may exploit the spatial degrees of freedom of the environment and focus the useful signal power mostly at the intended locations. Time reversal mirrors (TRMs) at the base station may use a time-reversed copy of the channel response of each user's channel as the user's signature waveform, and then embed these signatures into the corresponding data streams. The transmitted signal from the base station in the time-reversal division multiple access downlink may be a mixed signal that includes the data intended to be sent to several users (including different data intended for different users). When the combined signal propagates to a certain user through the corresponding multipath channel, the encoded waveform may be temporally and spatially focused at the intended user's location.

Within the time-reversal division multiple access framework, more sophisticated signature waveforms can be derived based on the multi-path channel responses to further improve the performance of the time-reversal division multiple access downlink system.

To further enhance the system performance of the time-reversal division multiple access uplink, a 2-dimensional (2D) parallel interference cancellation scheme may be provided by exploring the signal structure of both the inter-symbol interference (ISI) (time dimension) and the inter-user interference (IUI) (user dimension). Compared with existing multi-user detection (MUD) techniques for code division multiple access (CDMA) systems for example, a TRDMA system may experience more severe inter-user interference because the multi-path signature waveforms are not naturally orthogonal. Also, the time-reversal division multiple access system allows overlap between the transmitted signature waveforms to boost system throughput, which may cause inter-symbol interference, depending on the extent of overlapping.

Here we disclose a multi-user uplink scheme based on time-reversal division multiple access, and a 2D parallel interference cancellation technique. The 2D parallel interference cancellation scheme uses the tentative decisions of detected symbols to effectively reduce or cancel both the inter-symbol interference and inter-user interference at the base station. To further improve the bit error rate performance, multi-stage processing can be performed by cascading multiple stages of cancellation, with a total delay that increases linearly with the number of stages, but independent of the number of users.

Figure 15:
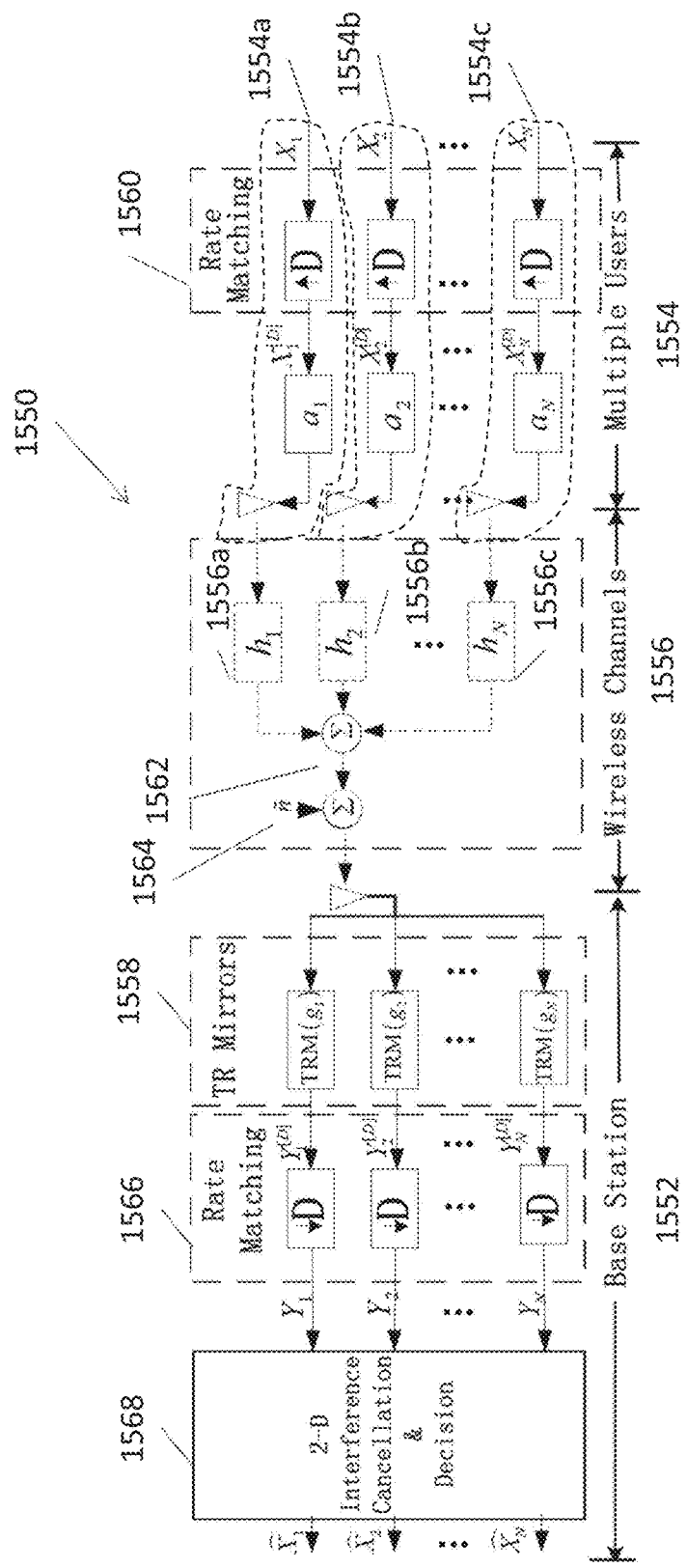
FIG. 15 is a diagram of an exemplary multi-user time reversal communication system.

Referring again to FIG. 15, an exemplary broadband multi-user time reversal communication system 1550 includes a base station 1552 and multiple users or terminal devices (e.g., 1554*a*, 1554*b*, 154*c*, collectively 1554). In some implementations, all the devices (including the base station 1552 and the terminals 1554) can operate at the same frequency band, and the system operates in multi-path environments. For the downlink, the base station 1552 can send multiple messages (either independent or non-independent) simultaneously to multiple selected terminals 1554. For the uplink, multiple terminals 1554 can send their own messages to the base station 1552 simultaneously.

In an exemplary embodiment, N users 1554 may simultaneously transmit independent bit streams to the base station 1552. In this example, binary phase-shift keying (BPSK) modulation is considered, and the polarity of the modulated symbols $\{X_i[k] \in \{-1, +1\}\}$ carries the binary information for user i. Other types of modulation formats including ASK, FSK, QAM, and any known variations and combinations of those modulation formats can also be used.

For any given user i in the uplink network, the channel $h_i$ 1556 between the base station 1552 and user i is a multi-path channel that can be characterized by a unique discrete-time channel impulse response (CIR)

$$h_i[k] = \sum_{l=0}^{L-1} h_{i,l} \delta[k-l] \quad \text{(Equ. 12)}$$

where $h_{i,l} \in R$ is the l-th tap of the channel impulse response with length L, and $\delta[\cdot]$ is the Dirac delta function. We assume that the channels are quasi-static and reciprocal, in which information about the channels can be acquired at the base station through a channel probing phase.

During the channel probing phase, each user 1554 may take turns sending a probe signal or waveform to the base station 1552. The probe signal can be, e.g., a pulse signal, a signal that has a predetermined waveform, or a signal that includes symbols to enable the base station to perform synchronization and/or other functions. In the examples below, the exemplary probe signal is a pulse signal. However, other types of probe signals can be used in the system 1550. When the probe signals are pulse signals, the channel impulse response $\{h_i[k]\}$ of each user's link can be recorded by a time-reversal mirror 1558 at the base station 1552. Upon recording the channel impulse response, the time-reversal mirror 1558 may reverse the recorded waveform in the time domain and normalize it as the unique signature waveform of user i. As described above, the time-reversed waveform of user i may be used in the uplink data transmission phase to extract the desired signal from a combination of the multiple access signals that are mixed in the air.

After the channel probing phase, the users 1554 can start to transmit the statistically independent messages $\{X_1[k], X_2[k], \ldots, X_N[k]\}$ to the base station 1552 through the multi-path channels 1556. Also as described above, each device 1554 may have a rate matching module 1560 that introduces a rate back-off factor D to match the symbol rate (signal bandwidth) with the higher system sampling rate (channel bandwidth). The scaling factors $a_i$, for $i \in \{1, 2, \ldots, N\}$ may be used to implement the transmit power control, whose values are assumed to be instructed by the base station 1552 through a feedback/control channel. After multiplying with scaling factor, the sequence of $a_i X_i^{[D]}[k]$ for all $i \in 1\{1, 2, \ldots, N\}$, may be transmitted through the corresponding multi-path channel $\{h_i[k]\}$.

When the sequence $\{a_i X_i^{[D]}[k]\}$ propagates through its wireless channel $\{h_i[k]\}$ 1556, the convolution between $\{a_i X_i^{[D]}[k]\}$ and the channel impulse response $\{h_i[k]\}$ may be automatically taken as the channel output for user i. All of the channel outputs for the N users are mixed together in the air Upon receiving the mixed signal, the base station 1552 may pass this mixed signal through a bank of N time-reversal mirrors 1558, each of which may perform the convolution between its input signal $\{S[k]\}$ and the user's signature waveform $\{g_i[k]\}$. Such a convolution using the signature waveform can extract the useful signal component and suppress the signals of the other users. As the output of the i-th time-reversal mirror 1558, the convolution of $\{S[k]\}$ and the signature of user i $\{g_i[k]\}$ can be represented as $$Y_i^{[D]}[k] = \sum_{j=1}^{N} a_j(g_i * h_j * X_j^{[D]})[k] + (g_i * \tilde{n})[k] = \quad \text{(Equ. 13)}$$

$$\sum_{j=1}^{N} \sum_{l=0}^{2L-2} a_j(g_i * h_j)[l] X_j^{[D]}[k-l] + (g_i * \tilde{n})[k],$$

in which the highest gain for user i's symbol is achieved at the temporal focusing time $l=L-1$, with $$(g_i * h_i)[L-1] = \sqrt{\sum_{l=0}^{L-1} |h_i[l]|^2} \quad \text{(Equ. 14)}$$

Comparing Equation 13 and the received signal at the terminal users in the downlink, the same mathematical structure can be found by switching the roles of the signature waveforms $\{g_i\}$ s and the channel impulse responses $h_i$s in the convolution (and ignoring the scaling factor $a_i$ and noise term). Therefore, mathematically, a virtual spatial focusing effect as observed in the downlink can be seen in the user's signature domain of the uplink scheme. Unlike the physical spatial focusing effect observed in the downlink in which the useful signal power is concentrated at different physical locations, in the uplink, the signal power concentration in the users' signature waveform space is achieved mathematically at the base station 1552. Such a virtual spatial focusing effect is used to separate the useful signal from the signals of other users. The base station 1552 includes a rate matching module 1566 to perform rate matching by down-sampling (with the same factor D) the time-reversal mirror's output signal to recover the original symbol rate of the modulated symbols of each user.

After the rate matching, the down-sampled time-reversal mirror output $Y_i[k]$ can be represented as $$Y_i[k] = \sum_{j=1}^{N} \sum_{l=-\lfloor\frac{L-1}{D}\rfloor}^{\lfloor\frac{L-1}{D}\rfloor} a_j(g_i * h_j)[L-1+Dl]X_j[k-l] + n_i[k] \quad \text{(Equ. 15)}$$

where the colored noise $n_i[k] = \sum_{l=0}^{L-1} g_i[l]\tilde{n}[Dk-l] = \underline{g_i}\underline{\tilde{n}}[k]$ with $\underline{g_i} = [g_i[0], g_i[1], \ldots, g_i[L-1]]$ and $\underline{\tilde{n}}[k] = [\tilde{n}[k], \tilde{n}[k-1], \ldots, \tilde{n}[k-L+1]]^T$.

A more rigorous representation of Yi[k] is $Yi[k] = Y_i^{[D]}[L-1+Dk]$, which aligns the highest temporal focusing gain $(g_i * h_i)[L-1]$ in Yi[k] with the transmitted symbol Xi[k] in time for ease of simple notation.

Decomposing the signal shown in Equation 15, we have the following components as $$Y_i[k] = a_i(g_i * h_i)[L-1]X_i[k] + \quad \text{(Signal)} \quad \text{(Equ. 16)}$$

$$a_i \sum_{\substack{l=-\lfloor\frac{L-1}{D}\rfloor \\ l \neq 0}}^{\lfloor\frac{L-1}{D}\rfloor} (g_i * h_i)[L-1+Dl]X_i[k-l] + \quad \text{(ISI)}$$

$$\sum_{\substack{j=1 \\ j \neq i}}^{N} a_j \sum_{l=-\lfloor\frac{L-1}{D}\rfloor}^{\lfloor\frac{L-1}{D}\rfloor} (g_i * h_j)[L-1+Dl]X_j[k-l] + \quad \text{(IUI)}$$

$$n_i[k] \quad \text{(Noise)}$$

The basic time-reversal division multiple access uplink scheme uses the signal $Y_i[k]$ in Equation 15 to estimate the transmitted symbol $X_i[k]$. A simple decision rule can be derived to implement the maximum-likelihood estimation (MLE) for the binary phase-shift keying symbols $X_i[k] \in \{+1, -1\}$ for $i=1, 2, \ldots, N$. By the central limit theorem, we model the total interference term (including the inter-symbol interference and inter-user interference) as a Gaussian random variable with zero mean (because the interference term is a linear combination of the zero-mean binary symmetric symbols $Xi[k] \in \{+1,-1\}$) and variance $$\sigma_{I,i}^2 = |a_i|^2 \sum_{\substack{l=-\lfloor\frac{L-1}{D}\rfloor \\ l \neq 0}}^{\lfloor\frac{L-1}{D}\rfloor} |(g_i^* h_i)[L-1+Dl]|^2 + \quad \text{(Equ. 17)}$$

-continued $$\sum_{\substack{j=1 \\ j \ne i}}^{N} |a_j|^2 \sum_{l=-\lfloor \frac{L-1}{D} \rfloor}^{\lfloor \frac{L-1}{D} \rfloor} |(g_i^* h_j)[L-1+Dl]|^2$$

The likelihood ratio can be derived as $$\Lambda(Y_i[k]) = \frac{L(X_i[k] = 1 \mid Y_i[k])}{L(X_i[k] = -1 \mid Y_i[k])} = \qquad \text{(Equ. 18)}$$

$$\frac{f_i[Y_i[k] \mid X_i[k] = 1]}{f_i[Y_i[k] \mid X_i[k] = -1]} = \exp\left(\frac{2a_i(g_i^* h_i)[L-1]}{(\sigma_{I,i}^2 + \sigma_{N,i}^2)} Y_i[k]\right)$$

where $f_i(y|x)$ is the conditional probability density function (pdf) of $Y_i[k]$ given that $X_i[k]=x$ is transmitted. The simple form of the likelihood ratio shown in Equation 18 leads to a simple decision rule for the maximum-likelihood estimation, specifically, $$\hat{X}_i^{(0)}[k] = \text{sgn}(Y_i[k]) = \begin{cases} +1, & \text{if } Y_i[k] \ge 0, \\ -1, & \text{if } Y_i[k] < 0. \end{cases} \qquad \text{(Equ. 19)}$$

In Equation 19, the superscript "$_{(0)}$" of $\hat{X}_i^{(0)}[k]$ indicates the initial stage of the interference cancellation procedure. Such a notation is useful in the following discussion of multi-stage interference cancellation schemes.

The error probability of the estimator shown in Equation 19 can be calculated based on the Gaussian approximations of the interference as follows $$P_{err}^{(0)}(i) = Q\left(\sqrt{\frac{|a_i|^2 \sum_{l=0}^{L-1} |h_i[l]|^2}{\sigma_{I,i}^2 + \sigma_N^2}}\right) = Q\left(\sqrt{SINR_i^{(0)}}\right) \qquad \text{(Equ. 20)}$$

Where $SINR_i^{(0)}$ is the signal-to-interference-plus-noise ratio (SINR) for user i at the initial stage. From Equation 20, one can see that the error probability decreases with the achieved signal-to-interference-plus-noise ratio, i.e., the quality of the signal before the final decision.

The base station 1552 includes a 2D interference cancellation and decision module 1568 that cancels the inter-symbol interference and the inter-user interference. The following describes the 2D interference cancellation scheme that uses the estimated symbols to effectively cancel both the inter-symbol interference and inter-user interference, and significantly improves the performance of the uplink communication.

2-Dimensional Parallel Interference Cancelation

The 2D parallel interference cancellation scheme used by the 2D interference cancelation and decision module 1568 can have one or more stages. A single stage 2D parallel interference cancellation scheme is described first. The time-reversal division multiple access system can be an interference-limited system, especially in the high signal-to-noise ratio (SNR) regime. The interference terms shown in Equation 16 have structures that can be exploited to improve the bit error rate performances. Because the channel impulse responses have been obtained at the base station 1552 during the channel probing phase, the interference terms in Equation 16 can be reconstructed if the relevant transmitted symbols are known. Note that the coefficients $\{a_i\}$ can be determined by the base station 1552 and sent to the users 1554. In the interference cancellation scheme described here, the estimated symbols from the previous stage can be used to approximate the interference terms in the current stage. The basic TRDMA system (without interference cancelation) may be considered as the initial (0-th) stage of the interference cancellation. The interference cancellation of the TRDMA system includes two parts belonging to two different dimensions; the inter-symbol interference due to the multi-path effect of broadband channels, which is in the time domain, and the inter-user interference caused by the simultaneous transmission of multiple users, which is in the user's signature domain. The 2D parallel interference cancellation scheme for the TRDMA uplink system targets the interference in both dimensions by exploiting the structure of interference in both dimensions.

Tentative Decision Vector

Due to the unique structure of time-reversal waveforms, each received symbol may include interference caused by the symbols transmitted before and after the current symbol. According to Equation 16, in order to ideally cancel the interference for user i's symbol $X_i[k]$, one has to know all the other users' transmitted symbols from time $$\left(k - \left\lfloor \frac{L-1}{D} \right\rfloor\right)$$

to $$\left(k + \left\lfloor \frac{L-1}{D} \right\rfloor\right)$$

for the inter-user interference; and user i's own transmitted symbols from time $$\left(k - \left\lfloor \frac{L-1}{D} \right\rfloor\right)$$

to (k−1) and from (k+1) to $$\left(k + \left\lfloor \frac{L-1}{D} \right\rfloor\right)$$

for the inter-symbol interference.

Tentative decisions can be made in an attempt to estimate these symbols. To simplify the notation, let's define the vector $\hat{\underline{X}}_j^{(0)}[k]$ for all $j \in \{1, 2, \ldots, N\}$, as the stage-0 tentative decision vector for user j, where (12)

$$\hat{\underline{X}}_j^{(0)}[k] \triangleq \left[\hat{X}_j^{(0)}\left[k + \left\lfloor \frac{L-1}{D} \right\rfloor\right], \hat{X}_j^{(0)}\left[k + \left\lfloor \frac{L-1}{D} \right\rfloor - 1\right], \ldots, \hat{X}_j^{(0)}\left[k - \left\lfloor \frac{L-1}{D} \right\rfloor\right]\right]^T \qquad \text{(Equ. 21)}$$

$$= \left[\text{sgn}\left(Y_j\left[k + \left\lfloor \frac{L-1}{D} \right\rfloor\right]\right), \text{sgn}\left(Y_j\left[k + \left\lfloor \frac{L-1}{D} \right\rfloor - 1\right]\right), \ldots, \text{sgn}\left(Y_j\left[k - \left\lfloor \frac{L-1}{D} \right\rfloor\right]\right)\right]^T.$$

In an exemplary embodiment, where the stage-0 tentative decisions for user j depend only on this user's own time-reversal mirror 1558 output, then the tentative decision vectors can be obtained in parallel for all the users in the 2D parallel interference cancellation scheme.

Approximated Interference Reconstruction

Based on the tentative decisions of the transmitted symbols, the approximated interference terms in Equation 16 can be reconstructed by looking at the structure of the inter-symbol interference and the inter-user interference. In doing so, we first define the row vector $U_{i,j}$ for $\forall i,j \in \{1, 2, \ldots, N\}$ as $$U_{i,j} \triangleq \left[(g_i^* h_j)\left[L-1-D\left\lfloor\frac{L-1}{D}\right\rfloor\right], (g_i^* h_j)\left[L-1-D\left(\left\lfloor\frac{L-1}{D}\right\rfloor-1\right)\right], \ldots, (g_i^* h_j)\left[L-1+D\left\lfloor\frac{L-1}{D}\right\rfloor\right]\right].$$ (Equ. 22)

so that the inter-symbol interference canceller vector and the inter-user interference canceller vector can be represented as described below.

Considering the inter-symbol interference to $X_i[k]$ as a linear combination of user i's own symbols, we define the inter-symbol interference canceller vector $V_{i,i}$ for user i to be $$V_{i,i} \triangleq U_{i,i} D(\underline{1}, 0, \underline{1}),$$ (Equ. 23)

where $D(\underline{z})$ is a diagonal matrix whose diagonal elements are listed by $\underline{z}$ and $\underline{1} \triangleq \{1, 1, \ldots 1\}$ of length $$\left\lfloor\frac{L-1}{D}\right\rfloor$$

As a result, the approximated inter-symbol interference term for user i's symbol $X_i[k]$ can be written in a compact form as the product of the inter-symbol interference canceller vector $V_{i,i}$ and the tentative decision vector $\hat{\underline{X}}_i^{(0)}[k]$ as shown below $$ISI = a_i \sum_{\substack{l=-\lfloor\frac{L-1}{D}\rfloor \\ l\neq 0}}^{\lfloor\frac{L-1}{D}\rfloor} (g_i * h_i)[L-1+Dl]\hat{X}_j[k-l] = a_i V_{i,i} \hat{\underline{X}}_i^{(0)}[k].$$ (Equ. 24)

We define the inter-user interference canceller vector for the inter-user interference caused by user j to user i as $U_{i,j}$, so that the estimated inter-user interference term to be canceled for user i's symbol $X_i[k]$ can be obtained as $$IUI = \sum_{\substack{j=1 \\ j\neq i}}^{N} a_j \sum_{l=-\lfloor\frac{L-1}{D}\rfloor}^{\lfloor\frac{L-1}{D}\rfloor} (g_i * h_j)[L-1+Dl]\hat{X}_j[k-l] =$$ (Equ. 25)

$$\sum_{\substack{j=1 \\ j\neq i}}^{N} a_j U_{i,j} \hat{\underline{X}}_j^{(0)}[k].$$

Single-Stage 2D Interference Cancellation

Figure 16A:
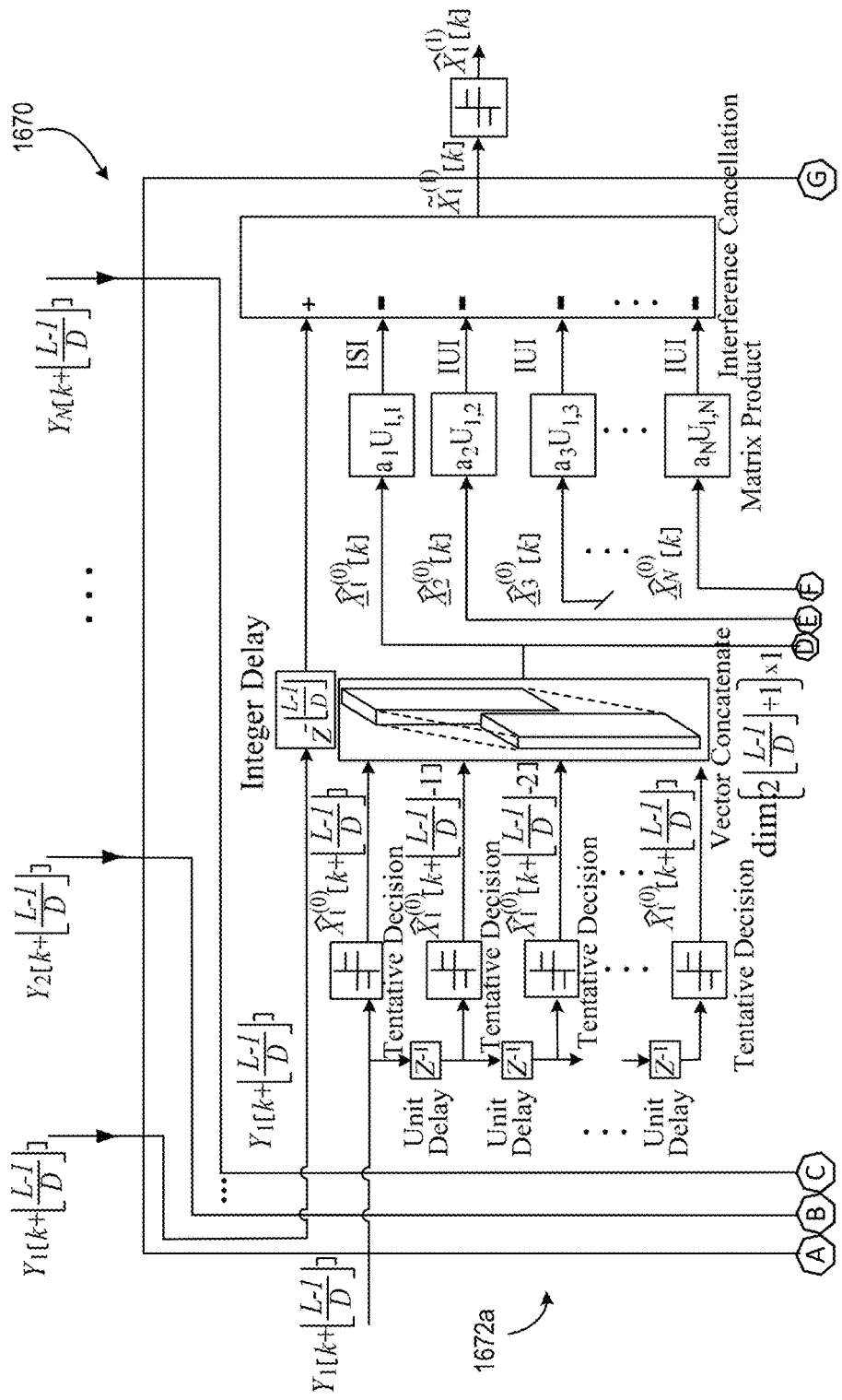
FIGS. 16A and 16D are diagrams showing an exemplary 2D interference cancelation and decision module.
Figure 16B:
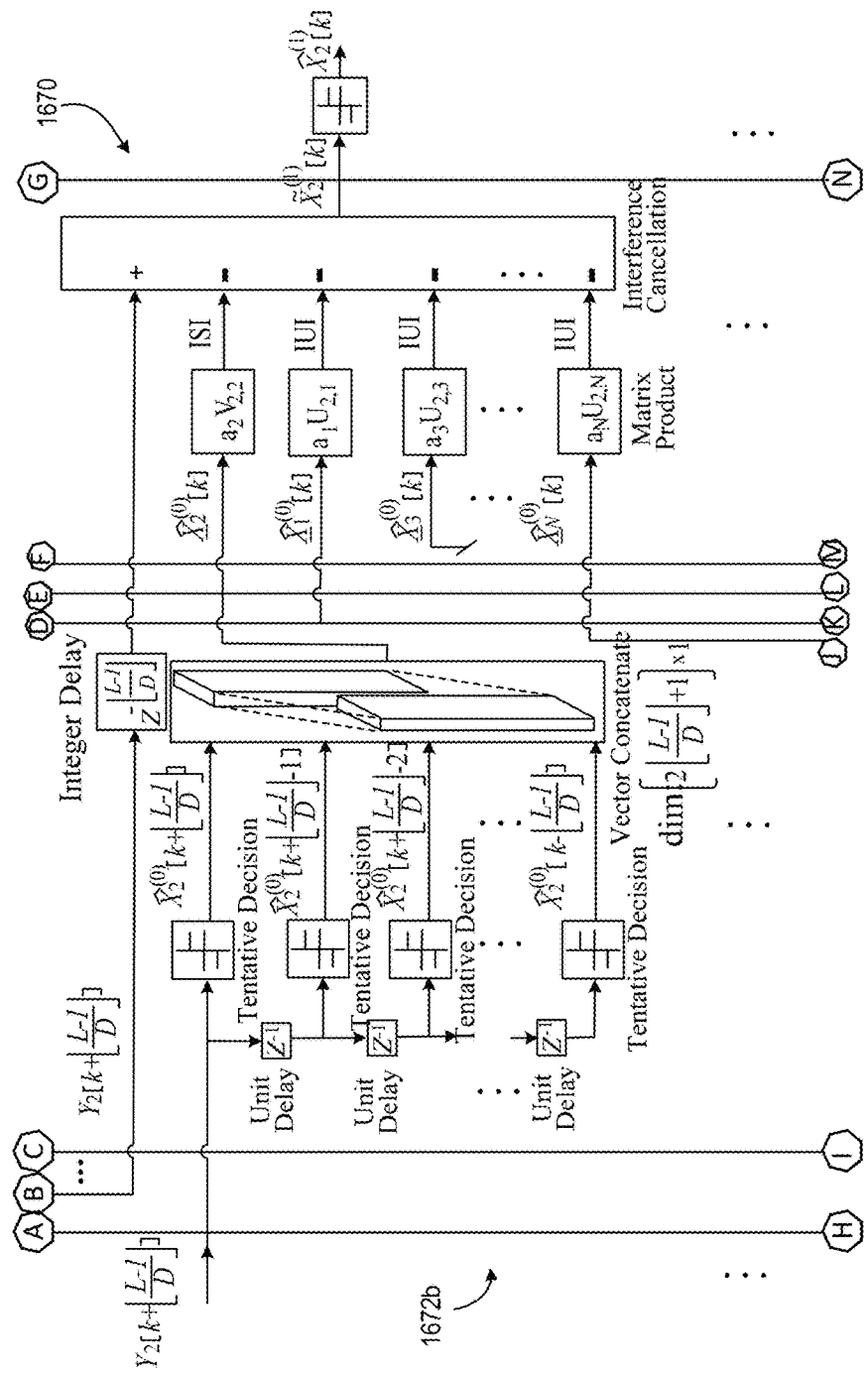
Figure 16C:
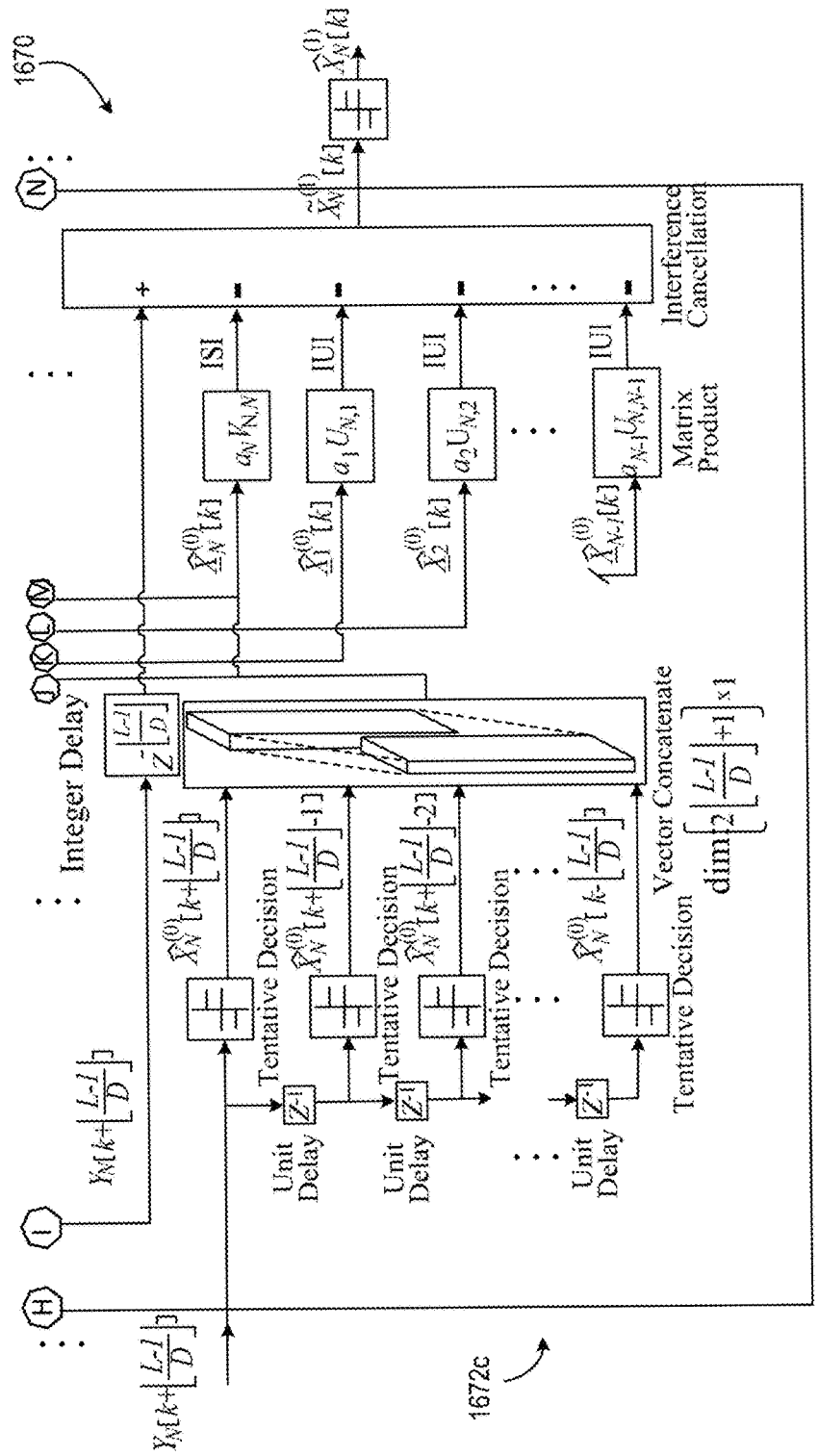

Referring to FIGS. 16A to 16C, in an exemplary embodiment, a 2D interference cancelation and decision module 1670 may use a single-stage 2D parallel interference cancellation scheme. The 2D interference cancelation and decision module 1670 may include N interference cancelation and decision module units (e.g., 1672a, 1672b, 1672c, collectively 1672) each capable of at least partially canceling the interference associated with symbols sent from one of the users 1554. In this example, the interference cancelation and decision module unit 1672a may cancel the inter-symbol interference and the inter-user interference from the symbols sent from the user 1554a, the unit 1672b may cancel the interference from the symbols sent from the user 1554b, the unit 1672c may cancel the interference from the symbols sent from the user 1554c, and so forth.

Figure 16D:
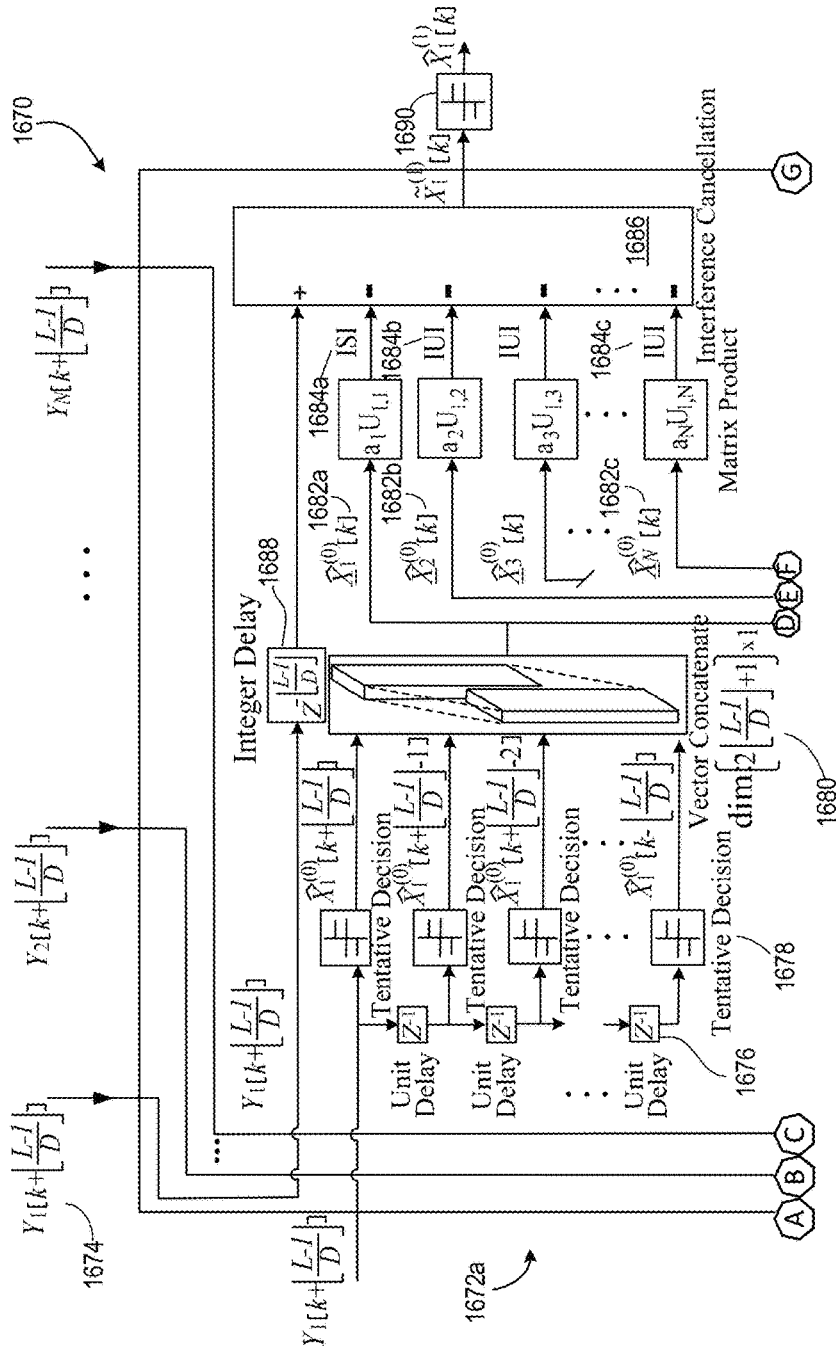

FIG. 16D shows an enlarged diagram of the exemplary interference cancelation and decision module unit 1672a. The input signal $Y_1[k]$ 1674 associated with user 1 (1554a) may be buffered by a delay chain 1676 of length $$2\left\lfloor\frac{L-1}{D}\right\rfloor.$$

Tentative hard decision units 1678 may make tentative hard decisions in parallel for the signal associated with user 1, and the tentative hard decisions may be concatenated at a concatenation unit 1680 to obtain a vector $\hat{\underline{X}}_1^{(0)}$ 1682 using the decision rule of Equation 19. The vector $\hat{\underline{X}}_1^{(0)}$ represents the tentative hard decisions for user 1.

The matrix product of vector $\hat{\underline{X}}_1^{(0)}$ 1682 and the inter-symbol interference canceller vector $V_{1,1}$, scaled by a power coefficient $a_1$, can be calculated to obtain the inter-symbol interference $ISI_{1,1}$ (1684a) associated with the symbols sent from user 1.

The matrix product of a vector $\hat{\underline{X}}_2^{(0)}$ 1682b and the inter-user interference canceller vector $U_{1,2}$, scaled by a power coefficient $a_2$, can be calculated to obtain the inter-user interference $IUI_{1,2}$ (1684b) representing the interference of user 2 (1554b) to user 1.

In a similar manner, the matrix product of a vector $\hat{\underline{X}}_N^{(0)}$ and the inter-user interference canceller vector $U_{1,N}$, scaled by a power coefficient $a_N$, can be calculated to obtain the inter-user interference $IUI_{1,N}$ representing the interference of user N to user 1.

An interference cancellation module 1686 may subtract the inter-symbol interference $ISI_{1,1}$ (1684a) and inter-user interferences $IUI_{1,2}$ (1684b) to $IUI_{1,N}$ (1684c) from the time-reversal mirror output $Y_1[k]$ to obtain a soft bit representing a refined estimate of the symbol sent from user 1, represented as $\hat{X}_1^{(1)}[k]$. The soft bit may pass through a hard decision unit 1690, which may output a hard decision of the symbol sent from user 1, represented as $\hat{X}_1^{(1)}[k]$. The superscript (1) indicates that this is the hard decision for stage 1 interference cancelation.

In general, at each interference cancelation and decision module unit 1672i (i=1 to N), the input signal Yi[k] associated with the i-th user can be buffered by a delay chain of length $$2\left\lfloor\frac{L-1}{D}\right\rfloor.$$

Tentative hard decision units can make tentative hard decisions in parallel for the signal associated with user i, and the tentative hard decisions can be concatenated at a concatenation unit to obtain a vector $\underline{\hat{X}}_i^{(0)}[k]$ for $\forall i \in \{1, 2, \ldots, N\}$ using the decision rule of Equation 19. In embodiments, the vector $\underline{\hat{X}}_i^{(0)}$ represents the tentative hard decisions for user i.

The matrix product of vector $\underline{\hat{X}}_i^{(0)}$ and the inter-symbol interference canceller vector $V_{i,i}$, scaled by a power coefficient $a_i$, can be calculated to obtain the inter-symbol interference $ISI_i$ associated with the symbols sent from the user i.

The matrix product of each of vectors $\underline{\hat{X}}_j^{(0)}$ (j≠i) and the inter-user interference canceller vector $U_{i,j}$, scaled by a power coefficient $a_j$, can be calculated to obtain the inter-user interference $IUI_{i,j}$ representing the interference of user j to user i.

An interference cancellation module 1686 may subtract the inter-symbol interference $IUI_i$ and inter-user interferences $IUI_{i,j}$ (for all j not equal to i) from the time-reversal mirror output $Y_i[k]$ to obtain a soft bit representing a refined estimate of the symbol sent from user i, represented as $\tilde{X}_i^{(1)}[k]$. The soft bit may pass through a hard decision unit, which may output a refined hard decision of the symbol sent from user i, represented as $\hat{X}_i^{(1)}[k]$. The superscript (1) indicates that this is the hard decision for stage 1 interference cancelation.

Mathematical derivations of the final hard decision $\hat{X}_i^{(1)}[k]$ are provided below. As described above, upon obtaining the tentative decision vectors $\underline{\hat{X}}_i^{(0)}[l]$ for all $i \in \{1, 2, \ldots, N\}$, the interference terms may be reconstructed and then subtracted from the signal $Y_i[k]$ with the inter-symbol interference and inter-user interference canceller vectors.

Similar to the definition in Equation 21, denoting $$\underline{X}_j[k] \triangleq \left[X_j\left[k+\left\lfloor\frac{L-1}{D}\right\rfloor\right], X_j\left[k+\left\lfloor\frac{L-1}{D}\right\rfloor-1\right], \ldots, X_j\left[k-\left\lfloor\frac{L-1}{D}\right\rfloor\right]\right]^T,$$

we can rewrite Equation 16 in a more compact form as $$Y_i[k] = \quad \text{(Equ. 26)}$$
$$a_i\sqrt{\sum_{l=0}^{L-1}|h_i[l]|^2}\,X_i[k]+a_iV_{i,i}\underline{X}_i[k]+\sum_{\substack{j=1\\j\neq i}}^{N}a_jU_{i,j}\underline{X}_j[k]+n_i[k].$$

After the interference cancellation, the resulting soft-bit $\tilde{X}_i^{(1)}[k]$ can be written as $$\tilde{X}_i^{(1)}[k]=Y_i[k]-a_iV_{i,i}\underline{\hat{X}}_i^{(0)}[k]-\sum_{\substack{j=1\\j\neq i}}^{N}a_jU_{i,j}\underline{\hat{X}}_j^{(0)}[k] \quad \text{(Equ. 27)}$$

A hard decision $\hat{X}_i^{(1)}[k]=\text{sgn}(\tilde{X}_i^{(1)}[l])$ can be made based on $\tilde{X}_i^{(1)}[k]$ to achieve a more refined estimation for the transmitted symbol.

The Multi-Stage Iterative Scheme

To further improve the detection performance, multi-stage processing can be performed by cascading multiple stages of the 2D parallel interference cancellation. In this part, we generalize the basic single-stage scheme into an iterative multi-stage scheme, in which the signal quality may be refined after each stage of interference cancellation. This may be useful when, for example, the bit error rate performance of the initial stage is not sufficiently high.

Figure 17:
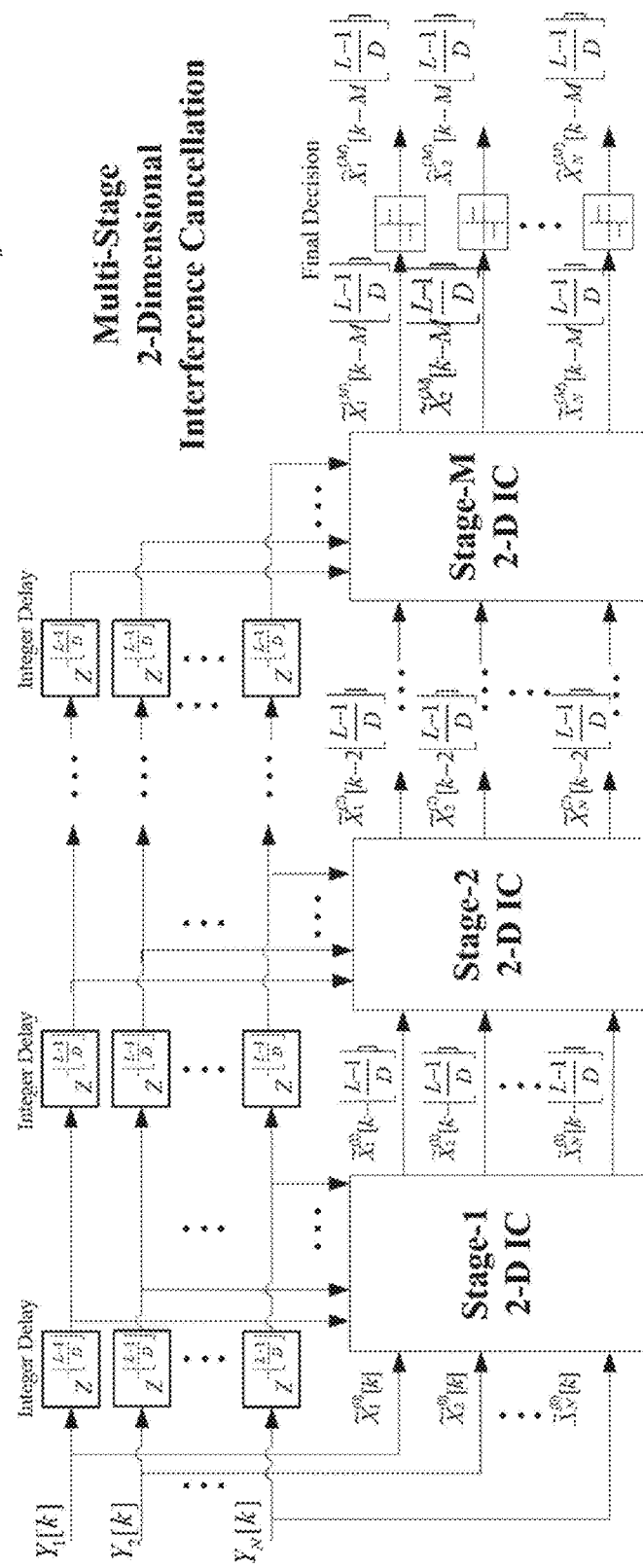
FIG. 17 is a diagram showing a multi-stage 2D interference cancelation and decision module.

Referring to FIG. 17, a 2D interference cancelation and decision module 400 may use an M-stage interference cancellation scheme. As the interference cancellation procedures proceed in each stage, the same 2D parallel interference cancellation may be performed in an attempt to remove both the inter-symbol interference and the inter-user interference with the updated estimates of the transmitted symbols. Each stage may take the soft-bits from the previous stage as input, based on which tentative decisions are made to estimate the interference and generate the soft-bits of the current stage as the output.

More specifically, in the context of multiple stages, the m-th stage's operation can be described as follows:

Delay and Buffering: The soft-bits from the previous stage (the (m−1)-th stage) are delayed and buffered to form a soft-bit vector for each user, such that for all $i \in \{1, 2, \ldots, N\}$.

$$\underline{\tilde{X}}_i^{(m-1)}\left[k-m\left\lfloor\frac{L-1}{D}\right\rfloor\right] \triangleq \left[\tilde{X}_i^{(m-1)}\left[k-(m-1)\left\lfloor\frac{L-1}{D}\right\rfloor\right],\right. \quad \text{(Equ. 28)}$$
$$\tilde{X}_i^{(m-1)}\left[k-(m-1)\left\lfloor\frac{L-1}{D}\right\rfloor-1\right],$$
$$\left.\ldots, \tilde{X}_i^{(m-1)}\left[k-(m+1)\left\lfloor\frac{L-1}{D}\right\rfloor\right]\right]$$

Tentative Decision: The tentative decisions are made based on the soft-bits from the previous stage (the (m−1)-th stage) in an attempt to estimate the transmitted symbols, i.e., for all $i \in \{1, 2, \ldots, N\}$, $$\hat{X}_i^{(m-1)}\left[k-m\left\lfloor\frac{L-1}{D}\right\rfloor\right]=\text{sgn}\left(\hat{X}_i^{(m-1)}\left[k-m\left\lfloor\frac{L-1}{D}\right\rfloor\right]\right) \quad \text{(Equ. 29)}$$

where sgn(•) is the sign function applied element-wise to the operand when the operand is a vector.

Interference Cancellation: The soft-bits of the current stage (the m-th stage) are generated by subtracting the estimated interference terms from the original signals $\{Y_i\}$. The soft-bit of user i generated by the m-th stage is given by (Equ. 30)
$$\tilde{X}_i^{(m)}\left[k-m\left\lfloor\frac{L-1}{D}\right\rfloor\right]=Y_i\left[k-m\left\lfloor\frac{L-1}{D}\right\rfloor\right]- \quad (21)$$
$$a_iV_{i,i}\underline{\hat{X}}_i^{(m-1)}\left[k-m\left\lfloor\frac{L-1}{D}\right\rfloor\right]-\sum_{\substack{j=1\\j\neq i}}^{N}a_jU_{i,j}\underline{\hat{X}}_j^{(m-1)}\left[k-m\left\lfloor\frac{L-1}{D}\right\rfloor\right]$$

In particular, such an M-stage scheme is initialized by setting the soft-bits of the initial stage (the 0-th stage) as $$\tilde{X}_1^{(0)}[k]=Y_1[k],\tilde{X}_2^{(0)}[k]=Y_2[l]\ldots,\tilde{X}_N^{(0)}[k]=Y_N[k]. \quad \text{(Equ. 31)}$$

After the signal flows through all the M stages, the final decision is made for each user based on the output of the stage-M interference cancellation, $$\hat{X}_i^{(M)}\left[k-M\left\lfloor\frac{L-1}{D}\right\rfloor\right]=\text{sgn}\left(\tilde{X}_i^{(M)}\left[k-M\left\lfloor\frac{L-1}{D}\right\rfloor\right]\right), \quad \text{(Equ. 32)}$$

-continued for all $i \in \{1, 2, \ldots, N\}$

Comparing the timing of the estimated symbols after the final decision $$\hat{X}_i^{(M)}\left[k - M\left\lfloor\frac{L-1}{D}\right\rfloor\right]$$

and the original time-reversal mirror output signal $Y_i[k]$, one can see that each stage incurs a delay of $$\left\lfloor\frac{L-1}{D}\right\rfloor.$$

Therefore, the total detection delay grows linearly with the number of stages, but is independent of the number of users. The complexity of the 2D parallel interference cancellation increases linearly with the number of users (or devices), as opposed to previous joint detection schemes whose complexity grows exponentially with the number of users.

Simulation Results

The following describes simulation results on the bit error rate performance of the 2D parallel interference cancellation scheme. To study the interference cancellation scheme in a realistic setting, we used the practical IEEE 802.15.4a outdoor non-line-of-sight (NLOS) channel model to evaluate the bit error rate performance of the time-reversal system shown in FIGS. 15-17. In such a channel model, each channel tap is a real number.

Figure 18A:
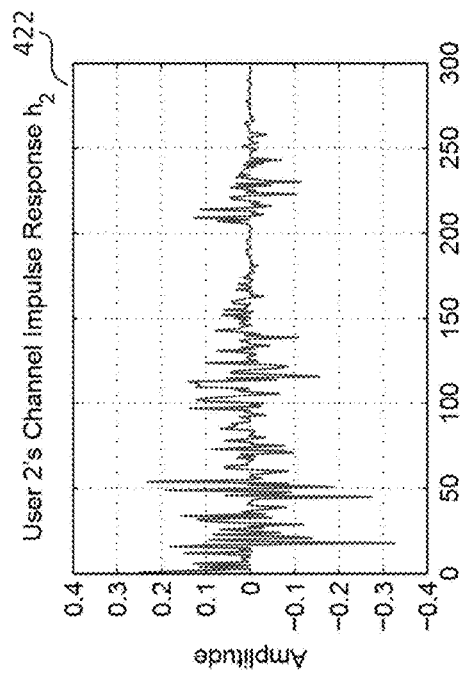
FIGS. 18A and 18B are graphs showing examples of channel impulse responses.
Figure 18B:
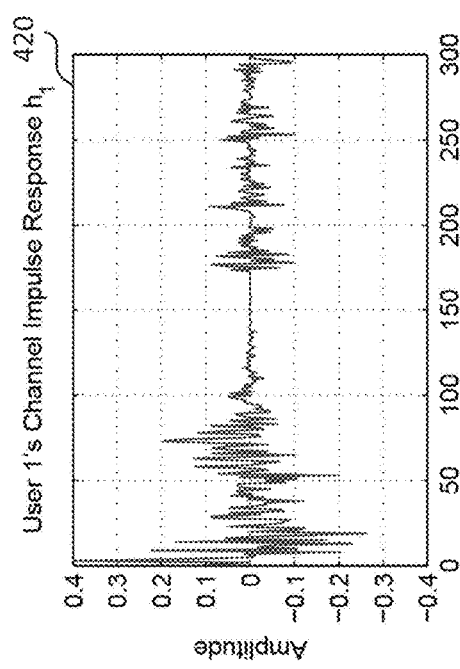

Referring to FIG. 18A, a graph 420 shows an example of a channel impulse response for user 1 under the IEEE 802.15.4a outdoor non-line-of-sight channel model. Referring to FIG. 18B, a graph 422 shows an example of a channel impulse response for user 2 under the IEEE 802.15.4a outdoor non-line-of-sight channel model.

Figure 19A:
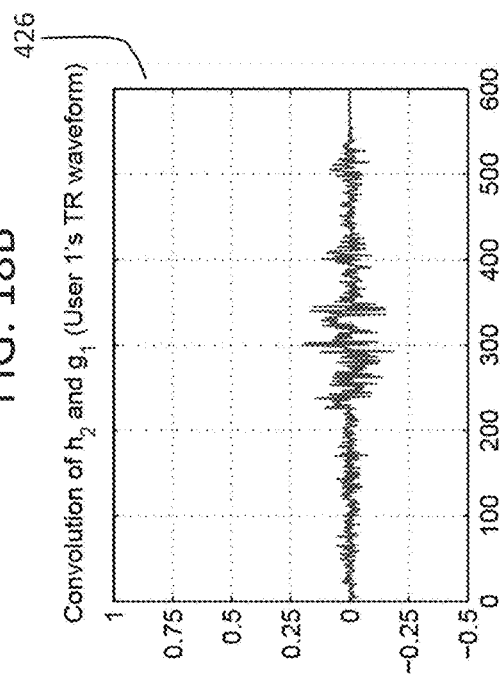
FIGS. 19A and 19B are graphs showing examples of convolutions of channel impulse responses and time-reversal signature waveforms.

Referring to FIG. 19A, a graph 424 shows the convolution of the channel impulse response for user 1 with the time-reversal signature waveform for user 1.

Figure 19B:
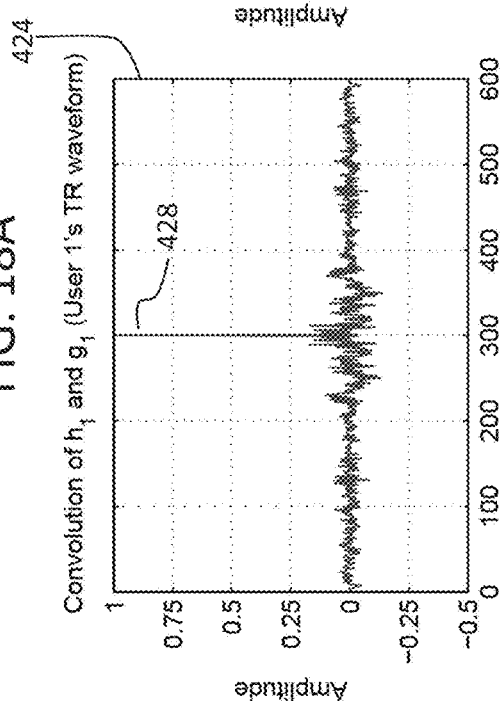

Referring to FIG. 19B, a graph 426 shows the convolution of the channel impulse response for user 2 with the time-reversal signature waveform for user 1.

The channels used for the simulations for the examples shown in FIGS. 18A and 18B are randomly generated according to the channel model specified in IEEE 802.15.4a, with the system sampling period $T_s=1$ ns and the channel length truncated (because the amplitude of the remaining paths after 300 ns is typically small enough to be neglected) at $LT_s=300$ ns (i.e., L=300).

In FIG. 19A, the convolution between user 1's channel impulse response $h_1$ and its matched time-reversal signature waveform $g_1$ exhibits a prominent central peak 428 at $(h_1*g_1)[L-1]$, demonstrating the temporal focusing effect of the time-reversal technique.

In FIG. 19B, the amplitude of the convolution between the time-reversal signature waveform $g_1$ and the mismatched channel impulse response $h_2$ is significantly smaller than the central peak $(h_1*g_1)[L-1]$ shown in FIG. 19A, demonstrating the virtual spatial focusing effect in the user's signature domain.

The following provides numerical evaluations on the predicted bit error rate performance of the 2D interference cancellation scheme. In the simulations, the channel impulse responses for various users are randomly and independently generated using the IEEE 8.2.15.4a channel model, with $T_s=1$ ns and L=300. Without loss of generality, the channel impulse response of each user is normalized so that $$\sum_{k=0}^{L-1} |h_i[k]|^2 = 1, \forall i \in \{1, 2, \ldots, N\},$$

and we assume that all the power control coefficients $a_i=1$, $\forall i \in \{1, 2, \ldots, N\}$. This provides equal power allocation among the users.

A large number of independent trials of channel realizations were conducted and averaged to characterize the average performance of the interference cancellation scheme under this channel model.

Bit Error Rate Versus $E_b/N_0$

The following describes the predicted bit error rate performance versus $E_b/N_0$ (the energy-per-bit to noise-power-spectral-density ratio) with various combinations of rate back-off factor D and the total number of users N. The energy-per-bit $E_b$ is normalized to 1 by the assumption that each BPSK symbol $X_i[k] \in \{-1,+1\}$ has a unit power. Accordingly, the power of the received additive white Gaussian noise (AWGN) $\tilde{n}[k]$ at the base station is given by $$\sigma_N^2 = \frac{N_0}{2} = \left(\frac{2E_b}{N_0}\right)^{-1}.$$

Figure 20:
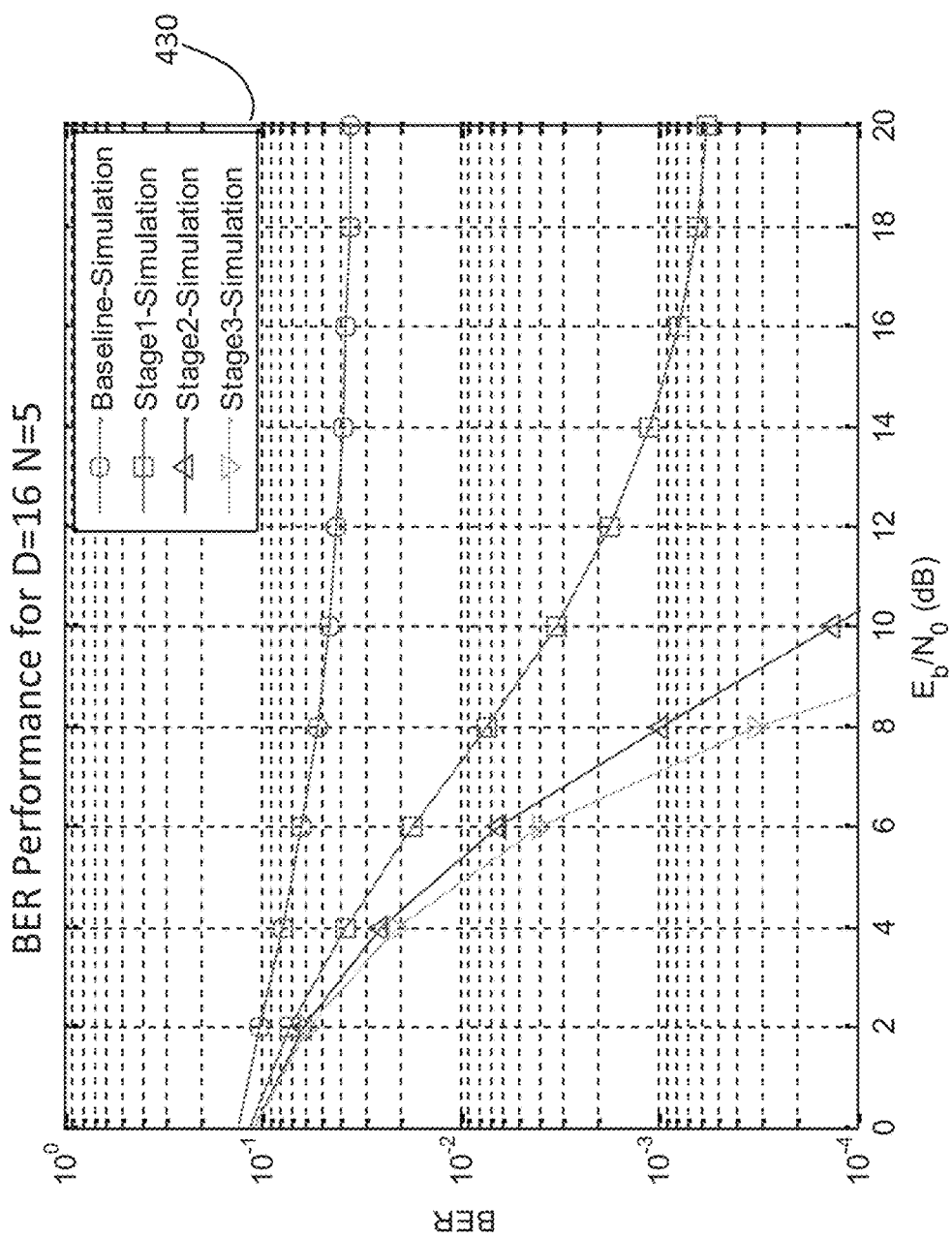
FIGS. 20 to 23 are graphs showing the bit error rate performances of the time reversal system using 2D parallel interference cancellation under various operation conditions.

Referring to FIG. 20, a graph 430 shows the predicted bit error rate performances of the 2D parallel interference cancellation scheme (up to 3 stages), compared with the basic time-reversal division multiple access system without interference cancellation. In the example of FIG. 20, the simulation considers that case where there are N=5 end-users accessing the base station at the same time with a rate back-off factor D=16 (about 5.3% of the channel length L=300).

Figure 21:
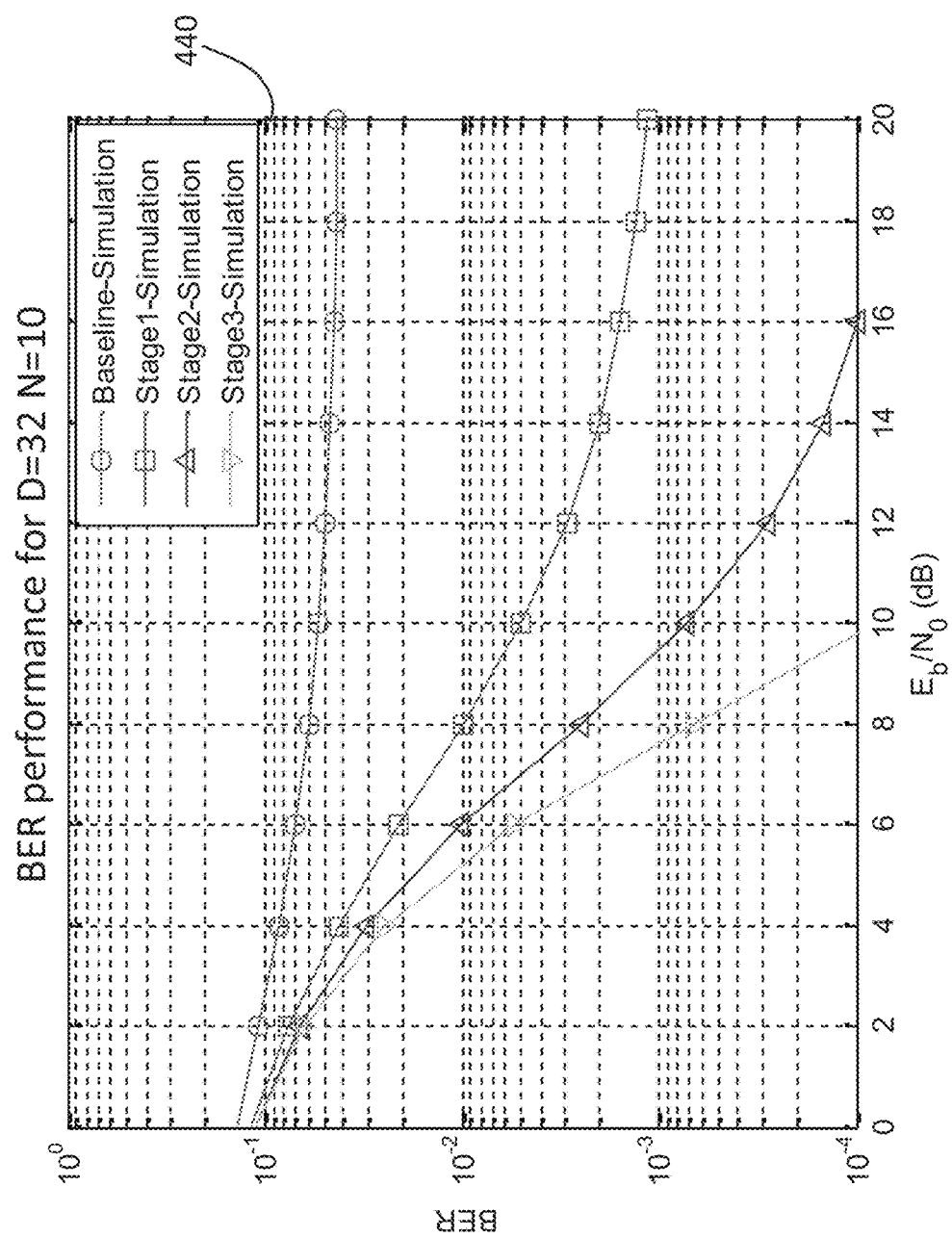

Referring to FIG. 21, a graph 440 shows the predicted bit error rate performances of the 2D parallel interference cancellation scheme (up to 3 stages), compared with the basic time-reversal division multiple access system without interference cancellation. In the example of FIG. 21, the simulation considers that case where there N=10 end-users accessing the base station at the same time with a rate back-off factor D=32 (about 10.7% of the channel length).

FIGS. 20 and 21 show that significant bit error rate performance gain can be achieved by the 2D parallel interference cancellation scheme, compared with the baseline time-reversal division multiple access system without interference cancellation. Additional gain can be achieved by cascading more stages of the interference cancellation scheme, at the price of increased decoding delay that grows linearly with the total number of stages. The largest gain-per-stage is obtained by the first stage, and the marginal gain diminishes for the following stages. There is a tradeoff between the system performance and the number of stages, and different tradeoffs can be considered for different applications. The theoretical approximation derived above matches reasonably well with the simulation results, considering its complicated correlation between tentative decisions and the Gaussian assumptions that were made in the approximation. A comparison of FIGS. 20 and 21 shows that the accuracy of the approximation improves as the number of users increases, which agrees with the central limit theorem.

High Signal-to-Noise Ratio Regime

Figure 22:
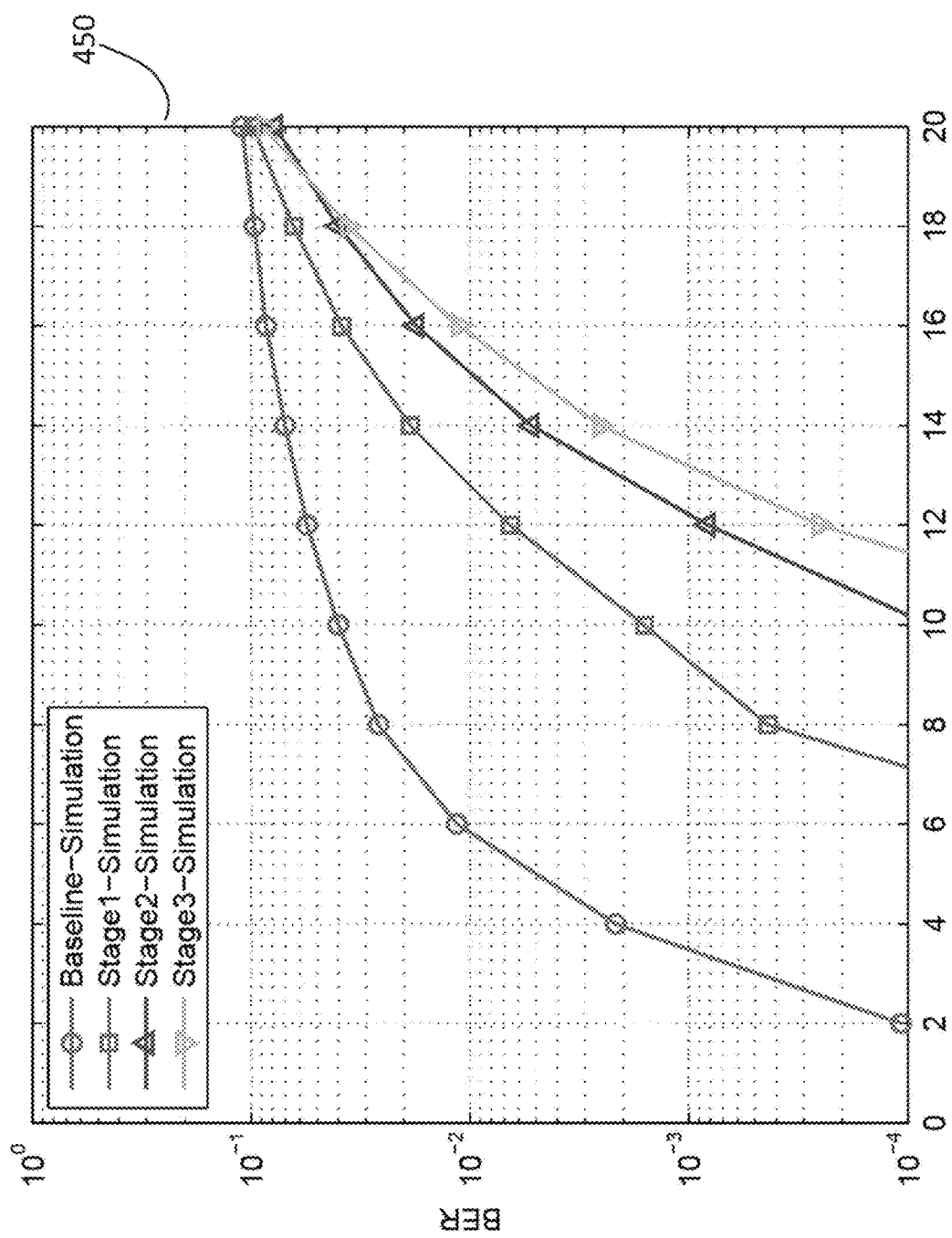

Referring to FIG. 22, a graph 450 shows how the predicted bit error rate performance changes with the number of users N with a high signal-to-noise ratio. In this example, the rate back-off factor D=32. The graph 450 shows that the predicted bit error rate increases with the number of users N due to the increased inter-user interference. For a given bit error rate level (e.g., $10^{-3}$), the 2D interference cancellation may enable more users to transmit simultaneously and therefore may increase the system capacity. The benefit of using the interference cancellation may diminish when the bit error rate of the baseline system (considered as the initial stage) is above a certain threshold. This is because the interference cancellation scheme at the receiver eventually relies on the tentative decisions of the detected symbols to cancel the interference, whose effectiveness depends on the quality of those tentative decisions.

Figure 23:
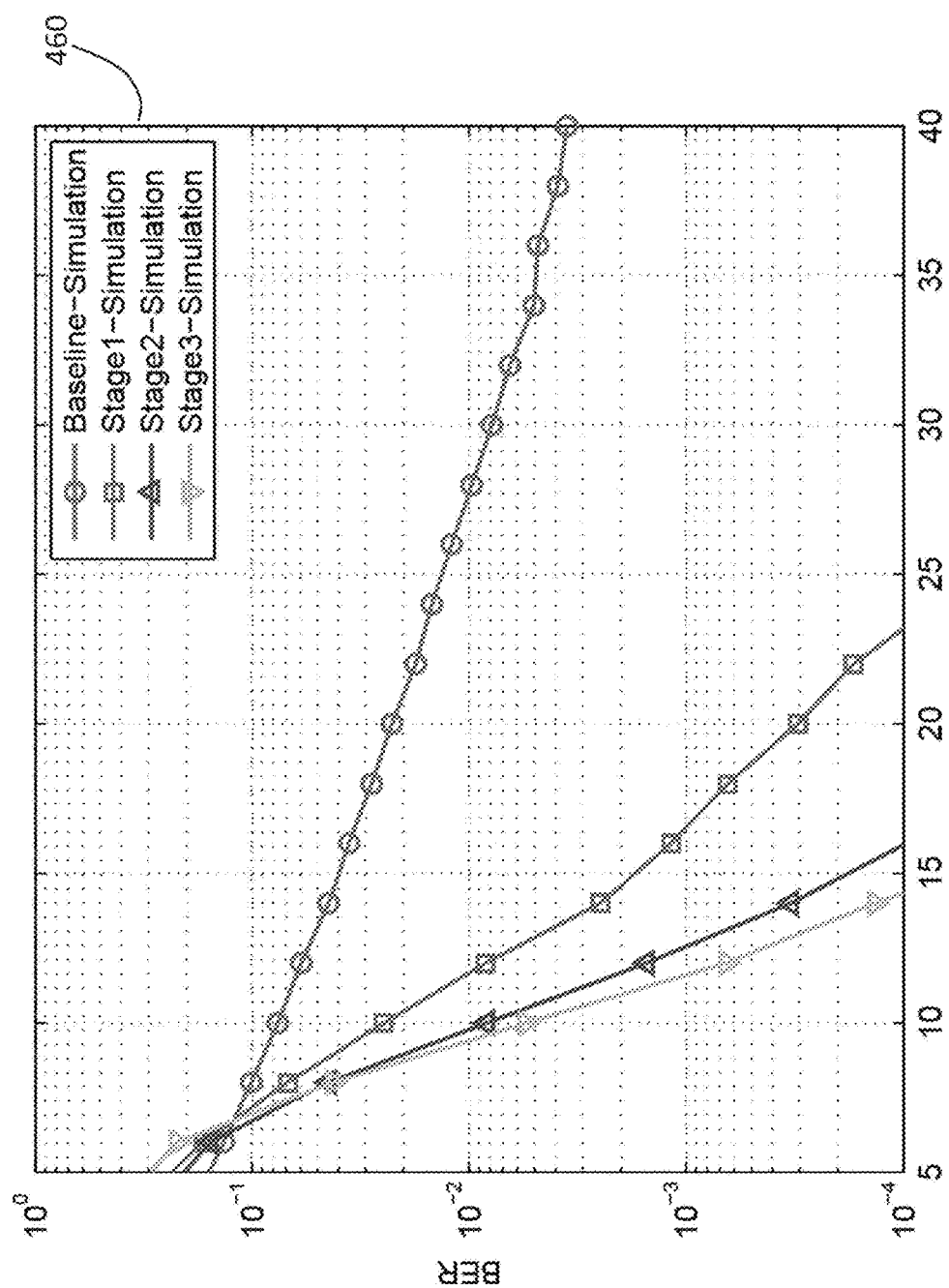

Referring to FIG. 23, a graph 460 shows how the predicted bit error rate performance is affected by the rate back-off factor D with high signal-to-noise ratio, assuming that there are 5 users accessing the base station simultaneously. Because both the inter-symbol interference and the inter-user interference are reduced with a larger rate back-off factor D, the predicted bit error rate decreases as D increases. The graph 460 shows that by using the 2D parallel interference cancellation scheme, the time-reversal division multiple access system can use a smaller D to achieve the same bit error rate, which translates to higher throughput for each user. When D is small (e.g., for D=6 (only 2% of the channel length)), there can be more erroneous tentative decisions (i.e., high bit error rate (greater than $10^{-9}$ for the initial stage), which in turn enhances the interference power, rather than canceling the interference. However, many time-reversal division multiple access applications will operate at a much lower bit error rate level, so the interference cancellation scheme is not expected to contribute to additional interference. Note that a lower bit error rate level can be achieved by increasing the rate back-off factor D and/or reducing the number of concurrent users N, thereby increasing the accuracy of the tentative decisions at the initial stage.

Figure 24:
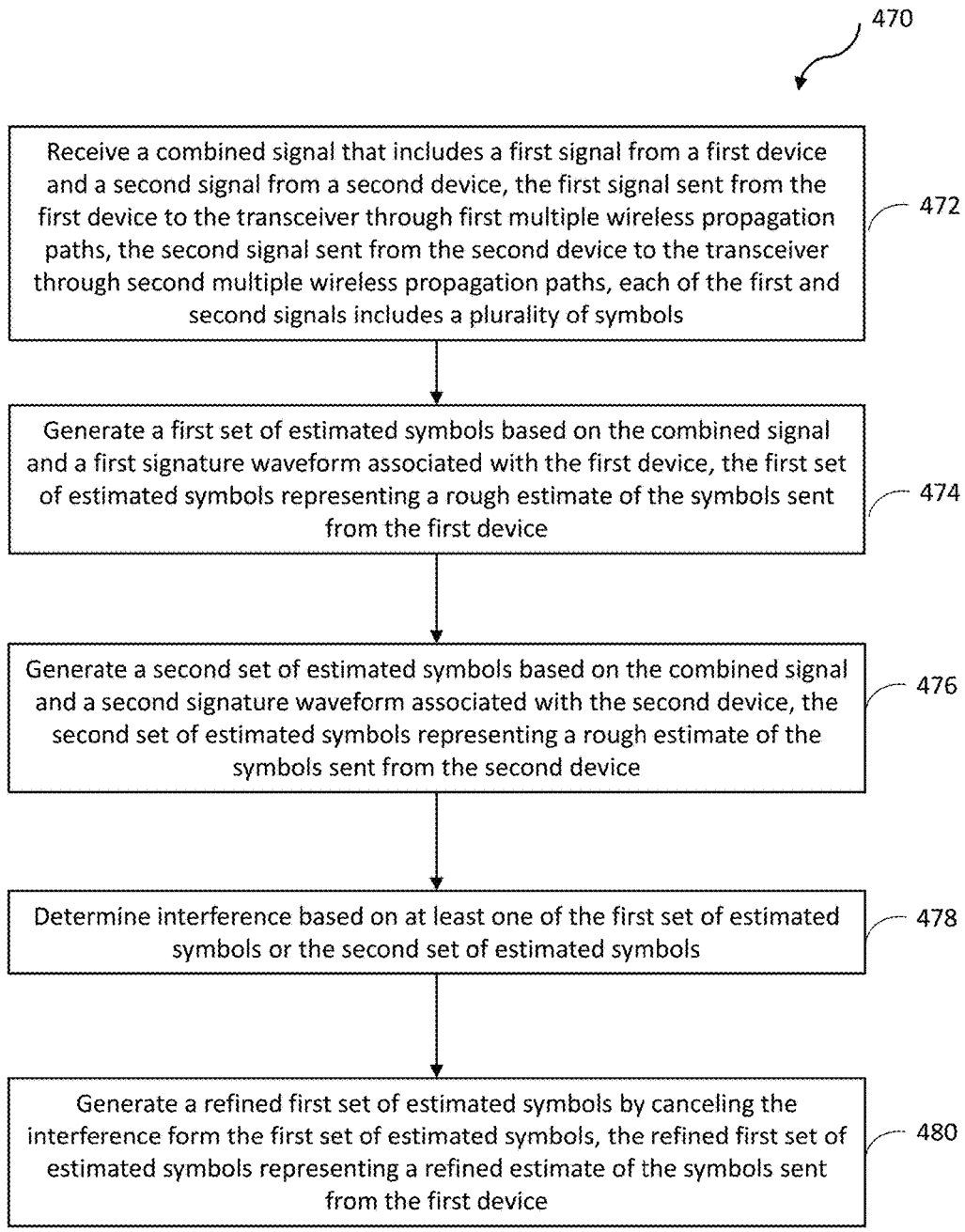
FIGS. 24 to 26 are flow diagrams of exemplary processes for asymmetric time-reversal wireless communication with interference cancellation.

Referring to FIG. 24, an exemplary process 470 for time-reversal wireless communication with interference cancellation is provided. For example, the process 470 can be implemented by the base station 1552 of FIG. 15. The process 470 may include at a transceiver, receiving a combined signal that includes a first signal from a first device and a second signal from a second device, the first signal sent from the first device to the transceiver through first multiple wireless propagation paths, the second signal sent from the second device to the transceiver through second multiple wireless propagation paths, each of the first and second signals including a plurality of symbols (472). For example, the transceiver can be part of the base station 1552, the first device can be the first terminal device 1554a, and the second device can be the second terminal device 1554b.

The process 470 may include generating a first set of estimated symbols based on the combined signal and a first signature waveform associated with the first device, the first set of estimated symbols representing a rough estimate of the symbols sent from the first device (474). For example, the base station 1552 can apply a signature waveform associated with the first terminal device 1554a to a combined signal to generate a first set of estimated symbols, e.g., according to Equation 13.

The process 470 may include generating a second set of estimated symbols based on the combined signal and a second signature waveform associated with the second device, the second set of estimated symbols representing a rough estimate of the symbols sent from the second device (476). For example, the base station 1552 can apply a signature waveform associated with the second terminal device 1554b to the combined signal to generate a second set of estimated symbols, e.g., according to Equation 13.

The process 470 may include determining interference based on at least one of the first set of estimated symbols or the second set of estimated symbols (478). For example, the base station 1552 can determine the interference, which can include inter-symbol interference and/or inter-user interference. For the first set of estimated symbols, the inter-symbol interference can be determined based on the first set of estimated symbols, and the inter-user interference can be determined based on the second set of estimated symbols. For the second set of estimated symbols, the inter-symbol interference can be determined based on the second set of estimated symbols, and the inter-user interference can be determined based on the first set of estimated symbols. For example, the interference can be determined according to Equations 24 and 25.

The process 470 may include generating a refined first set of estimated symbols by canceling the interference from the first set of estimated symbols, the refined first set of estimated symbols representing a refined estimate of the symbols sent from the first device (480). For example, the base station 1552 can generate the refined first set of estimated symbols by subtracting the inter-symbol interference and/or the inter-user interference from the first set of estimated symbols, e.g., according to Equation 27.

Figure 25:
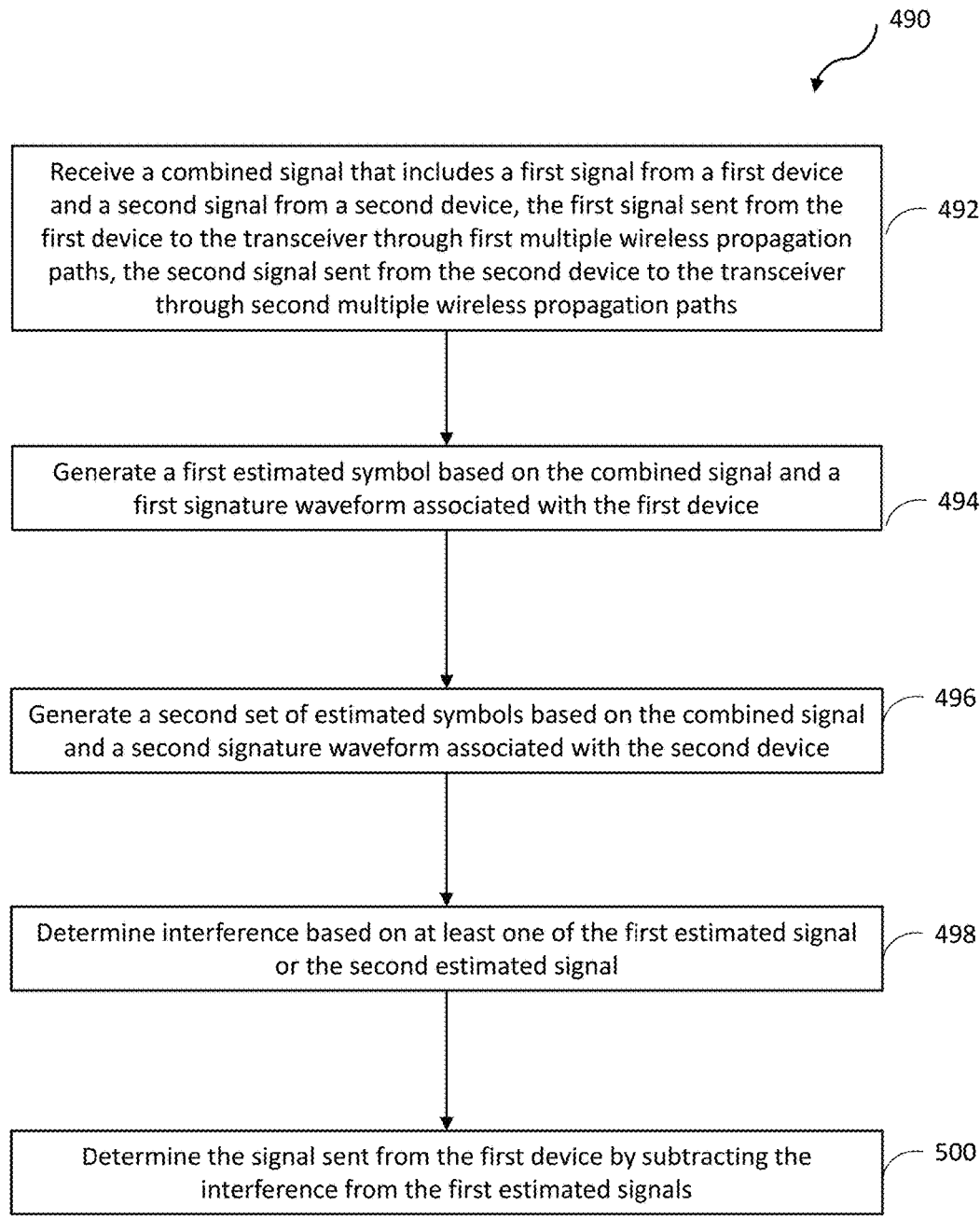

Referring to FIG. 25, an exemplary process 490 for time-reversal wireless communication with interference cancellation is provided. For example, the process 490 can be implemented by the base station 1552 of FIG. 15. The process 490 may include at a transceiver, receiving a combined signal that includes a first signal from a first device and a second signal from a second device, the first signal sent from the first device to the transceiver through first multiple wireless propagation paths, the second signal sent from the second device to the transceiver through second multiple wireless propagation paths (492). For example, the transceiver can be part of the base station 1552, the first device can be the first terminal device 1554a, and the second device can be the second terminal device 1554b.

The process 490 may include estimating the first signal sent from the first device to generate a first estimated signal based on the combined signal and a first signature waveform associated with the first device (494). For example, the base station 1552 can apply a signature waveform associated with the first terminal device 1554a to a combined signal to generate a first estimated signal.

The process 490 may include estimating the second signal sent from the second device to generate a second estimated signal based on the combined signal and a second signature waveform associated with the second device (496). For example, the base station 1552 can apply a signature waveform associated with the second terminal device 1554b to the combined signal to generate a second estimated signal.

The process 490 may include determining interference based on at least one of the first estimated signal or the second estimated signal (498). For example, the base station 1552 can determine the interference, which can include interference between signals from the same device and/or interference between signals from different devices. For the first estimated signal, the interference between signals from the same device can be determined based on the first estimated signal, and the interference between signals from different devices can be determined based on the second estimated signal. For the second estimated signal, the interference between signals from the same device can be determined based on the second estimated signal, and the interference between signals from different devices can be determined based on the first estimated signal.

The process 490 may include determining the signal sent from the first device by subtracting the interference from the first estimated signals (500). For example, the base station 1552 can determine the signal sent from the first device by subtracting the interference between signals from the same device and/or the interference between signals from different devices from the first estimated signal.

Figure 26:
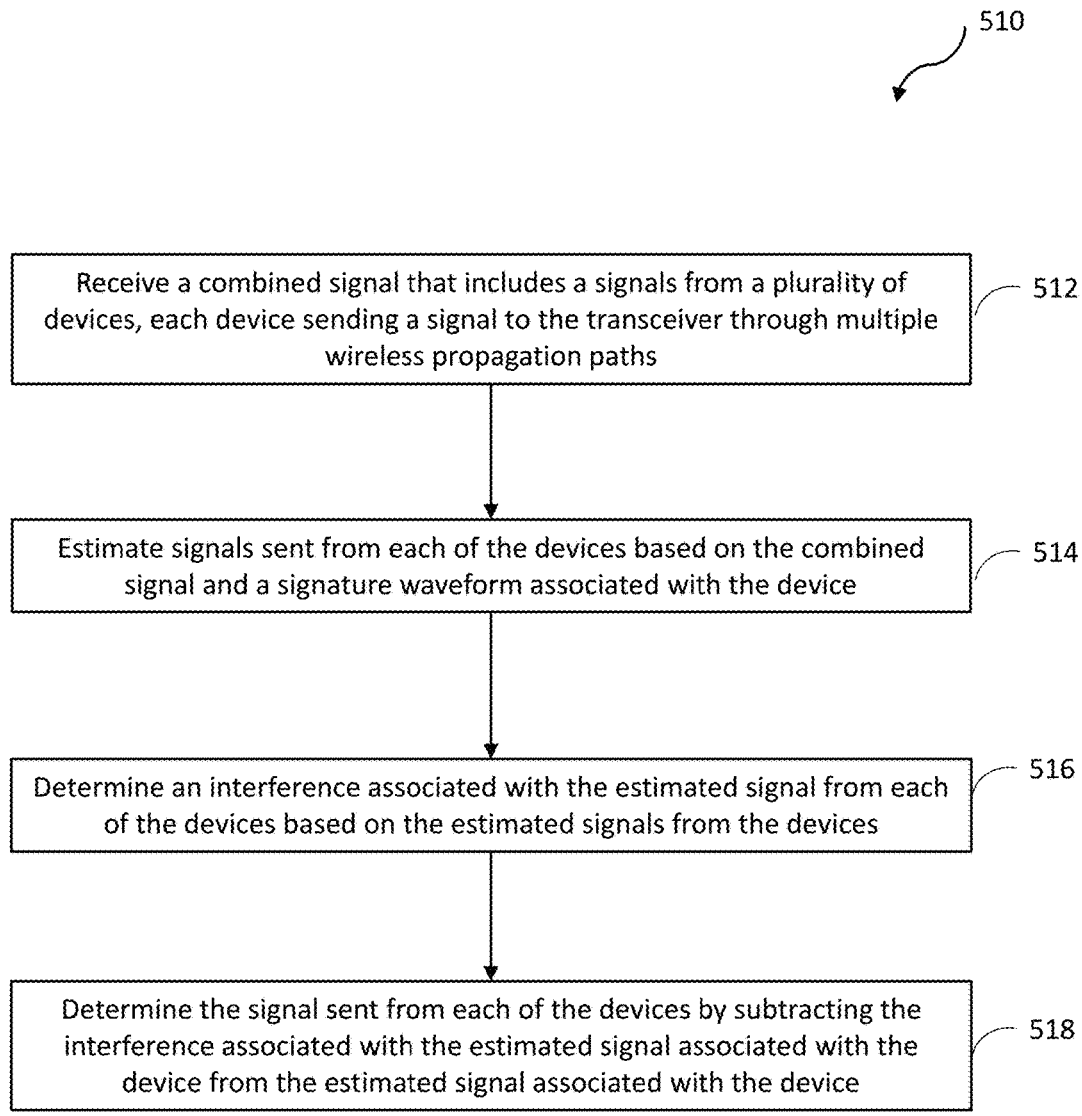

Referring to FIG. 26, an exemplary process 510 for time-reversal wireless communication with interference cancellation is provided. For example, the process 510 can be implemented by the base station 1552 of FIG. 15. The process 510 may include at a transceiver, receiving a combined signal that includes signals from a plurality of devices, each device sending a signal to the transceiver through multiple wireless propagation paths (512). For example, the transceiver can be part of the base station 1552, and the plurality of devices can include the first terminal device 1554*a* and the second terminal device 1554*b*.

The process 510 may include estimating signals sent from each of the devices based on the combined signal and a signature waveform associated with the device (514). For example, for each of the terminal devices 1554, the base station 1552 can apply a signature waveform associated with the terminal device 1554 to a combined signal to generate estimated signals for the terminal device 1554.

The process 510 may include determining an interference associated with the estimated signal from each of the devices based on the estimated signals from the devices (516). For example, the base station 1552 can determine the interference, which can include interference between signals from the same device and/or interference between signals from different devices. For each terminal device 1554, the interference between signals from the same device can be determined based on the estimated signal for the terminal device 1554, and the interference between signals from different devices can be determined based on the estimated signals for the other devices.

The process 510 may include determining the signal sent from each of the devices by subtracting the interference associated with the estimated signal associated with the device from the estimated signal associated with the device (518). For example, for each of the terminal devices 1554, the base station 1552 can determine the signal sent from the device by subtracting the interference between signals from the same device and/or the interference between signals from different devices from the estimated signal for the terminal device.

A multi-user time-reversal division multiple access uplink architecture and a 2D parallel interference cancellation scheme are provided to enhance the system performance. The TRDMA uplink architecture described above may keep the cost of the communication components of the end-users at a low level, and may reuse the processing power at the base station that has already been made available for the downlink. The 2D parallel interference cancellation scheme may utilize the tentative decisions of detected symbols to effectively reduce or cancel the interference in both the time dimension (ISI) and the user dimension (IUI). To further improve the bit error rate performance, a multi-stage scheme may be provided by cascading multiple stages of the 2D interference cancellation, with a total delay that increases linearly with the number of stages, but independent of the number of users.

In this disclosure, an asymmetric system architecture for the time reversal wireless communication system 150 has been described. The system 100 can have one or more of the following features and advantages:

The system 150 may use a single-carrier wireless broadband communication technology using the time reversal structure and other modified waveforms, which effectively suppress the inter-symbol interference.

The system 150 may leverage the time-reversal division multiple access concept to explore the spatial degrees of freedom, and thus enable multiple simultaneous transmissions on the same frequency band.

The system architecture described above can accommodate all types of waveform design (as a natural generalization of the time-reversed channel response), and arbitrary channel coding scheme (including the uncoded scheme).

When the time-reversal waveform is used as the signature waveform, the downlink scheme described above can form the spatial focusing effect of time reversal, focusing the signal power only at the locations of the intended terminal devices. Such a physical spatial focusing effect can reduce the co-channel interference and electromagnetic pollution to the environment, and may enhance the privacy and security of the transmitted message.

The asymmetric complexity-distribution between the base station (e.g., 152) (which has the most complexity) and the terminal devices (e.g., 154) (which can be of lower complexity) may make the terminal devices more affordable, which is a desirable feature for systems having a large number of terminal devices that may be limited by size, power, and/or computational capability.

The architecture design described above does not require channel equalization at the terminal devices to enable two-way communication.

In some implementations, the base station 152 can be part of a mobile or stationary device. For example, the base station 152 can be implemented as part of a sensor module, a controller, a mobile phone, a laptop computer, or an electronic appliance that communicates wirelessly with multiple other devices. For example, a mobile phone or a laptop computer may communicate simultaneously with a television, a printer, a thermometer, a radio, a refrigerator, a lighting control system, and other devices using the techniques described above. The base station may be an access point or a router and may be associated with a wireless hot spot, or wireless cell, or picocell, or nanocell and the like.

Systems Using Multiple Communication Protocols

In some implementations, the base station and the terminal devices can communicate with one another other using multiple communication protocols, including communication protocols that use time-reversal techniques and communication protocols that do not use time-reversal techniques. For example, a mobile phone may have a cellular module configured to communicate with a wireless telephone base station using cellular communication protocols, such as Global System for Mobile Communications (GSM), Code Division Multiple Access (CDMA), Long Term Evolution (LTE), or LTE Advanced protocols. The mobile phone may have a Wi-Fi module configured to communicate with a network router using Wi-Fi protocols (e.g., IEEE 802.11, 802.11a, 802.11b, 802.11g, 802.11n, 802.11ac, 802.11ad). The mobile phone may have a Bluetooth module configured to communicate with Bluetooth enabled devices. The mobile phone may have a time-reversal module configured to communicate with sensors and other devices using the time-reversal communication protocol described above.

Having the time-reversal module in combination with other communication modules may enhance the functionality of the mobile phone. For example, the mobile phone may route calls through the wireless telephone base station when the mobile phone is in an outdoor location, and switch to routing calls through time-reversal base stations when the mobile phone is in an indoor venue where multipath interference is high. For example, if a network router has both Wi-Fi and time-reversal modules, the mobile phone may communicate with the network router using Wi-Fi protocols when executing an application that requires a higher data rate (e.g., when sending image and video data), and switch to using the time-reversal protocol when executing an application that requires a lower data rate (e.g., when sending text or numerical data).

Figure 27:
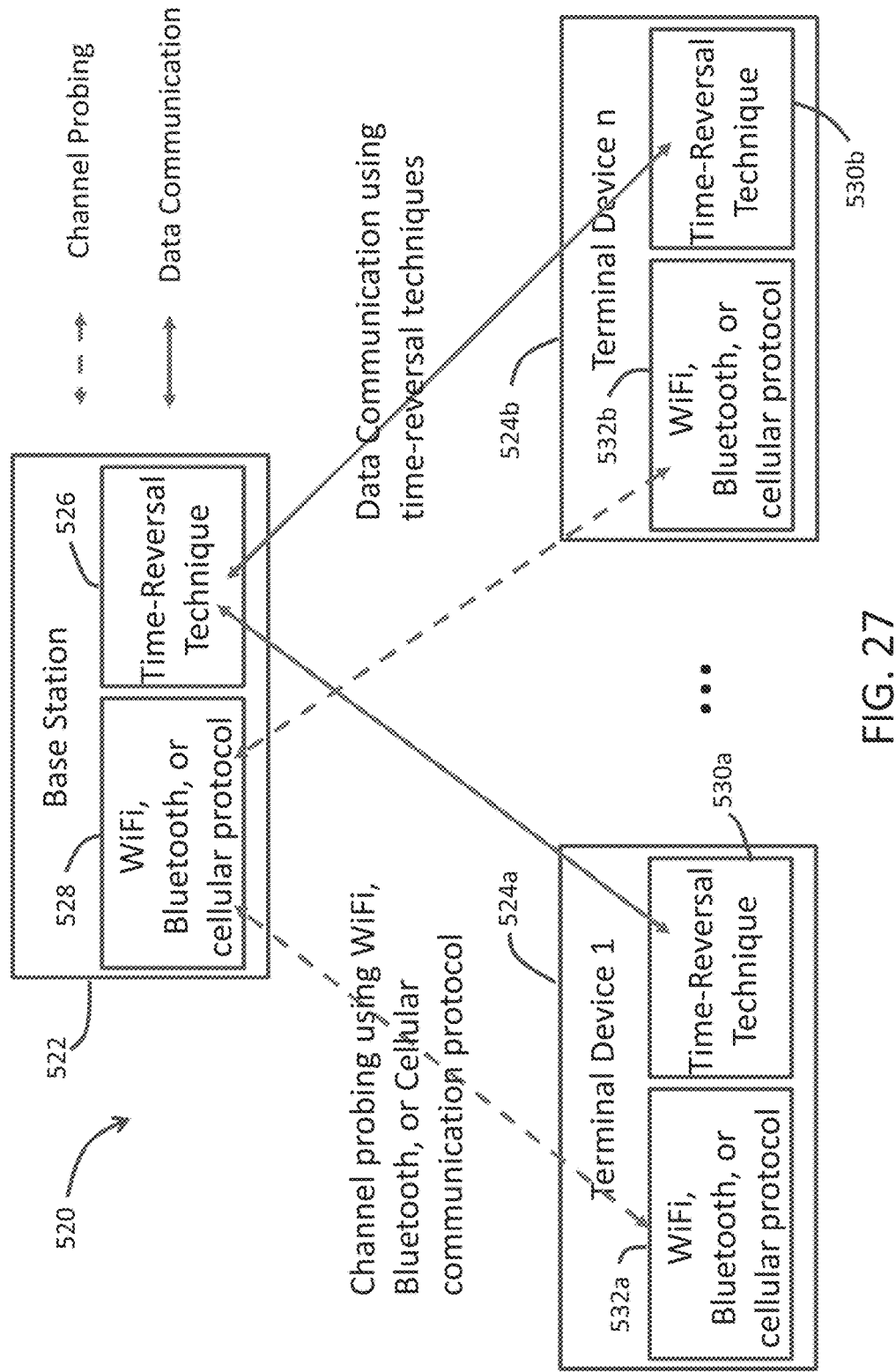
FIG. 27 is a diagram of an exemplary multi-user time reversal communication system that uses multiple communication protocols.

Referring to FIG. 27, in some exemplary implementations, a communication system 520 may include a base station 522 and multiple terminal devices (e.g., 524a, 524b, collectively 524). The base station 522 may include a first communication module 526 that uses the time-reversal communication techniques described above, and a second communication module 528 that uses the Wi-Fi, Bluetooth, or cellular communication protocol.

In the example of FIG. 27, the first terminal device 524a may have a first communication module 530a that uses time-reversal communication techniques, and a second communication module 532a that uses the Wi-Fi, Bluetooth, or cellular communication protocol. The second terminal device 524b may have a first communication module 530b that uses time-reversal communication techniques and a second communication module 532b that uses the Wi-Fi, Bluetooth, or cellular communication protocol. In the following description, depending on what communication protocol is used, the communication modules 528 and 532 may be referred to as a Wi-Fi communication module, a Bluetooth communication module, or a cellular communication module. In some examples, each of the base station 522 and terminal devices 524 may have two or more modules that comply with two or more of Wi-Fi, Bluetooth, cellular, and other communication protocols.

The time-reversal communication module 526 at the base station 522 may communicate with the time-reversal communication modules 530a, 530b at the first and second terminal devices 524a, 524b, respectively. The Wi-Fi (or Bluetooth, cellular) communication module 528 at the base station 522 may communicates with the Wi-Fi (or Bluetooth, cellular) communication modules 532a, 532b at the first and second terminal devices 524a, 524b, respectively.

In some implementations, the base station 522 and the terminal device 524a may perform a handshake or channel probing process using the Wi-Fi, Bluetooth, or cellular protocol in order to obtain channel information, then use time-reversal techniques to transmit data. In this example, the time-reversal communication module 526 can continuously transmit downlink data packets or receive uplink data packets to or from the time-reversal communication module 530a without the need to periodically perform hand-shake processes to obtain channel information. Another advantage of the system 520 is that existing Wi-Fi and/or cellular communication hardware can be used for channel probing for time-reversal communications.

There are multiple channels in Wi-Fi and cellular protocols, in which each channel can be, e.g., 5 MHz for cellular protocol and 20/40 MHz for the Wi-Fi protocol. The channel information for each channel can be obtained according to the respective cellular or Wi-Fi protocol. By combining the channel information of multiple channels, we can obtain the channel information for a wider band and then generate the corresponding signature waveform for time-reversal communications.

In some implementations, both communication modules 526, 528 may be used to transmit data. For example, the base station 522 may initially use the Wi-Fi (or Bluetooth, cellular) communication module 528 to establish a Wi-Fi (or Bluetooth, cellular) communication link with the terminal device 524a, then based on certain criteria, switch to using the time-reversal communication module 526 to establish a communication link with the terminal device 524a.

The criteria for switching may be based on one or more factors such as interference level of the communication channel, battery level of the terminal device, location of the terminal device, and the type of data being transmitted. For example, the Wi-Fi communication modules 528, 532 may be used when the interference level is below a threshold, and the time-reversal communication modules 526, 530 may be used when the interference level is above the threshold. The Wi-Fi communication modules 528, 532 may be used when the application requires a higher data rate (e.g., when transmitting image or video data), and the time-reversal communication modules 526, 530 may be used when the application requires a lower data rate (e.g., when transmitting text or numerical data). The Wi-Fi communication modules 528, 532 may be used when the terminal device 524 has sufficient battery power, and the time-reversal communication modules 526, 530 may be used when the battery level of the terminal device 524 is low. The time-reversal communication module 530 may consume less power than the Wi-Fi communication module 532, so switching to using the time-reversal communication module 530 may reduce power consumption and allow the terminal device 524 to operate for a longer period of time using battery power.

The base station 522 and the terminal device 524 may perform a handoff procedure to terminate the Wi-Fi (or Bluetooth, cellular) communication session between the modules 526, 530, and initiate a time-reversal communication session between the modules 528, 532. Prior to handoff, the base station 522 may send a command signal to the terminal device 524 to initiate the handoff procedure. The time-reversal communication modules 530 and 526 may perform a hand-shake process to obtain channel and timing information. The switching from using the Wi-Fi (or Bluetooth, cellular) protocol to using the time-reversal communication protocol, or vice versa, can be initiated by either the base station 522 or the terminal device 524.

In some implementations, prior to switching from the Wi-Fi protocol to the time-reversal communication protocol, the base station 522 and the terminal device 524 may test the signal quality of the link between the modules 526 and 530, and only switch to using the modules 526 and 530 if the time-reversal communication link meets predetermined quality criteria.

In some implementations, after switching to using the communication modules 526, 530, the base station 522 and the terminal device 524 may switch back to using the communication modules 528, 532 if certain criteria are met. For example, if switching from Wi-Fi to time-reversal is due to interference the base station 522 and the terminal device 524 may periodically test the communication link between the Wi-Fi communication modules 528 and 532, and if the signal quality satisfies predetermined criteria, the base station 522 and the terminal device 524 perform another handoff procedure to switch to using the Wi-Fi communication modules 528 and 532.

In some implementations, the base station 522 may communicate with a first group of terminal devices 524 using the Wi-Fi (or Bluetooth, cellular) protocol, and communicate with a second group of terminal devices 524 using the time-reversal communication protocol.

In FIG. 27, the communication modules 526 and 528 are shown as two separate blocks. In some examples, the modules 526 and 528 can have overlapping components, such as sharing one or more common data processors, controllers, and/or memory components.

The Wi-Fi, Bluetooth, and cellular communication protocols each has a substantially symmetric architecture, whereas the time-reversal communication protocol may have an asymmetric architecture. An asymmetric architecture of time-reversal communication can be seen from the examples shown in FIGS. 6 and 7, in which the complex signal processing (e.g., performing convolution computations) is performed at the base station for both uplink and downlink.

Referring to FIGS. 28A and 28B, for example, a device that is configured to communicate according to the Wi-Fi protocol may include both a transmitter 540 as shown in FIG. 28A, and a receiver 550 as shown in FIG. 28B. For example, the Wi-Fi communication module 528 of the base station 522 in FIG. 27 may include both the transmitter 540 and the receiver 550. Likewise, the Wi-Fi communication module 532 of the terminal device 524 may include both the transmitter 540 and the receiver 550. For the downlink, the transmitter 540 at the base station 522 may send data to the receiver 550 at the terminal device 524. For the uplink, the transmitter 540 at the terminal device 524 may send data to the receiver 550 at the base station 522.

The complexity of signal processing at the transmitter 540 may be comparable to that of the signal processing at the receiver 550, except that the operations are substantially reversed. For example, at the transmitter 540, channel coding (e.g., convolution code) may be applied to binary input data, and mapped according to a specific modulation (such as QPSK, 16QAM, or 64QAM). Pilot symbols may be inserted into the modulated data, and the inserted data may undergo serial-to-parallel (S/P) conversion, forming a vector of symbols. An inverse Fourier transform (IFFT) can be performed on the vector of symbols to generate a time-domain vector. After parallel-to-serial conversion (P/S), cyclic prefixes can be added to reduce interference. The output signal can then be modulated by a radio frequency carrier and transmitted through an antenna.

At the receiver 550, the opposite or reverse set of operations can be performed. A radio frequency signal may be received at the antenna and processed (e.g., including A/D conversion and low-pass filtering), and cyclic prefixes may be removed from the received signal. The signal may go through a serial-to-parallel (S/P) conversion to form a vector. A fast Fourier transform (FFT) may be performed on the vector, generating a frequency-domain vector. After parallel-to-serial conversion (P/S), the pilot may be deleted. The signal may then go through demodulation and channel decoding to estimate the transmitted binary data.

FIGS. 28A and 28B show that the signal processing at the transmitter 540 and the receiver 550 may be substantially symmetrical, thus the Wi-Fi protocol may be said to have a substantially symmetrical architecture. Moreover, the signal processing performed by the transmitter 540 at the base station 522 during downlink may be substantially the same as the signal processing performed by the transmitter 540 at the terminal device 524 during uplink. Likewise, the signal processing performed by the receiver 550 at the terminal device 524 during downlink may be substantially the same as the signal processing performed by the receiver 550 at the base station 522 during uplink.

Note that various modifications can be made to the transmitter 540 and the receiver 550. The transmitter 540 (or receiver 550) at the base station 522 may be implemented differently from the transmitter 540 (or receiver 550) at the terminal device 524. For example, the transmitter 540 at the base station 522 may use a data processor that is more powerful than the data processor used by the transmitter 540 at the terminal device 524. When we say that the Wi-Fi protocol has a substantially symmetrical architecture, we mean that the signal processing specified by the Wi-Fi protocol for the base station is comparable to that for the terminal device, even though the base station may have circuitry (including, e.g., data processor, memory, active/passive electronic components), software, and/or firmware different from those of the terminal device.

FIGS. 29A and 29B show the substantially symmetric architecture of a 4G LTE downlink. FIGS. 30A and 30B show the substantially symmetric architecture of a 4G LTE uplink. For example, an LTE communication module at the base station may include a transmitter 560 as shown in FIG. 29A and a receiver 590 as shown in FIG. 30B. A LTE communication module at the terminal device may include a transmitter 580 as shown in FIG. 30A and a receiver 570 as shown in FIG. 29B. In the downlink, the transmitter 560 at the base station may send data to the receiver 570 at the terminal device. In the uplink, the transmitter 580 at the terminal device may send data to the receiver 590 at the base station.

Referring to FIG. 29A, in the 4G LTE downlink, at the transmitter 560 at the base station, a sequence of bits to be transmitted to a terminal device may undergo a serial-to-parallel (S/P) conversion, forming a vector of symbols. The vector of symbols may be re-organized through a sub-carrier mapping. An inverse Fourier transform (IFFT) can be performed on the re-organized vector to generate a time-domain vector. After parallel-to-serial conversion (P/S), cyclic prefixes can be added to reduce interference. The output signal can then be modulated by a radio frequency carrier and transmitted through an antenna.

Referring to FIG. 29B, at the receiver at the terminal device, the opposite set of operations may be performed. A radio frequency signal may be received at an antenna and processed (e.g., including A/D conversion and low-pass filtering), and cyclic prefixes may be removed from the received signal. The signal may go through a serial-to-parallel (S/P) conversion to form a vector. A fast Fourier transform (FFT) can be applied to the vector, generating a frequency-domain vector. Then, sub-carrier demapping/equalization can be applied to extract the information for the terminal device. After a parallel-to-serial conversion (P/S), the transmitted data can be obtained at the terminal device.

Referring to FIGS. 30A and 30B, in the 4G LTE uplink, the signal processing procedures may be similar to the downlink except that at the transmitter 580 of the terminal device, a fast Fourier transform (FFT) may be applied before the subcarrier mapping, and at the receiver 590 of the base station, an inverse fast Fourier transform (IFFT) may be performed after the subcarrier demapping.

FIGS. 29A and 29B show that in the 4G LTE downlink, the signal processing at the transmitter 560 and the receiver 570 may be substantially symmetrical. FIGS. 30A and 30B show that the signal processing at the transmitter 580 and the receiver 590 may be substantially symmetrical. For both downlink and uplink, the complexity of signal processing at the terminal device may be comparable to that of the signal processing at the base station. Thus, the 4G LTE protocol may be said to have a substantially symmetrical architecture.

The above example shows the substantially symmetrical architecture of a communication system based on 4G LTE communication protocol. Other cellular communication protocols, such as GSM or CDMA, also may have substantially symmetrical architectures in which for the downlink and uplink, the complexity of signal processing at the base station is similar to that at the terminal device.

Note that various modifications can be made to the transmitter and the receiver and the base station and the terminal device, and the transmitter and receiver may be implemented using different electronic components. When we say that the 4G LTE protocol or other cellular communication protocol has a substantially symmetrical architecture, we mean that the signal processing specified by the LTE or other cellular communication protocol for the base station is comparable to that for the terminal device, even though the base station may have circuitry (including, e.g., data processor, memory, active/passive electronic components), software, and/or firmware different from those of the terminal device.

System Using Symmetric and Asymmetric Time-Reversal Communication

The following describes a time-reversal communication system that uses two types of time-reversal communication techniques, one symmetrical and the other asymmetrical.

Figures 31A, 31B:
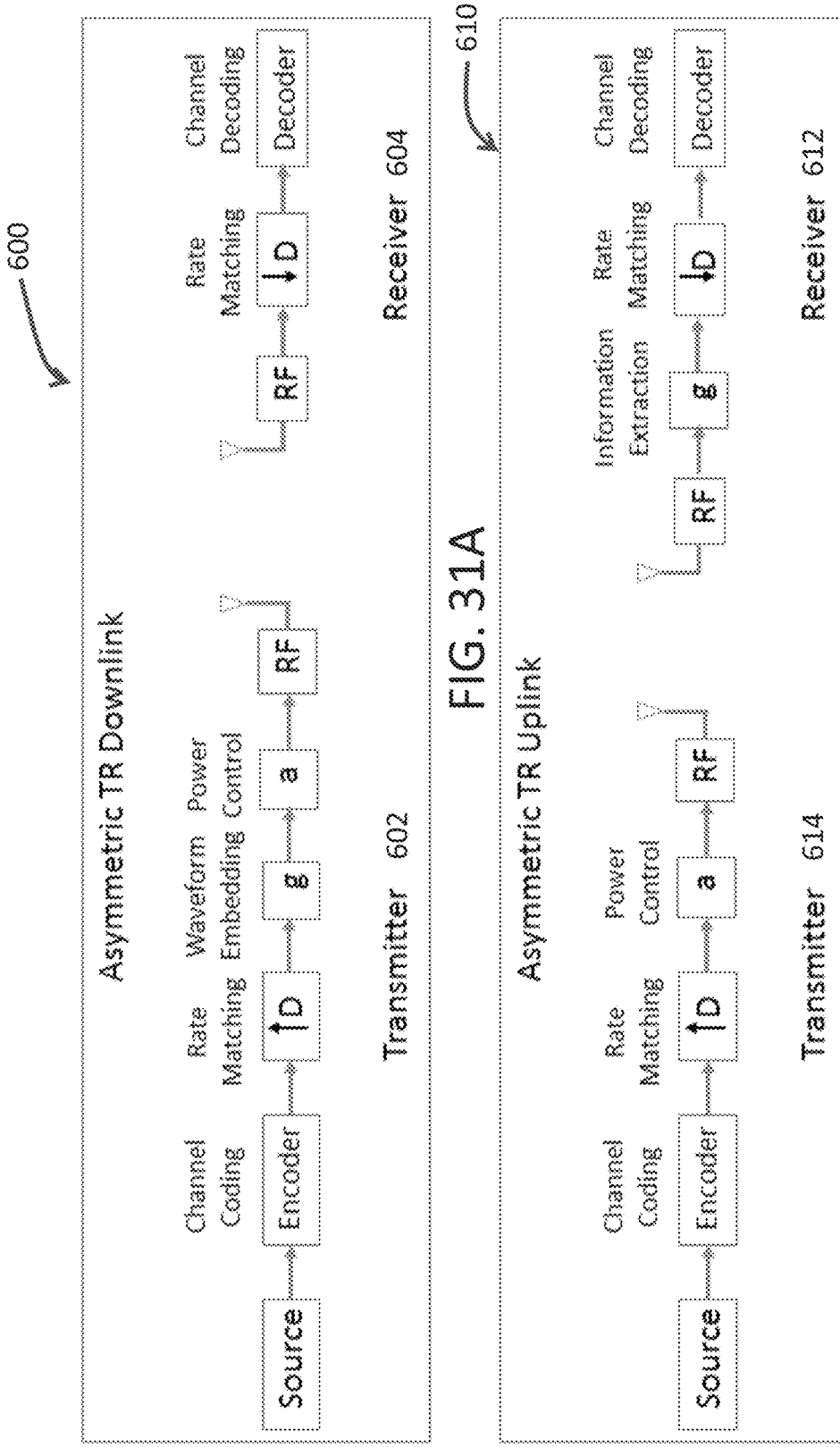
FIG. 31A is a diagram of an exemplary downlink architecture of an asymmetrical time-reversal communication system.
FIG. 31B is a diagram of an exemplary uplink architecture of the asymmetrical time-reversal communication system.

FIG. 31A shows an exemplary downlink architecture 600 of an asymmetrical time-reversal communication system, and FIG. 31B shows an exemplary uplink architecture 610 of the asymmetrical time-reversal communication system. The downlink architecture 600 is a simplified version of that shown in FIG. 6, and the uplink architecture 610 is a simplified version of that shown in FIG. 7. In the asymmetrical time-reversal communication system, a base station may include a transmitter 602 of FIG. 31A and a receiver 612 of FIG. 31B, and a terminal device may include a receiver 604 of FIG. 31A and a transmitter 614 of FIG. 31B.

For the downlink, the transmitter 602 at the base station may transmit data to the receiver 604 at the terminal device. For the uplink, the transmitter 614 at the terminal device may transmit data to the receiver 612 at the base station. For the downlink, the transmitter 602 at the base station may perform waveform embedding, in which up-sampled sequences are embedded with a signature waveform (calculated based on the channel response obtained in a handshaking process). The receiver 604 at the terminal device may not need to perform signal processing that involves the signature waveform. For the uplink, the receiver 612 at the base station may perform information extraction, in which a convolution process may be performed between an input signal and the signature waveform. The transmitter 614 at the terminal device may not need to perform any signal processing that involves the signature waveform. Thus, the signal processing may be more complicated at the base station than at the terminal device, for both downlink and uplink.

Figure 32:
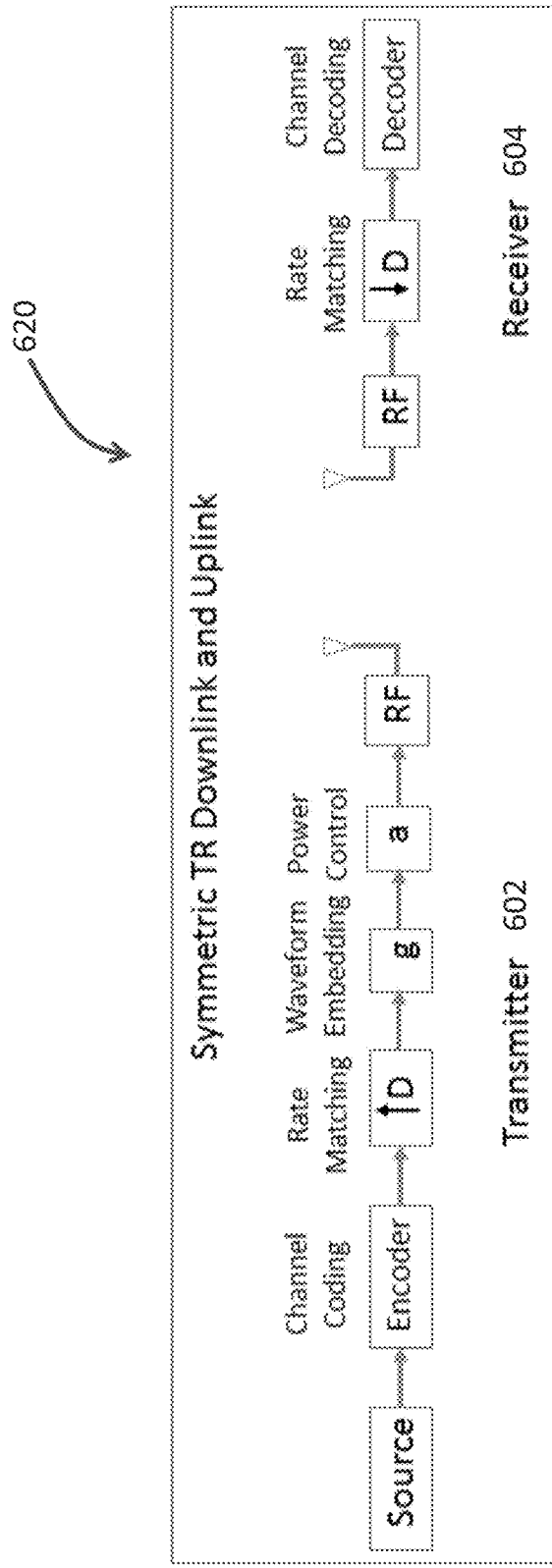
FIG. 32 is a diagram of an exemplary symmetrical time-reversal communication system.

FIG. 32 shows an exemplary symmetrical time-reversal communication system 620, in which a base station includes both a transmitter 602 and a receiver 604. The transmitter 602 and receiver 604 in FIG. 32 are the same as those in FIG. 31A. A terminal device may also include both a transmitter 602 and a receiver 604. For the downlink, the transmitter 602 of the base station may send data to the receiver 604 of the terminal device. For the uplink, the transmitter 602 of the terminal device may send data to the receiver 604 of the base station.

In the symmetric time-reversal downlink, the terminal device may first send a channel probing signal to the base station to allow the base station to obtain channel information and calculate a signature waveform for the terminal device. In the symmetric time-reversal uplink, the base station may first send a channel probing signal to the terminal device to allow the terminal device to obtain channel information and calculate a signature waveform for the base station. Thus, in the symmetrical time-reversal communication system, the signal processing performed by the base station and the terminal device may be similar.

In a symmetrical time-reversal communication system, when there are multiple terminal devices, the base station can use time division multiplexing to communicate with each of the terminal devices. Alternatively, the base station can use multiple antennas to receive focused signals from the multiple terminal devices.

Figure 33:
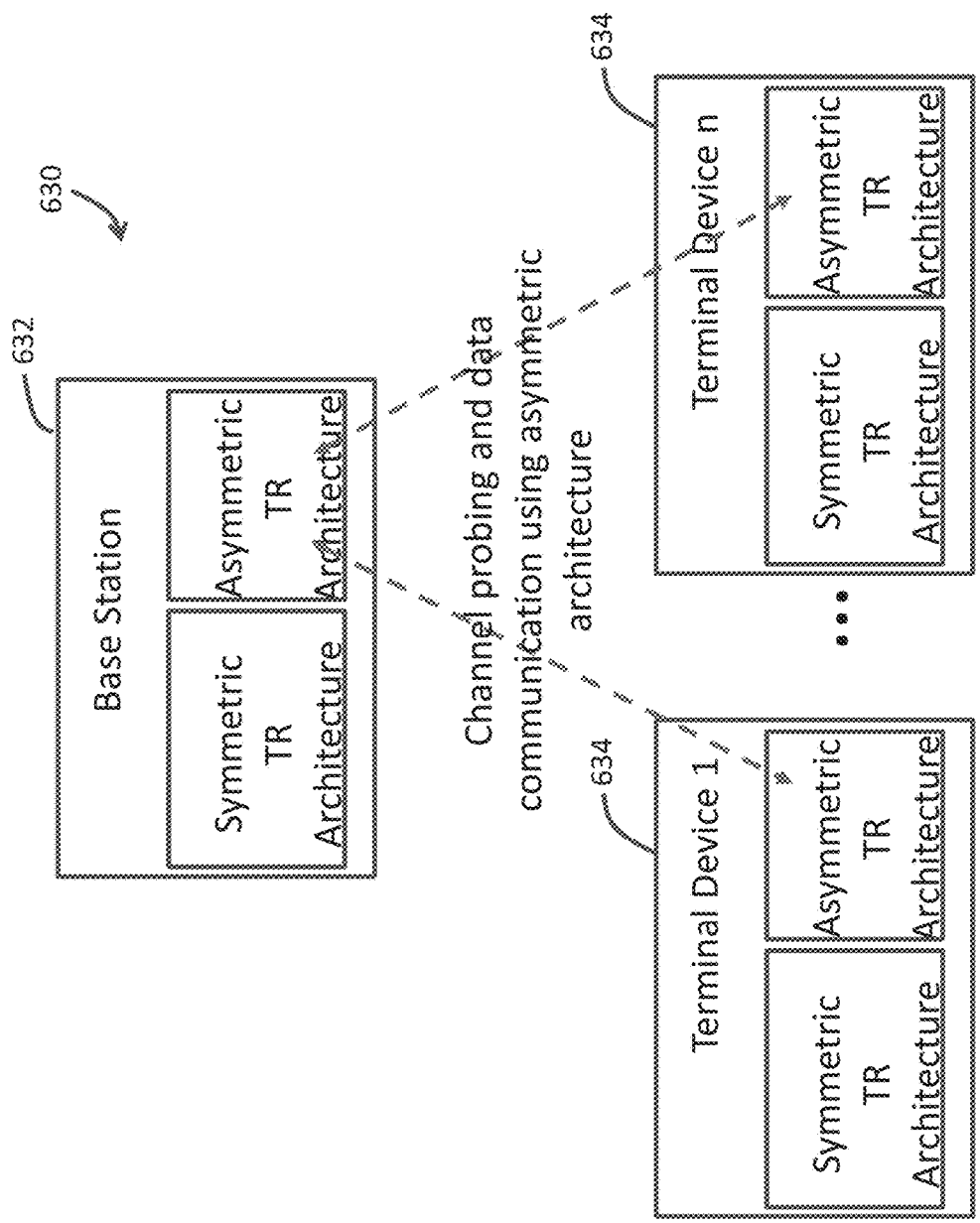
FIG. 33 is a diagram of exemplary system architectures of a base station and terminal devices that use both symmetrical and asymmetrical time-reversal communication.

Referring to FIG. 33, in some implementations, a time-reversal communication system 630 may include a base station 632 that is configured to communicate with terminal devices 634 using a symmetrical time-reversal architecture and an asymmetrical time-reversal architecture.

Figure 34:
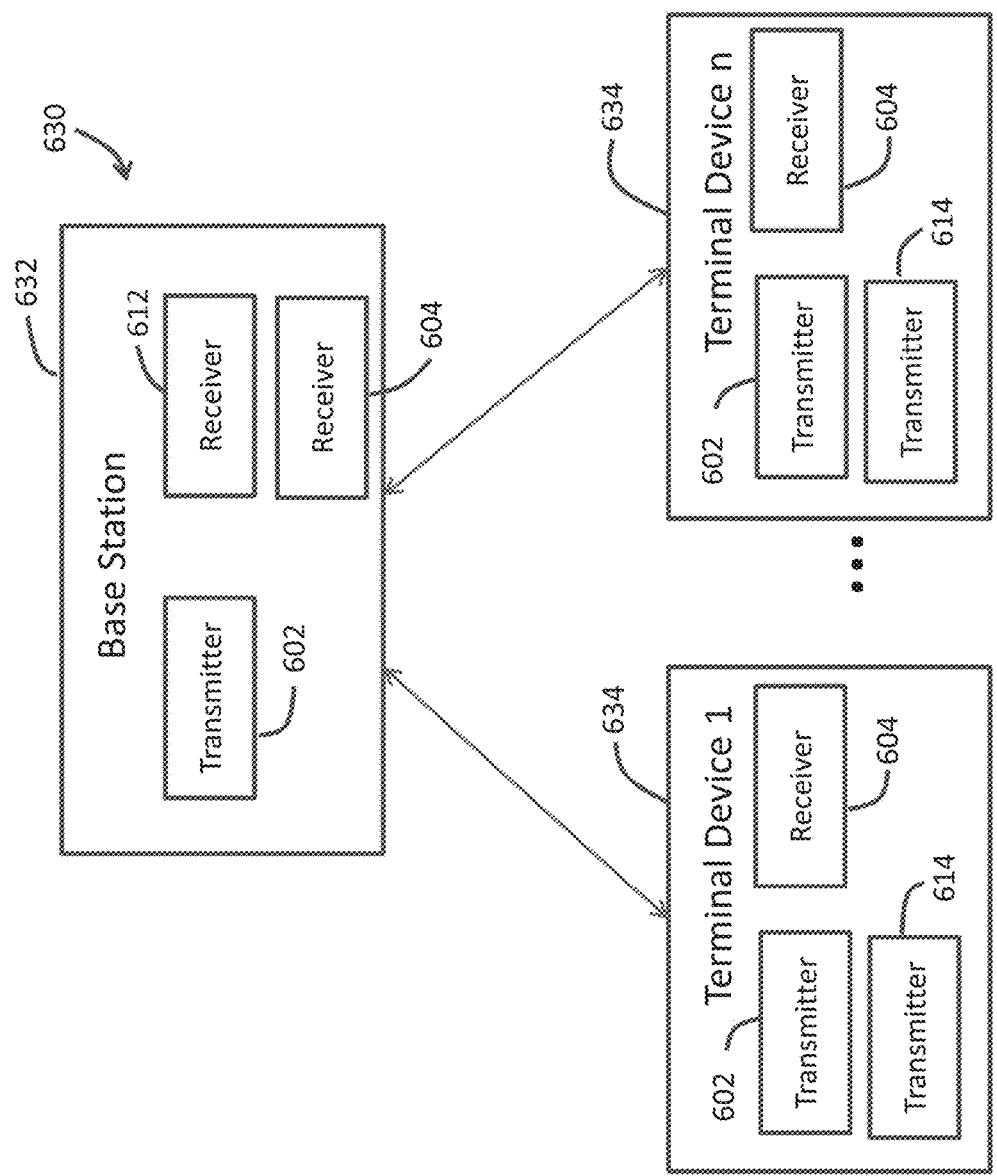
FIG. 34 is a diagram of an implementation of a base station and terminal devices that use both symmetrical and asymmetrical time-reversal communication.

FIG. 34 shows an exemplary implementation of the architecture shown in FIG. 33. A base station 632 may include a transmitter 602 (FIG. 31A), a receiver 604, and a receiver 612 (FIG. 31B). A terminal device 634 may include a transmitter 602, a transmitter 614 (FIG. 31B), and a receiver 604. When operating in the asymmetrical time-reversal communication mode, for the downlink, the transmitter 602 of the base station 632 may send data to the receiver 604 of the terminal device 634. For the uplink, the transmitter 614 of the terminal device 634 may send data to the receiver 612 of the base station 632. When operating in the symmetric time-reversal communication mode, for the downlink, the transmitter 602 of the base station 632 may send data to the receiver 604 of the terminal device 634. For the uplink, the transmitter 602 of the terminal device 634 may send data to the receiver 604 of the base station 632.

The difference between symmetric time-reversal communication and asymmetric time-reversal communication may be in the uplink. In the asymmetric time-reversal communication, for the uplink, the terminal device may directly transmit the data, and the base station or access point may need to perform convolution to have virtual focusing and to extract uplink data. One advantage of the asymmetric time-reversal communication is that the complexity at the terminal device can be low.

By comparison, for the symmetric time-reversal communication, in the uplink, the terminal device may need to perform convolution of transmit data with a signature waveform before transmission, which may enable physical focusing of the transmit signal at the base station. Another device that is at a distance from the base station may not be able to receive the uplink data. Therefore, depending on different purposes, the terminal device may switch between different modes (i.e., asymmetric or symmetric time-reversal communication).

Each of the base station and terminal devices can include one or more processors and one or more computer-readable mediums (e.g., RAM, ROM, SDRAM, hard disk, optical disk, and flash memory). For example, the one or more processors can implement functions of the waveform embedding 176 (FIG. 6) and information extraction 200

(FIG. 7). The one or more processors can perform calculations based on one or more of Equations 1 to 32. The waveform embedding 176 and information extraction 200 can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that may be executable on a programmable system including at least one programmable processor coupled to receive data and instructions from, and to transmit data and instructions to, a data storage system, at least one input device, and at least one output device. A computer program may be a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). Flash memory and/or any type of known memory are within the scope of the invention.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For example, the system 150 can combine time division multiplexing with frequency division multiplexing to allow a base station to communicate with a first group of terminal devices at a first frequency and a second group of terminal devices at a second frequency. In this example, the base station can perform a hand-shaking process with two or more terminal devices at different frequencies. The base station 152 and terminal devices 154 can include more components that are not shown in the figures. For example, standard components such as analog-to-digital converters, digital-to-analog converters, and power amplifiers have been omitted from the figures.

Figure 35:
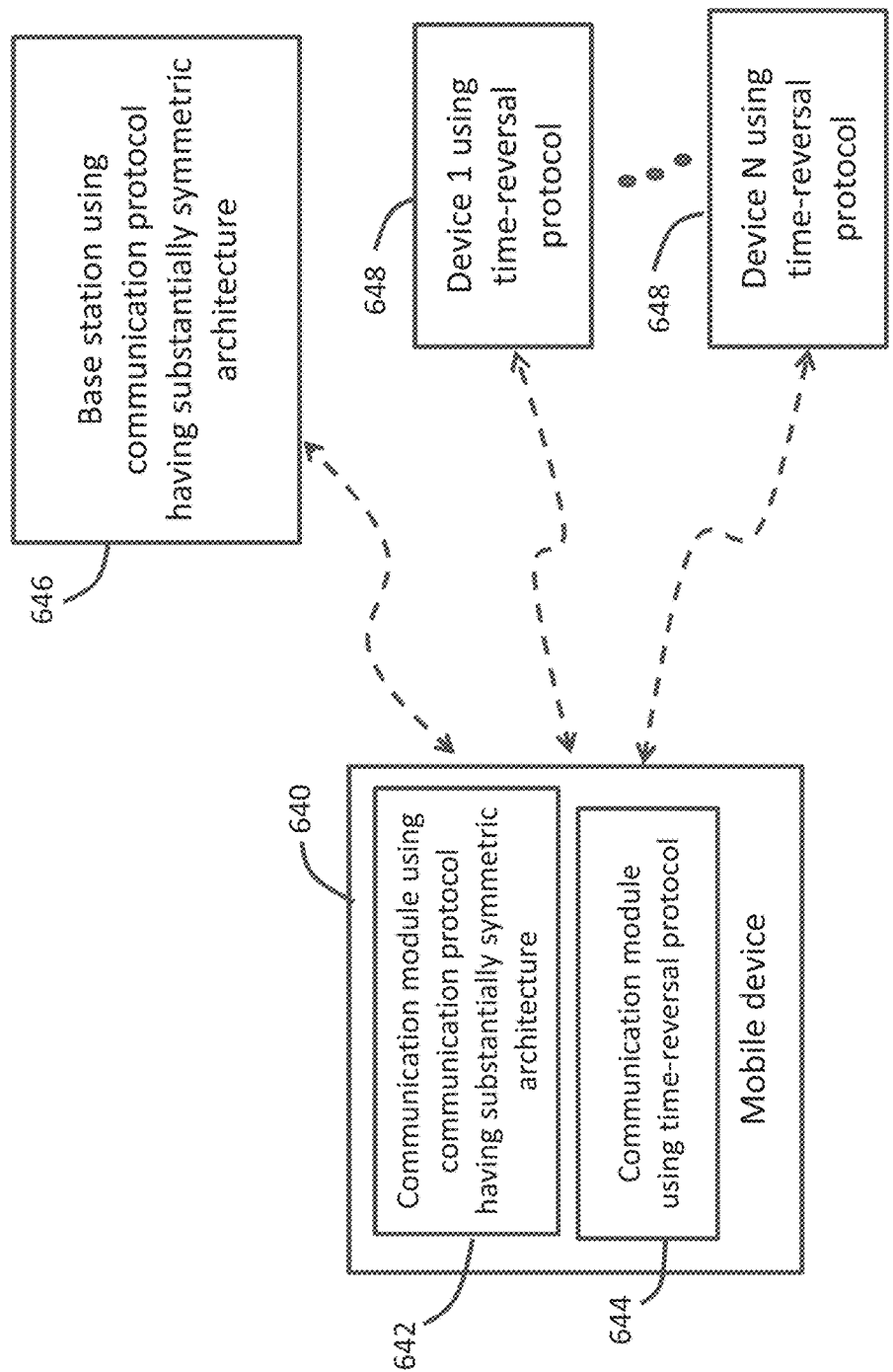
FIG. 35 is a diagram of an exemplary a mobile device having communication modules using a first communication protocol having a substantially symmetric architecture and a second communication having an asymmetric architecture.

Referring to FIG. 35, in some implementations, a mobile device 640 includes a first communication module 642 using a communication protocol having a substantially symmetric architecture, such as the Wi-Fi, Bluetooth, or cellular (e.g., GSM, CDMA, LTE) communication protocol. The mobile device 640 includes a second communication module 644 using a communication protocol having an asymmetric architecture, such as the asymmetric time-reversal communication protocol. The mobile device 640 uses the first communication module 642 to communicate with a base station 646 that uses the communication protocol having a substantially symmetric architecture. The mobile device 640 uses the second communication module 644 to communicate with devices 648 that use the communication protocol having an asymmetric architecture. For example, the mobile device can be, e.g., a mobile phone, a laptop computer, a tablet computer, a smart watch, or a head-mounted display. The base station 646 can be a Wi-Fi base station or a wireless telephone base station. The devices 648 can be, e.g., sensors mounted at various locations in a building or electronic devices worn on a user (e.g., body temperature sensor, heart rate monitor, insulin level monitor, hearing aid, or smart contact lens).

Figure 36:
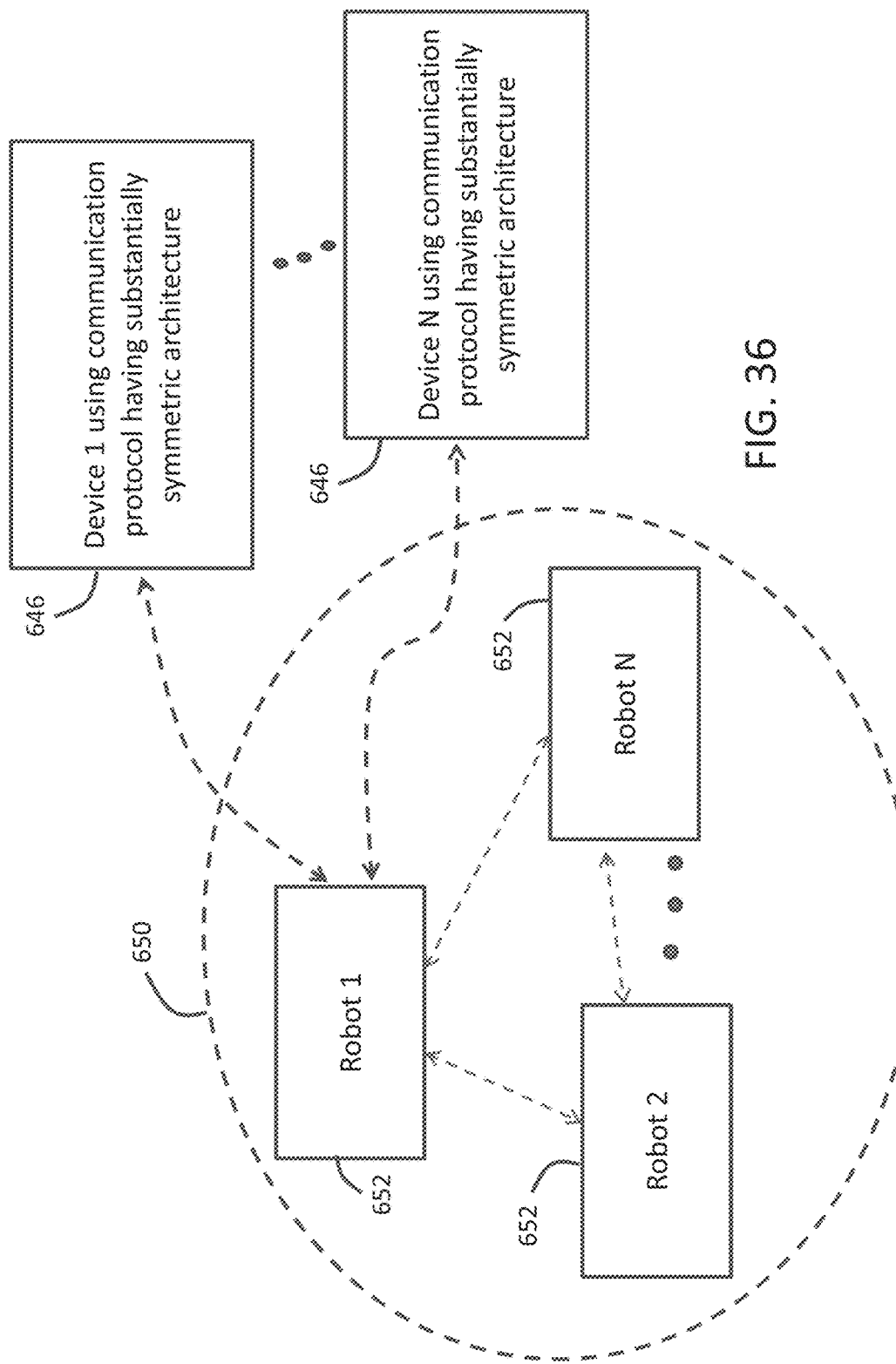
FIG. 36 is a diagram of an exemplary group of robots that communicate using a first communication protocol that has a substantially symmetrical architecture and a second communication protocol that has an asymmetrical architecture.

Referring to FIG. 36, in some implementations, a system 650 includes a group of robots 652 that communicate with devices 646 outside the group of robots using a communication protocol that has a substantially symmetrical architecture (e.g., Wi-Fi, Bluetooth, or cellular protocol, such as GSM, CDMA, or LTE). The device 646 can be, e.g., a Wi-Fi base station, a wireless telephone base station, a Bluetooth peripheral device, or another robot that communicates by Wi-Fi or Bluetooth. The communication within the group of robots 652 is performed using a communication protocol that has an asymmetrical architecture, such as asymmetrical time-reversal communication protocol. The robots 652 can be robotic arms operating at assembly lines in a factory. The robots can be autonomous vehicles, such as autonomous land-based vehicles, aquatic vehicles, or aerial vehicles. The robots 652 can be made small, having the sizes of insects, birds, or small animals, and used to monitor the environment. For example, one or more of the robots 652 can function as the base station, and the other robots 652 can function as terminal devices. Deploying a group of robots as shown in FIG. 36 may be useful for, e.g., search and rescue missions in collapsed buildings or tunnels where there may be severe multipath interference. For example, the group of robots 652 can be scouting robots used to explore mine shafts or underground caves.

In some implementations, components of a robot may communicate with one another using the time-reversal communication protocol. For example, a robot can have multiple arms each having multiple fingers, and each arm or finger may have multiple sensors and actuators. The sensors and actuators of the fingers and arms may communicate with one another or with a central controller using the asymmetrical time-reversal communication protocol, and the central controller may communicate with external devices using symmetrical communication protocols.

Figure 37:
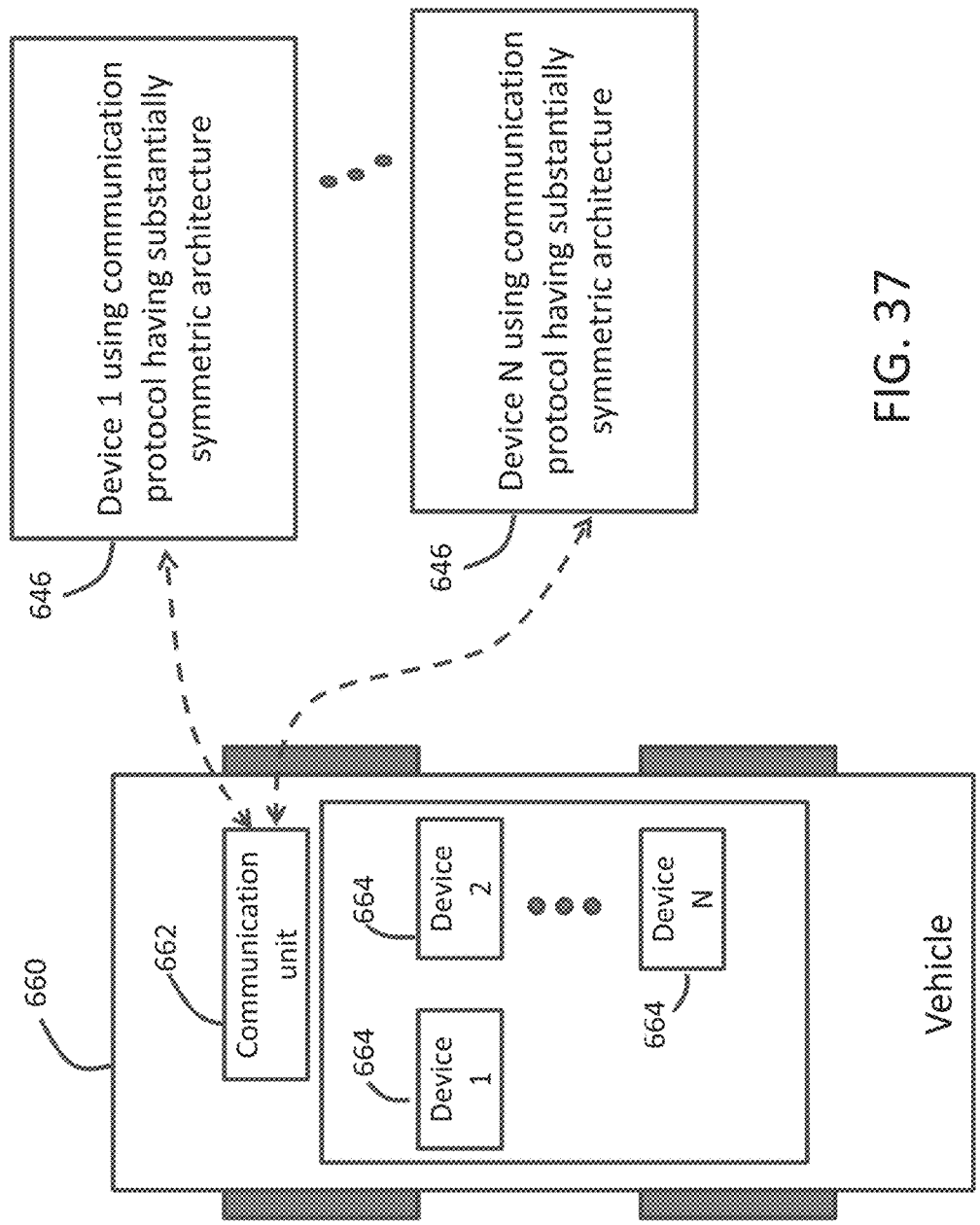
FIG. 37 is a diagram of an exemplary vehicle having a communication unit that communicates using a first communication protocol that has a substantially symmetrical architecture and a second communication protocol that has an asymmetrical architecture.

Referring to FIG. 37, in some implementations, a vehicle 660 may include a communication unit 662 that communicates with one or more devices 646 outside the vehicle 660 using a communication protocol that has a substantially symmetrical architecture, such as Wi-Fi, Bluetooth, or cellular communication protocol. The communication unit 662 communicates with one or more devices 664 within the vehicle 660 (or attached to the vehicle, or associated with the vehicle) using a communication protocol that has an asymmetrical architecture, such as the asymmetrical time-reversal communication protocol. For example, the communication unit 662 may communicate with a wireless telephone base station using GSM, CDMA, LTE, or LTE Advanced protocols. The communication unit 662 may communicate with a controller of an electric vehicle charging station using the Wi-Fi or Bluetooth protocol. The devices 664 can be sensors (e.g., temperature sensors, motion sensors, light sensors, acoustic sensors), information display devices, or audio/video devices (playback or recording devices). For example, car seats may be embedded with accelerometers and pressure sensors that measure the forces imparted to passengers and communicate with the communication unit 662 using a time-reversal communication protocol. A controller may use the information from the accelerometers and pressure sensors to control an active suspension system under the seats to provide a smoother ride to passengers. The vehicle 660 can be, e.g., a car, a bus, a ship, or an airplane. For example, a bus may have an electronic library that delivers digital content to e-readers provided to passengers using the time-reversal communication protocol.

In some implementations, the terminal device 154 (FIG. 4) can be a low-power wearable device, such as a body temperature sensor, a heart rate monitor, an electrocardiograph sensor, an insulin level monitor, a hearing aid, or a smart contact lens. The base station 152 can be a health monitor unit such as a electrocardiography recorder, a mobile phone, a tablet computer, a smart watch, a smart wristband, or other wearable fitness device having a data processor that executes a health and fitness program.

In some implementations, the base station 152 can be part of a control center of a building, and the terminal devices 154 can be sensors mounted at various locations in the building. The sensors can be, e.g., motion sensors, temperature sensors, humidity sensors, light sensors, or acoustic sensors. Because time-reversal communication requires little power consumption at the terminal devices, the sensors can be powered by photovoltaic devices and made at low costs. Many sensors can be placed at various locations in a building without the need to provide wiring to the sensors. For example, this allows a building manager to conveniently monitor various parameters in the building to help optimize utilization of various facilities in the building. For example, light sensors can be placed near conference room tables, and data from the light sensors can be used to control curtains, shutters, or the transmittance of window panels having variable transmittances, in order to optimize lighting conditions for users sitting around the tables. Various light reflectors and light guides can be adjusted based on data from light sensors to optimize the distribution of natural light in a building.

In some implementations, a mobile phone is configured to communicate with a wireless telephone base station using a cellular communication protocol, and communicate with a smart watch using either a second communication protocol that has an asymmetrical architecture or a third communication protocol that has a substantially symmetrical architecture. For example, the second communication protocol can be an asymmetrical time-reversal communication protocol, and the third communication protocol can be, e.g., the Wi-Fi or Bluetooth protocol.

In some implementations, a mobile device can be configured to communicate with a wireless telephone base station using a cellular communication protocol, and communicate with a network router using a communication protocol having an asymmetrical architecture, such as the asymmetrical time-reversal communication protocol. For example, this may be useful in a convention center where thousands of attendees may need to use mobile devices to access the Internet wirelessly. Conventional Wi-Fi based network routers may not be able to support thousands of users within a crowded space due to severe interference, whereas a network router using the time-reversal communication protocol may be able to support all the users by taking advantage of the spatial filtering characteristics of the conference rooms.

The time-reversal communication system may use a wider bandwidth than Wi-Fi, Bluetooth, and cellular communication systems. For example, the time-reversal communication system may use a 500 MHz bandwidth, an LTE system may use a 20 MHz bandwidth, and an LTE Advanced system may use a 100 MHz bandwidth.

In some implementations, a mobile device may communicate with a server using a first communication protocol having a substantially symmetric architecture, download a map and information about locations of access points that use a second communication protocol having an asymmetric architecture. When the mobile device moves to a location near the access points that use the second communication protocol, the mobile device uses the second communication protocol to establish links to the access points. For example, the access points can be network routers that allow the mobile device to access the Internet or a corporate intranet. The first communication protocol can be, e.g., the Wi-Fi, Bluetooth, or cellular communication protocol. The cellular communication protocol can be, e.g., GSM, CDMA, LTE, or LTE Advanced. The second communication protocol can be, e.g., the time-reversal communication protocol.

In this description, the terms used for various communication protocols are meant to encompass variants of the corresponding protocols. For example, the CDMA protocol is meant to include one or more of Wideband CDMA (WCDMA) and Time Division Synchronous CDMA (TD-SCDMA) protocols. The Wi-Fi protocol is meant to include one or more of IEEE 802.11, 802.11a, 802.11b, 802.11g, 802.11n, 802.11ac, and 802.11ad protocols.

It is envisioned that any and all of the implementations described herein may be used in what is commonly referred to as the "internet of things". That is, communications may be between any device that is powered in any way, including by battery power, solar power, wind power, a fuel cell, a capacitor, and energy storage unit, a fly wheel, a power line, the mains and the like. Devices that may implement these protocols include phones, computers, robots, meters, lights, controllers, appliances, vehicles, displays, televisions, entertainment equipment, cooking equipment, heating/cooling equipment, safety systems, lighting systems, monitoring systems, tracking systems, and the like.

The term "time-reversal communication protocol" is meant to cover a communication protocol in which a base station uses information derived from a probe signal sent from a terminal device to generate a signature waveform for the terminal device, and embed the signature waveform into data signals transmitted to the terminal device so that the data signals, after propagating through a multipath channel, focus at the terminal device. The time-reversal communication protocol may not require the system to compute a time-reversed version of a received signal. A time-reversal multiuser downlink system may not necessarily compute a time-reversed version of a signal received from any user. In some implementations, the signature waveform is a time-reversed version of the channel response signal. In some implementations, the signature waveform can be a modified version of the time-reversed channel response signal. For example, the signature waveform can be designed to reduce interference. To generate the signature waveform, it may not be necessary to first generate a time-reversed signal of the channel response signal, for example, the time-reverse operation may be moved toward a later stage of the process, i.e., design the signature based on the channel response and then time-reverse the resulting signature. Another method of generating the signature waveform is to separate the time-reverse operation into many element-swap operations and distribute these operations in the signature waveform design algorithm.

Accordingly, other embodiments are within the scope of the following claims.

What is claimed is:

1. An apparatus, comprising:
an input circuit configured to derive a channel response signal from a probe signal sent from a first device to the apparatus through multiple wireless propagation paths, and to receive a combined signals that includes a first signal from the first device and a second signal from a second device; and
a data processor configured to calculate a signature waveform for the first device based on the derived channel response signal, and to determine the first signal based on the combined signal and the calculated signature waveform;
wherein the data processor is further configured to generate a combined downlink signal from a combination of a first downlink waveform and a second downlink waveform, the first downlink waveform including data intended for the first device, the second downlink waveform including data intended for the second device.

2. The apparatus of claim 1 in which the apparatus comprises a base station that comprises the input circuit and the data processor.

3. The apparatus of claim 1 in which the data processor determines the first signal by performing a convolution operation, or an operation similar to the convolution operation, between the combined signal and the calculated signature waveform.

4. The apparatus of claim 1 in which the data processor determines the first signal by filtering the combined signals using the calculated signature waveform as a filtering parameter.

5. The apparatus of claim 1 in which the data processor calculates the signature waveform from the first for the first device by time-reversing the derived channel response signal.

6. The apparatus of claim 1 in which the data processor is further configured to determine the first downlink waveform based on the data intended for the first device and the calculated signature waveform.

7. The apparatus of claim 6 in which the data processor determines the first downlink waveform by performing a convolution, or an operation similar to the convolution, of the data intended for the first device and the calculated signature waveform.

8. The apparatus of claim 1 in which the combined downlink signal is configured to enable each of the first device and the second device to receive multipath signals that can be used to determine, by the first device, a first data signal intended for the first device, and to determine, by the second device, a second data signal intended for the second device, wherein the first and the second devices receiving the combined downlink signal through different propagation paths and respectively retrieving the first data signal and the second data signal.

9. The apparatus of claim 1 in which the input circuit is further configured to receive another combined signals that includes signals from three or more devices that communicate with the apparatus, and the data processor is further configured to calculate a corresponding signature waveform for each of the devices.

10. The apparatus of claim 1 in which the first device does not calculate the signature waveform.

11. The apparatus of claim 1 in which the first device does not perform any signal processing that uses the signature waveform.

12. The apparatus of claim 1 comprising a processor configured to reduce inter-symbol interference (ISI) or inter-user interference (IUI) or both.

13. The apparatus of claim 1 in which the probe signal comprises at least one of (i) substantially a pulse signal, (ii) a signal having a predesigned waveform, or (iii) a signal that includes data signals.

14. A system, comprising:
a base station; and
a first circuit configured to send a probe signal through multiple wireless propagation paths to the base station;
wherein the base station comprises an input circuit configured to receive a channel response signal derived from the probe signal,
wherein the base station is configured to receive combined signals that include a signal from the first circuit and a signal from a second circuit,
wherein the base station comprises a data processor configured to calculate a signature waveform for the first circuit based on the channel response signal, and determine the signal sent from the first circuit based on the combined signals and the signature waveform for the first circuit, and wherein the data processor of the base station is configured to determine a combined downlink signal from a combination of a first downlink waveform and a second downlink waveform, the first downlink waveform including data intended for the apparatus, the second downlink waveform including another data intended for another apparatus.

15. The apparatus of claim 14 wherein the probe signal is substantially a pulse signal.

16. The apparatus of claim 14 wherein the probe signal is a predesigned waveform.

17. The apparatus of claim 14 wherein the probe signal includes data signals.

18. The apparatus of claim 14 further configured to receive data signals encoded on waveforms derived from a channel impulse waveform.

19. The apparatus of claim 14 in which the circuit is configured to receive the combined downlink signal from the base station and apply rate matching and channel decoding to the combined downlink signal.

20. A wireless communications system comprising:
a base station comprising a data processor,
at least two devices that communicate with the base station,
wherein the at least two devices each sends a probe signals to the base station,
wherein the base station detects and stores a channel response signals respectively derived from each of the received probe signal,
wherein the base station uses the stored channel response signals associated with each of the at least two devices to preferentially communicate with the each of the last least two devices; and
wherein the data processor of the base station is configured to generate a combined downlink signal from a combination of a first downlink waveform and a second downlink waveform, the first downlink waveform including data intended for one of the at least two devices, the second downlink waveform including data intended for another one of the at least two devices.

21. The wireless communications system of claim 20, comprising three or more devices.

* * * * *

UNITED STATES PATENT AND TRADEMARK OFFICE
CERTIFICATE OF CORRECTION

PATENT NO. : 9,900,794 B2
APPLICATION NO. : 14/912324
DATED : February 20, 2018
INVENTOR(S) : Feng Han, K. J. Ray Liu and Yan Chen It is certified that error appears in the above-identified patent and that said Letters Patent is hereby corrected as shown below:

In the Claims

Claim 1
Column 43, Line 53, delete "a combined signals" and insert -- a combined signal --.

Claim 4
Column 44, Line 11, delete "the combined signals" and insert -- the combined signal --.

Claim 5
Column 44, Line 15, delete "from the first".

Claim 9
Column 44, Line 38, delete "another combined signals" and insert -- another combined signal --.

Claim 14
Column 45, Line 8, delete "intended for the apparatus" and insert -- intended for the first circuit --.
Column 45, Line 10, delete "intended for another apparatus" and insert -- intended for the second circuit --.

Claim 20
Column 46, Line 5, delete "a probe signals" and insert -- a probe signal --.
Column 46, Line 7, delete "a channel response signals" and insert -- a channel response signal --.
Column 46, Line 10, delete "the stored channel response signals" and insert -- the stored channel response signal --.

Signed and Sealed this
Nineteenth Day of June, 2018

Andrei Iancu
*Director of the United States Patent and Trademark Office*